US006437090B1

(12) United States Patent
Murai et al.

(10) Patent No.: US 6,437,090 B1
(45) Date of Patent: *Aug. 20, 2002

(54) CURING CATALYST, RESIN COMPOSITION, RESIN-SEALED SEMICONDUCTOR DEVICE AND COATING MATERIAL

(75) Inventors: Shinji Murai; Shuji Hayase, both of Yokohama; Shinetsu Fujieda, Kawasaki; Rumiko Hayase, Yokohama; Yasuyuki Hotta, Funabashi, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,915

(22) Filed: Jun. 17, 1999

(30) Foreign Application Priority Data

Jun. 17, 1998 (JP) .............................................. 10-170323
Dec. 11, 1998 (JP) .............................................. 10-352908

(51) Int. Cl.$^7$ .............................................. C08G 59/68
(52) U.S. Cl. ........................ 528/416; 502/158; 525/370
(58) Field of Search ................................. 526/126, 135; 502/164, 167, 158; 528/416; 525/370

(56) References Cited

U.S. PATENT DOCUMENTS

| 3,812,214 | A |   | 5/1974  | Markovitz |
|-----------|---|---|---------|-----------|
| 3,867,324 | A | * | 2/1975  | Clendinning .............. 260/23 H |
| 3,895,954 | A | * | 7/1975  | Roteman ..................... 96/115 |
| 4,137,275 | A |   | 1/1979  | Smith et al. |
| 4,322,513 | A |   | 3/1982  | Wada et al. |
| 4,534,928 | A | * | 8/1985  | Martin ....................... 264/334 |
| 4,956,435 | A | * | 9/1990  | Chu .............................. 528/17 |
| 5,283,299 | A | * | 2/1994  | Tramontano ................ 525/529 |
| 5,324,767 | A | * | 6/1994  | Koyama ...................... 524/493 |
| 5,340,897 | A | * | 8/1994  | Loiselle ........................ 528/17 |
| 5,453,410 | A | * | 9/1995  | Kolthammer ............... 502/155 |
| 5,453,450 | A | * | 9/1995  | Kinzer ......................... 522/18 |
| 5,514,728 | A | * | 5/1996  | Lamanna ...................... 522/31 |
| 5,554,664 | A | * | 9/1996  | Lamanna ...................... 522/25 |
| 5,684,095 | A | * | 11/1997 | Morimoto .................... 525/438 |
| 5,709,948 | A | * | 1/1998  | Perez .......................... 428/413 |
| 5,721,289 | A | * | 2/1998  | Karim .......................... 522/31 |
| 5,763,547 | A | * | 6/1998  | Kolthammer ............... 526/129 |
| 5,786,435 | A | * | 7/1998  | Marutani .................... 526/273 |
| 5,789,084 | A | * | 8/1998  | Nakamura .................. 428/447 |
| 5,811,497 | A |   | 9/1998  | Hayase et al. |
| 5,821,314 | A | * | 10/1998 | Ikushima ..................... 528/18 |
| 5,897,727 | A | * | 4/1999  | Staral .......................... 156/99 |
| 6,057,382 | A | * | 5/2000  | Karim ........................ 522/122 |

FOREIGN PATENT DOCUMENTS

| EP | 0 775 715 A2 |   | 5/1997 |
| EP | 916702       | * | 5/1999 |
| JP | 52-770       |   | 1/1977 |
| JP | 62-192427    |   | 8/1987 |
| JP | 2-196812     |   | 8/1990 |
| JP | 6-73163      |   | 3/1994 |
| JP | 9-143250     |   | 6/1997 |

OTHER PUBLICATIONS

Kazuhiko Morio, et al. "Thermoinitiated Cationic Polymerization of Epoxy Resins by Sulfonium Salts", Journal of Applied Polymer Science, vol. 32, pp. 5727–5732.

Kazuhiko Morio, et al. Journal of Applied Science, "Thermoinitiated Cationic Polymerization of Epoxy Resins by Sulfonium Salts", vol. 32, 5727–5732 (1986).

* cited by examiner

*Primary Examiner*—Paul R. Michl
(74) *Attorney, Agent, or Firm*—Oblon, Spivak, McClelland, Maier & Neustadt, P.C.

(57) ABSTRACT

A curing catalyst comprising at least one of a cationic curing catalyst component and an organo-metallic compound component. At least one of these components is capable of reversibly repeating the dissolution and precipitation through heating and cooling. The cationic curing catalyst component includes in its molecule at least one substituted or unsubstituted hydrocarbon group having 10 or more carbon atoms, or at least one cyclic organic structure having a substituted or unsubstituted hydrocarbon group having 10 or more carbon atoms.

16 Claims, 1 Drawing Sheet

CURING CATALYST, RESIN COMPOSITION, RESIN-SEALED SEMICONDUCTOR DEVICE AND COATING MATERIAL

BACKGROUND OF THE INVENTION

This invention relates to a curing catalyst to be employed for curing an epoxy resin or cationic polymerizable compound, and to a resin composition containing the curing catalyst. This invention also relates to a resin-sealed semiconductor device which is sealed using the resin composition and to a coating material containing the resin composition.

Epoxy resin is generally excellent in electric insulation, mechanical strength, adhesivity, moisture resistance, etc. so that epoxy resin is extensively employed for instance in the fields of painting technology for motor cars, cans, etc., in the fields of electricity for sealing materials, laminate boards, etc., in the fields of civil engineering and architecture, and in the field of adhesives. Conventionally, epoxy resin has been commonly employed in a two-part system wherein an amine compound or a carboxylic acid anhydride is included as a curing agent. However, this two-part system employing such a curing agent is troublesome in its use since two parts are required to be mixed together immediately before use. Further, epoxy resin is required to be stored or transported under a low temperature condition, or the useful life after the manufacture thereof is very limited. Under the circumstances, there have been strong demands for years to develop an epoxy resin composition which is capable of being stored in the form of one-pack and at ordinary temperatures, and a large number of methods have been studied for manufacturing such an epoxy resin composition.

In the case of a thermosetting composition whose curing reaction can be promoted by an acid catalyst or a basic catalyst, the potentialization of these catalysts by means of physical method or chemical method has been conventionally studied with a view to improve the storage stability of the thermosetting composition. For example, as for the physical method, there have been proposed a method wherein an organic phosphine compound for instance is encapsulated using a polymer thereby forming granular microcapsules (Japanese Patent Unexamined Publication H6-73163), or a method wherein the catalysts are allowed to be adsorbed to a porous compound such as zeolite, thereby assuring the storage stability of the thermosetting composition in the form of one-pack. However, these conventional physical methods are accompanied with problems that it is difficult to secure a sufficient potentialization (latency) of these catalysts, that since these catalyst systems are of heterogeneous system, they cannot be employed in a processing method such as impregnation, thus limiting the end-use thereof, and that a curing resin may easily become non-uniform.

On the other hand, as for the chemical method, there has been extensively studied a method to employ so-called a heat-latent catalyst whose activity can be temporarily inhibited and can be reactivated as it is cleaved at the occasion of thermal cure thereof. As for such a heat-latent catalyst, there are known a catalyst whose active proton is blocked by taking advantage of a neutralization reaction of acid-base, or a catalyst whose active proton is blocked by taking advantage of an esterification reaction thereof with alcohols (Japanese Patent Publication S52-770). There are also known, as a heat-latent catalyst which is capable of generating an active benzyl cation through a thermal decomposition of onium salt, a benzyl sulfonium salt type catalyst or a benzyl pyridinium salt type catalyst (Japanese Patent Unexamined Publication S62-192427). As for a heat-latent catalyst which is now commercially available, Lewis acids such as a boron trifluoride-monoethyl amine complex and a boron trifluoride-pyridine complex are known.

However, the catalysts produced by taking advantage of a neutralization reaction of acid-base, or by taking advantage of an esterification reaction thereof with alcohols are hardly capable of providing a heat-latent catalyst having a suitable dissociation temperature and heat stability. On the other hand, the benzyl sulfonium salt type or the benzyl pyridinium salt type catalyst is relatively excellent in storage stability but is not sufficient enough for practical use. Particularly, alicyclic epoxy resins which are highly reactive are poor in storage stability. Further, the aforementioned boron trifluoride-monoethyl amine complex and boron trifluoride-pyridine complex which are commercially available now are generally too high in dissociation temperature.

As mentioned above, when these conventional catalysts are employed together with a curing resin component or an epoxy resin, the curing reaction of the epoxy resin takes place gradually immediately after these catalysts are mixed with the epoxy resin even if the epoxy resin composition is kept at room temperature. Namely, even if such an epoxy resin composition is simply kept stored, the curing reaction of the resin composition continues to proceed though gradually, and ultimately cured. Therefore, the storage period of the epoxy resin composition is restricted to a certain limited period of time, thus requiring the epoxy resin composition to be used up by this limited storage period.

Further, since the curing reaction to be induced by these conventional catalysts takes place through an ionic reaction, an ionic catalyst is caused to be left remained in the cured resin after the curing reaction, whereby greatly deteriorating the electric insulation property of the cured resin.

Meantime, Lewis acids such as $BF_3$, $AlCl_3$, $AlRCl_2$, etc. are known as being useful as a cationic polymerization catalyst for a cationic polymerizable vinyl compound. However, these polymerization catalysts cause the polymerizable compound to proceed the polymerization reaction thereof even at low temperatures such as room temperature, thus making the resultant polymerizable composition very poor in storage stability. Additionally, it becomes difficult to control the polymerization reaction and to obtain a high polymerization degree. In the case of polymerization of a vinyl compound, a polymerization catalyst is generally charged into a monomer after the monomer which has been dissolved in a suitable solvent in advance is cooled down to a predetermined very low temperature. However, since the operation of industrially executing the polymerization reaction at a low temperature region is very troublesome and costly, the method using such polymerization catalysts is not appropriate.

BRIEF SUMMARY OF THE INVENTION

Accordingly, an object of the present invention is to provide a curing catalyst for a resin composition, in particular an epoxy resin composition, which is capable of causing a polymerization reaction to be quickly taken place at a predetermined temperature higher than room temperature thereby curing the resin, and incapable of causing the polymerization reaction to take place at a temperature not higher than room temperature.

Another object of the present invention is to provide a resin composition of excellent workability which is incapable of causing the curing reaction to take place at a temperature not higher than room temperature, thereby ensuring the resin composition to have a high storage stability, and capable of causing a curing reaction to quickly take place at a predetermined temperature higher than room temperature thereby making it possible to obtain a cured product having excellent electric insulation and excellent mechanical strength.

Still another object of the present invention is to provide a resin-sealed semiconductor device having a high thermal shock resistance and a moistureproof reliability, which is sealed using an epoxy resin composition which is excellent in storage stability, fluidity and filling property.

Further object of the present invention is to provide a coating material containing the aforementioned curing catalyst, and exhibiting an excellent storage stability and a high hardness after the curing of the coating material.

Namely, according to the present invention, there is provided a curing catalyst comprising at least one of a cationic curing catalyst component and an organometallic compound component, wherein at least one of these components is capable of reversibly the dissolving and precipitating through heating and cooling.

Further, according to the present invention, there is provided a curing catalyst comprising at least one kind of compound selected from the group consisting of compounds represented by the following general formulas (III-1') and (III-2):

(III-1')

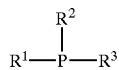

wherein $R^1$, $R^2$ and $R^3$ may be the same or different and are individually hydrogen atom, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of $R^1$, $R^2$ and $R^3$ is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms; and (III-2)

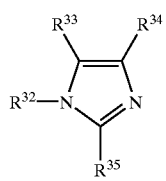

wherein $R^{32}$, $R^{33}$, $R^{34}$ and $R^{35}$ may be the same or different and are individually hydrogen atom or a substituted or unsubstituted hydrocarbon group having 1 to 30 carbon atoms with a proviso that at least two of $R^{32}$, $R^{33}$, $R^{34}$ and $R^{35}$ has not less than 10 carbon atoms.

Further, according to the present invention, there is provided a curing catalyst comprising at least one kind of compound selected from the group consisting of compounds represented by the following general formulas (III-1) to (III-2):

(III-1)

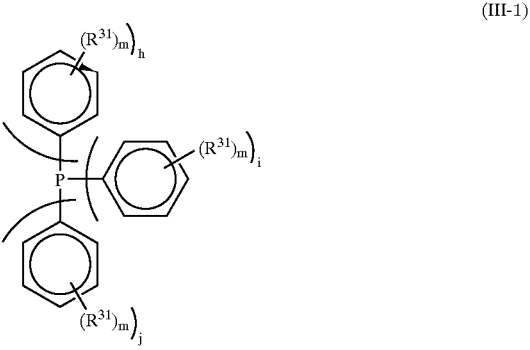

wherein $R^{31}$s may be the same or different and are individually hydrogen atom or substituted or unsubstituted hydrocarbon groups having 1 to 30 carbon atoms with a proviso that at least one of $R^{31}$s has not less than 10 carbon atoms; h, i and j are integers satisfying a condition of h+i+j=3; and m is an integer of 1 to 5;

(III-2)

wherein $R^{32}$, $R^{33}$, $R^{34}$ and $R^{35}$ may be the same or different and are individually hydrogen atom or substituted or unsubstituted hydrocarbon groups having 1 to 30 carbon atoms with a proviso that at least two of $R^{32}$, $R^{33}$, $R^{34}$ and $R^{35}$ has not less than 10 carbon atoms.

Furthermore, according to the present invention, there is provided a resin composition comprising the aforementioned curing catalyst and a cationic polymerizable resin component.

Further, according to the present invention, there is provided a resin-sealed semiconductor device comprising: a semiconductor element; and a resin layer sealing the semiconductor element; wherein the resin layer is constituted by a cured body of the aforementioned resin composition.

DETAILED DESCRIPTION OF THE INVENTION

Figure 1:
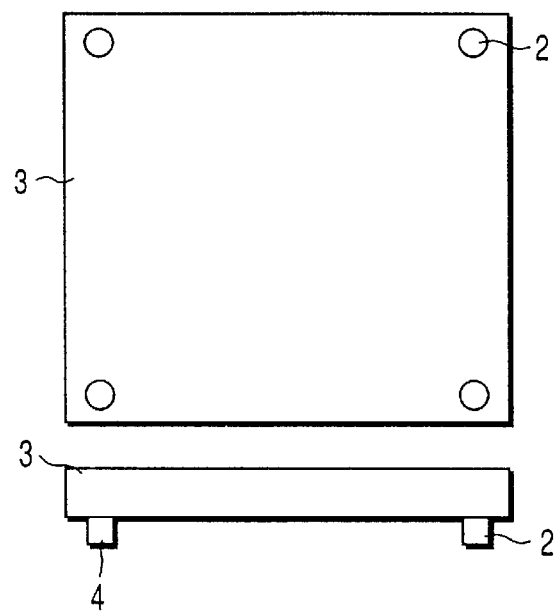
FIG. 1 shows the configuration of a glass chip provided with glass bumps before it is sealed with a liquid epoxy resin composition according to this invention.

This invention will be further explained in detail with reference to the following preferred embodiments.

A first curing catalyst according to the present invention comprises at least one of a cationic curing catalyst component and an organometallic compound component, wherein at least one of these components is capable of reversibly the dissolving and precipitating through heating and cooling. The "heating" in this case means a heating at a temperature higher than room temperature, more specifically, a temperature ranging from 40° C. to a curing temperature, while the "cooling" in this case means a cooling at a temperature not higher than a curing temperature, more specifically, a temperature not higher than 80° C., more preferably not higher than 60° C. Further, the "precipitation" in this invention means a state where a catalyst is in the form of colloid, micell or crystal in an epoxy resin, i.e. an active portion of the catalyst is isolated from an epoxy resin or a curing agent. The size of the catalyst thus precipitated may be any magnitude as long as the latency of the catalyst can be confirmed by means of a storage stability test, etc. Preferably, the size of the catalyst thus precipitated may be such that those having an average particle diameter of 0.1 μm or more can be confirmed. The "dissolution" in this invention means a state where the aforementioned state of catalyst is dissolved even partially. For example, this dissolution can be confirmed for instance by a method wherein a catalyst precipitated in an epoxy resin taken up together with the epoxy resin on a glass plate, and then, the epoxy resin is heated until the turbidness of the epoxy resin due to the precipitation of the catalyst is clarified through the dissolution of the catalyst as it is observed by means of a microscope. More preferably, the dissolution catalyst may be confirmed by recognizing an endothermic peak originating from the dissolution of the catalyst in an epoxy resin by making use of the DSC (differential scanning calorimetry), etc.

As for the cationic polymerization catalyst component to be incorporated into the first curing catalyst, it possible to employ for example a substituted or unsubstituted hydrocarbon having 10 or more carbon atoms, preferably 16 or more carbon atoms, or a compound having within its molecule at least one cyclic organic structure having a substituted or unsubstituted hydrocarbon group having 10 or more carbon atoms, preferably 16 or more carbon atoms. These hydrocarbon and cyclic organic structure may be incorporated in the catalyst component in the form of a substituent group or as a portion constituting a ligand. As for the cyclic organic structure, it may be an aromatic, heteroaromatic, fused aromatic or fused heteroaromatic structure.

As for the element for forming a cation of the cationic polymerization catalyst component, S, I, Fe, N. O, P, Mg, Mn and Si may be employed.

More specifically, as for the cationic polymerization catalyst component to be incorporated into the first curing catalyst, it is possible to employ onium salt such as sulfonium salts represented by the following general formula (I-1), iodonium salts represented by the following general formula (I-2), and iron aromatic compounds represented by the following general formula (I-3); organosilicon compounds represented by the following general formula (I-4) and compounds represented by the following general formula (I-5).

As for the onium salt, it is possible to employ an ammonium salt, a diazonium salt, a pyrrolium salt, a pyrylium salt, a quinolium salt, an anilium salt, a pyridinium salt, a benzylammonium salt, a benzothiazolium compound salt, a benzylpyridium salt, a benzylsulfonium salt, a benzylphosphonium salt, etc.

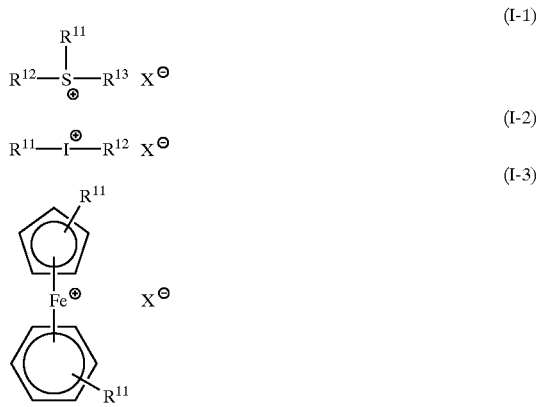

wherein $R^{11}$, $R^{12}$ and $R^{13}$ may be the same or different and are individually hydrogen atom, substituted or unsubstituted hydrocarbon groups having 1 to 30 carbon atoms, or substituted or unsubstituted aromatic or heteroaromatic groups with a proviso that these compounds include in their molecules at least one substituted or unsubstituted hydrocarbon group having 10 or more carbon atoms, or at least one cyclic organic structure having a substituted or unsubstituted hydrocarbon group having 10 or more carbon atoms. More specifically, these compounds include in their molecules at least one substituted or unsubstituted hydrocarbon group having 10 or more carbon atoms, or at least one aromatic group or heteroaromatic group having a substituted or unsubstituted hydrocarbon group having 10 or more carbon atoms. x is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, $R^1$—COO and $R^2$—$SO_3$ (wherein $R^1$ and $R^2$ are individually an alkyl group or a phenyl group, which may be substituted by an alkyl group, a halogen atom, a cyano group or an alkoxy group).

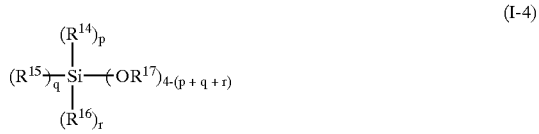

wherein $R^{14}$, $R^{15}$, $R^{16}$ and $R^{17}$ may be the same or different and are individually hydrogen atom, substituted or unsubstituted hydrocarbon groups having 1 to 30 carbon atoms, or substituted or unsubstituted aromatic or heteroaromatic groups with a proviso that the compound includes in its molecule at least one substituted or unsubstituted hydrocarbon group having 10 or more carbon atoms, or at least one cyclic organic structure having a substituted or unsubstituted hydrocarbon group having 10 or more carbon atoms, more specifically, these Rs include at least one substituted or unsubstituted aromatic or heteroaromatic group having a substituted or unsubstituted hydrocarbon group having 10 or more carbon atoms; and p, q and r are integers of 0 to 3 with a proviso that p+q+r is 3 or less;

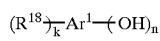 (I-5)

wherein $Ar^1$ is a substituted or unsubstituted aromatic or heteroaromatic group; $R^{18}$s may be the same or different and are individually hydrogen atom, substituted or unsubstituted hydrocarbon groups having 1 to 30 carbon atoms, or substituted or unsubstituted aromatic or heteroaromatic groups with the proviso that the compound includes in its molecule at least one substituted or unsubstituted hydrocarbon group having 10 or more carbon atoms, or at least one cyclic organic structure having a substituted or unsubstituted hydrocarbon group having 10 or more carbon atoms; k is an integer of 1 to 7; and n is an integer of 1 to 7.

As for hydrocarbon groups to be incorporated as $R^{11}$ to $R^{18}$ into the aforementioned general formulas, it is possible to employ compounds having a branched or straight chain substituent group such as methane, ethane, propane, butane, pentane, hexane, heptane, octane, nonane, decane, undecane, dodecane, tridecane, tetradecane, pentadecane, hexadecane, heptadecane, octadecane, nonadecane, eicosane, henicosane, docosane, tricosane, tetracosane, pentacosane, hexacosane, heptacosane, octacosane, nonacosane and triacontane; or having a steroid skeleton such as cholesterol.

The aforementioned hydrocarbon groups may contain a heteroatom such as F, Si, O, N and S.

As for substituted or unsubstituted aromatic or heteroaromatic groups to be incorporated as $R^{11}$ to $R^{18}$ in the aforementioned general formula, it is possible to employ phenyl group, benzyl group, methylbenzyl group, dimethylbenzyl group, trimethylbenzyl group, chlorobenzyl group, dichlorobenzyl group, trichlorobenzyl group, nitrobenzyl group, dinitrobenzyl group, trinitrobenzyl group, naphthomethyl group; and a fused aromatic ring group where two or three benzene rings are fused together (such as naphthyl, anthracenyl and phenanthrenyl group); monocyclic heteroaromatic ring groups such as furanyl, thiophenyl, pyrrolyl, pyrrolinyl, pyrrolidinyl, oxazolyl, isooxazolyl, thiazolyl, isothiazolyl, imidazolyl, imidazolinyl, imidazolidinyl, pyrazolyl, pyrazolidinyl, triazolyl, furazanyl, tetrazolyl, pyranyl, thienyl, pyridinyl, piperidinyl, oxazinyl, morpholinyl, thiazinyl, pyridazinyl, pyrimidinyl, pyrazinyl, piperazinyl and triazinyl; fused heteroaromatic ring group such as benzofuranyl, isobenzofuranyl, benzothiophenyl, indolyl, indolinyl, isoindolyl, benzoxazolyl, benzothiazolyl, indazolyl, imidazolyl, chromenyl, chromanyl, isochromanyl, quinolyl, isoquinolyl, cinnolinyl, phthalazinyl, quinazolinyl, quinoxalinyl, dibenzofuranyl, carbazolyl, xanthenyl, acridinyl, phenanthridinyl, phenanthrolinyl, phenazinyl, phenoxazinyl, thianthrenyl, indolidinyl, quinolidinyl, quinuclidinyl, naphthylidinyl, purinyl and pteridinyl; and other kinds of these aromatic rings where hydrogen atoms thereof are substituted by one or more substituent groups.

As for the substituent groups in these substituted aromatic or heteroaromatic group, they may be an organic group having one or more carbon atoms. When a plurality of substituent groups are existed in these substituted aromatic or heteroaromatic group, they may be the same with or different from each other.

Examples of sulfonium salts represented by the aforementioned general group (I-1) are tris(p-octadecyloxyphenyl) sulfonium hexafluoroantimonate, bis(p-octadecyloxyphenyl) phenylsulfonium hexafluoroantimonate, (p-octadecyloxyphenyl) diphenylsulfonium hexafluoroantimonate, tris(p-hexadecyloxyphenyl) sulfonium hexafluoroantimonate, bis(p-hexadecyloxyphenyl) phenylsulfonium hexafluoroantimonate, (p-hexadecyloxyphenyl) diphenylsulfonium hexafluoroantimonate, benzyl-4-octadecyloxyphenyl methylsulfonium hexafluoroantimonate, benzyl-4-octadecyloxyphenyl ethylsulfonium hexafluoroantimonate, benzyl-4-octadecyloxyphenyl sulfonium hexafluoroantimonate, tris(p-octadecyloxyphenyl) sulfonium hexafluorophosphate, bis(p-octadecyloxyphenyl) phenylsulfonium hexafluorophosphate, (p-octadecyloxyphenyl) diphenylsulfonium hexafluorophosphate, tris(p-hexadecyloxyphenyl) sulfonium hexafluorophosphate, bis(p-hexadecyloxyphenyl) phenylsulfonium hexafluorophosphate, (p-hexadecyloxyphenyl) diphenylsulfonium hexafluorophosphate, benzyl-4-octadecyloxyphenyl methylsulfonium hexafluorophosphate, benzyl-4-octadecyloxyphenyl ethylsulfonium hexafluorophosphate, benzyl-4-octadecyloxyphenyl sulfonium hexafluorophosphate, tris(p-octadecyloxyphenyl) sulfonium hexafluoroarsenate, bis(p-octadecyloxyphenyl) phenylsulfonium hexafluoroarsenate, (p-octadecyloxyphenyl) diphenylsulfonium hexafluoroarsenate, tris(p-hexadecyloxyphenyl) sulfonium hexafluoroarsenate, bis(p-hexadecyloxyphenyl) phenylsulfonium hexafluoroarsenate, (p-hexadecyloxyphenyl) diphenylsulfonium hexafluoroarsenate, benzyl-4-octadecyloxyphenyl methylsulfonium hexafluoroarsenate, benzyl-4-octadecyloxyphenyl ethylsulfonium hexafluoroarsenate, benzyl-4-octadecyloxyphenyl sulfonium hexafluoroarsenate, tris(p-octadecyloxyphenyl) sulfonium tetrafluoroborate, bis(p-octadecyloxyphenyl) phenylsulfonium tetrafluoroborate, (p-octadecyloxyphenyl) diphenylsulfonium tetrafluoroborate, tris(p-hexadecyloxyphenyl) sulfonium tetrafluoroborate, bis(p-hexadecyloxyphenyl) phenylsulfonium tetrafluoroborate, (p-hexadecyloxyphenyl) diphenylsulfonium tetrafluoroborate, benzyl-4-octadecyloxyphenyl methylsulfonium tetrafluoroborate, benzyl-4-octadecyloxyphenyl ethylsulfonium tetrafluoroborate, benzyl-4-octadecyloxyphenyl sulfonium tetrafluoroborate, tris(p-octadecyloxyphenyl) sulfonium trifluoromethanesulfonate, bis(p-octadecyloxyphenyl) phenylsulfonium trifluoromethanesulfonate, (p-octadecyloxyphenyl) diphenylsulfonium trifluoromethanesulfonate, tris(p-hexadecyloxyphenyl) sulfonium trifluoromethanesulfonate, bis(p-hexadecyloxyphenyl) phenylsulfonium trifluoromethanesulfonate, (p-hexadecyloxyphenyl) diphenylsulfonium trifluoromethanesulfonate, benzyl-4-octadecyloxyphenyl methylsulfonium trifluoromethanesulfonate, benzyl-4-octadecyloxyphenyl ethylsulfonium trifluoromethanesulfonate, benzyl-4-octadecyloxyphenyl sulfonium trifluoromethanesulfonate, p-octadecyloxybenzyltetramethylene sulfonium hexafluoroantimonate, (4-octadecyloxyphenyl) cinnamylmethylsulfonium hexafluoroantimonate, (4-octadecyloxyphenyl) (3-methyl-2-butenyl) methylsulfonium hexafluoroantimonate, 4-octadecyloxyphenyl-(α-naphthylmethyl) methylsulfonium hexafluoroantimonate, 4-octadecyloxyphenyl-9-fluorenylmethylsulfonium hexafluoroantimonate, tris(4-octadecyloxyphenylmethyl)

sulfonium hexafluoroantimonate, o-nitrobenzyl-4-octadecyloxyphenylmethylsulfonium hexafluoroantimonate, α-phenylbenzyl-4-octadecyloxyphenylmethylsulfonium hexafluoroantimonate, α-methylbenzyl-4-octadecyloxyphenylmethylsulfonium hexafluoroantimonate, benzyl-4-octadecyloxyphenylsulfonium hexafluoroantimonate, and 4-octadecyloxyphenylmethylsulfonium hexafluoroantimonate.

Hexafluoroantimonate constituting the anion moiety of the aforementioned sulfonium salts to be used as a curing catalyst component of this invention may be substituted by an anion selected from the group consisting of hexafluorophosphate, hexafluoroarsenate, tetrafluoroborate, any one of these anions wherein at least one fluorine atom thereof is substituted by hydroxyl group, trifluoromethane sulfonate, perchlorate, halogen, $R^1$—COO and $R^2$—$SO_3$ (wherein $R^1$ and $R^2$ are individually an alkyl group or a phenyl group, which may be substituted by an alkyl group, a halogen atom, a cyano group or an alkoxy group).

Furthermore, it is possible to employ benzyl-4-octadecyloxyphenylmethyl hexafluoroantimonate, benzyl-4-octadecyloxyphenylmethyl hexafluoroarsenate, benzyl-4-octadecyloxyphenylmethyl hexafluorophosphate, benzyl-4-octadecyloxyphenylmethyl tetrafluoroborate, or benzyl-4-octadecyloxyphenylmethyl trifluoromethane sulfonate.

Examples of iodonium salts represented by the aforementioned general group (I-2) are bis(p-octadecyloxyphenyl) iodonium hexafluoroantimonate, (p-octadecyloxyphenyl) phenyliodonium hexafluoroantimonate, bis(p-hexadecyloxyphenyl) iodonium hexafluoroantimonate, (p-hexadecyloxyphenyl) phenyliodonium hexafluoroantimonate, benzyl-4-octadecyloxyphenyl methyliodonium hexafluoroantimonate, benzyl-4-octadecyloxyphenyl ethyliodonium hexafluoroantimonate, benzyl-4-octadecyloxyphenyl iodonium hexafluoroantimonate, bis(p-octadecyloxyphenyl) iodonium hexafluorophosphate, (p-octadecyloxyphenyl) phenyliodonium hexafluorophosphate, bis(p-hexadecyloxyphenyl) iodonium hexafluorophosphate, (p-hexadecyloxyphenyl) phenyliodonium hexafluorophosphate, benzyl-4-octadecyloxyphenyl methyliodonium hexafluorophosphate, benzyl-4-octadecyloxyphenyl ethyliodonium hexafluorophosphate, benzyl-4-octadecyloxyphenyl iodonium hexafluorophosphate, bis(p-octadecyloxyphenyl) iodonium hexafluoroarsenate, (p-octadecyloxyphenyl) phenyliodonium hexafluoroarsenate, bis(p-hexadecyloxyphenyl) iodonium hexafluoroarsenate, (p-hexadecyloxyphenyl) phenyliodonium hexafluoroarsenate, benzyl-4-octadecyloxyphenyl methyliodonium hexafluoroarsenate, benzyl-4-octadecyloxyphenyl ethyliodonium hexafluoroarsenate, benzyl-4-octadecyloxyphenyl iodonium hexafluoroarsenate, bis(p-octadecyloxyphenyl) iodonium tetrafluoroborate, (p-octadecyloxyphenyl) phenyliodonium tetrafluoroborate, bis(p-hexadecyloxyphenyl) iodonium tetrafluoroborate, (p-hexadecyloxyphenyl) phenyliodonium tetrafluoroborate, benzyl-4-octadecyloxyphenyl methyliodonium tetrafluoroborate, benzyl-4-octadecyloxyphenyl ethyliodonium tetrafluoroborate, benzyl-4-octadecyloxyphenyl iodonium tetrafluoroborate, bis(p-octadecyloxyphenyl) iodonium trifluoromethylsulfonate, (p-octadecyloxyphenyl) phenyliodonium trifluoromethylsulfonate, bis(p-hexadecyloxyphenyl) iodonium trifluoromethylsulfonate, (p-hexadecyloxyphenyl) phenyliodonium trifluoromethylsulfonate, benzyl-4-octadecyloxyphenyl methyliodonium trifluoromethylsulfonate, benzyl-4-octadecyloxyphenyl ethylsulfonium trifluoromethylsulfonate, benzyl-4-octadecyloxyphenyl iodonium trifluoromethylsulfonate, p-octadecyloxybenzyl tetramethyleneiodonium hexafluoroantimonate (4-octadecyloxyphenyl) cinnamylmethyliodonium hexafluoroantimonate, (4-octadecyloxyphenyl) (3-methyl-2-butenyl) iodonium hexafluoroantimonate, 4-octadecyloxyphenyl-(α-naphthylmethyl) iodonium hexafluoroantimonate, 4-octadecyloxyphenyl-9-fluorenyliodonium hexafluoroantimonate, bis(4-octadecyloxyphenylmethyl) iodonium hexafluoroantimonate, o-nitrobenzyl-4-octadecyloxyphenyl iodonium hexafluoroantimonate, α-phenylbenzyl-4-octadecyloxyphenyliodonium hexafluoroantimonate, α-methylbenzyl-4-octadecyloxyphenyliodonium hexafluoroantimonate, benzyl-4-octadecyloxyphenyliodonium hexafluoroantimonate, 4-octadecyloxyphenyliodonium hexafluoroantimonate and 4-octadecyloxyphenylmethyl iodonium hexafluoroantimonate.

Hexafluoroantimonate constituting the anion moiety of the aforementioned iodonium salts to be used as a curing catalyst component of this invention may be substituted by an anion selected from the group consisting of hexafluorophosphate, hexafluoroarsenate, tetrafluoroborate, any one of these anions wherein at least one fluorine atom thereof is substituted by hydroxyl group, trifluoromethane sulfonate, perchlorate, halogen, $R^1$—COO and $R^2$—$SO_3$ (wherein $R^1$ and $R^2$ are individually an alkyl group or a phenyl group, which may be substituted by an alkyl group, a halogen atom, a cyano group or an alkoxy group).

Additionally, onium salts shown below may be employed.

As for the pyrylium salt, the compounds represented by the following general formula can be employed.

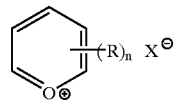

wherein Rs may be the same or different and are individually hydrogen atom, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of Rs is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms; R may include a halogen atom, nitro group or cyano group; and n is an integer of 1 to 5.

X is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, R—COO and R—$SO_3$ (wherein R is an alkyl group or a phenyl group, which may be substituted by an alkyl group, a halogen atom, a cyano group or an alkoxy group).

Specific examples of pyrylium salt represented by the above general formula are 2,6-dimethyl-4-octadecyloxyphenyl pyrylium hexafluoroantimonate, 2,6-dimethyl-3-(4-octadecyloxyphenyl) propylpyrylium hexafluoroantimonate, etc.

The mixing ratio of these pyrylium salts is generally in the range of 0.01 to 20% by weight, preferably 0.1 to 5% by weight based on the epoxy resin in the composition. If this mixing ratio is less than 0.01% by weight, it may become difficult to allow the curing of the composition to sufficiently proceed. On the other hand, when the content of the these pyrylium salts exceeds over 20% by weight, it may lead to an increase in cost and to a problem of decomposed products of the catalytic component.

As for the benzyl phosphonium salt, the compounds represented by the following general formula can be employed.

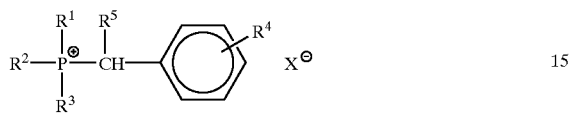

wherein $R^1$, $R^2$, $R^3$, $R^4$ and $R^5$ may be the same or different and are individually hydrogen atom, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of Rs is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms, and that $R^4$ may include a halogen atom, nitro group or cyano group; and n is an integer of 1 to 5.

X is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, R—COO and R—$SO_3$ (wherein R is an alkyl group or a phenyl group, which may be substituted by an alkyl group, a halogen atom, a cyano group or an alkoxy group).

Specific examples of benzyl phosphonium salt represented by the above general formula are benzyltris(4-octadecyloxyphenyl) phosphonium hexafluoroantimonate, α-phenylbenzyltris(4-octadecyloxyphenyl) phosphonium hexafluoroantimonate, etc.

Hexafluoroantimonate constituting the anion moiety of the aforementioned benzyl phosphonium salts to be used as a curing catalyst component of this invention may be substituted by an anion selected from the group consisting of hexafluorophosphate, hexafluoroarsenate, tetrafluoroborate, any one of these anions wherein at least one fluorine atom thereof is substituted by hydroxyl group, trifluoromethane sulfonate, perchlorate, halogen, $R^1$—COO and $R^2$—$SO_3$ (wherein $R^1$ and $R^2$ are individually an alkyl group or a phenyl group, which may be substituted by an alkyl group, a halogen atom, a cyano group or an alkoxy group).

The mixing ratio of these phosphonium salts is generally in the range of 0.01 to 20% by weight, preferably 0.1 to 5% by weight based on the epoxy resin in the composition. If this mixing ratio is less than 0.01% by weight, it may become difficult to allow the curing of the composition to sufficiently proceed. On the other hand, when the content of the these phosphonium salts exceeds over 20% by weight, it may lead to an increase in cost and to a problem of decomposed products of the catalytic component.

As for the benzyl ammonium salt, the compounds represented by the following general formula can be employed.

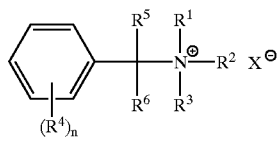

wherein $R^1$, $R^2$, $R^3$, $R^4$, $R^5$ and $R^6$ may be the same or different and are individually hydrogen atom, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of Rs is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms, that $R^5$ and $R^6$ are both constituted by hydrogen atom, one constituted by hydrogen atom and the other constituted by an alkyl group or halogen atom, or both constituted by an alkyl group or halogen atom, that where $R^5$ and $R^6$ are both constituted by hydrogen atom, at least one of $R^1$, $R^2$ and $R^3$ is preferably an aromatic group or a heteroaromatic group, and that $R^4$ may include a halogen atom, nitro group or cyano group; and n is an integer of 1 to 5.

X is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, R—COO and R—$SO_3$ (wherein R is an alkyl group or a phenyl group, which may be substituted by an alkyl group, a halogen atom, a cyano group or an alkoxy group).

Specific examples of benzyl ammonium salt represented by the above general formula are N-(p-octadecyloxybenzyl)-N,N-dimethylanilinium hexafluoroantimonate, N-(p-octadecyloxybenzyl)-N,N-dimethylanilinium hexafluorophosphate, N-(p-octadecyloxybenzyl)-N,N-dimethylanilinium tetrafluoroborate, N-(α-methyl-p-octadecyloxybenzyl)-N,N-dimethylanilinium hexafluoroantimonate, N-(2-hydroxyethyl)-N-(α-methyl-p-octadecyloxybenzyl)-N-dimethylammonium hexafluoroantimonate, etc.

The mixing ratio of these ammonium salts is generally in the range of 0.01 to 20% by weight, preferably 0.1 to 5% by weight based on the epoxy resin in the composition. If this mixing ratio is less than 0.01% by weight, it may become difficult to allow the curing of the composition to sufficiently proceed. On the other hand, when the content of the these ammonium salts exceeds over 20% by weight, it may lead to an increase in cost and to a problem of decomposed products of the catalytic component.

Among the aforementioned benzyl ammonium salts, an anilinium salt wherein one of $R^1$, $R^2$ and $R^3$ is represented by a substituted or unsubstituted phenyl group and wherein at least one out of remaining two of $R^1$, $R^2$ and $R^3$ has a substituted alkyl group which is attached to a carbon atom of β-position of nitrogen atom is also useful.

As for the benzyl pyridinium salt, the compounds represented by the following general formulas can be employed.

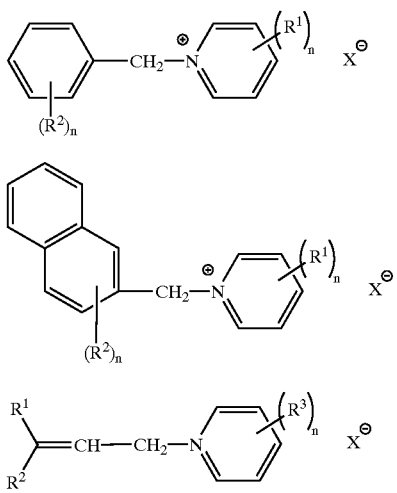

(A)

(B)

(C)

wherein $R^1$, $R^2$ and $R^3$ may be the same or different and are individually hydrogen atom, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of Rs is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms, and that $R^1$ may include a cyano group, $R^2$ may include a halogen atom, nitro group or cyano group; and n is an integer of 1 to 5.

X is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, R—COO and R—$SO_3$ (wherein R is an alkyl group or a phenyl group, which may be substituted by an alkyl group, a halogen atom, a cyano group or an alkoxy group).

Specific examples of benzyl pyridinium salt (A) represented by the above general formula are 1-(p-octadecyloxybenzyl)-4-cyanopyridinium hexafluoroantimonate, 1-(p-octadecyloxybenzyl)-4-cyanopyridinium hexafluorophosphate, 1-(p-octadecyloxybenzyl)-4-cyanopyridinium tetrafluoroborate, etc.

Specific examples of benzyl pyridinium salt (B) represented by the above general formula are α-naphthylmethyl-(4-octadecyloxy) pyridinium hexafluoroantimonate, α-naphthylmethyl-(4-octadecyloxy) pyridinium hexafluorophosphate, α-naphthylmethyl-(4-octadecyloxy) pyridinium tetrafluoroborate, etc.

Specific examples of benzyl pyridinium salt (C) represented by the above general formula are cinnamyl-(4-octadecyloxy) pyridinium hexafluoroantimonate, 2-butenyl-(4-octadecyloxy) pyridinium hexafluoroantimonate, cinnamyl-(4-octadecyloxy) pyridinium hexafluorophosphate, cinnamyl-(4-octadecyloxy) pyridinium tetrafluoroborate, etc.

The mixing ratio of these pyridinium salts is generally in the range of 0.01 to 20% by weight, preferably 0.1 to 5% by weight based on the epoxy resin in the composition. If this mixing ratio is less than 0.01% by weight, it may become difficult to allow the curing of the composition to sufficiently proceed. On the other hand, when the content of the these pyridinium salts exceeds over 20% by weight, it may lead to an increase in cost and to a problem of decomposed products of the catalytic component.

As for the benzothiazolium salt, the compounds represented by the following general formula can be employed.

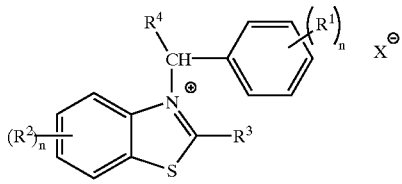

wherein $R^1$, $R^2$ and $R^3$ may be the same or different and are individually hydrogen atom, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of Rs is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms, and that $R^1$ and $R^2$ may include nitro group; $R^4$ is hydrogen atom, an aromatic group or a heteroaromatic group; n is an integer of 1 to 5; m is an integer of 1 to 4. The atom S in the thiazolium ring may be substituted by an oxygen atom.

X is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, R—COO and R—$SO_3$ (wherein R is an alkyl group or a phenyl group, which may be substituted by an alkyl group, a halogen atom, a cyano group or an alkoxy group).

It is possible to employ the compounds represented by the following general formula.

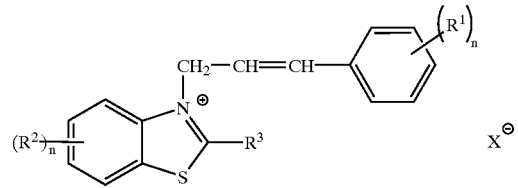

wherein $R^1$, $R^2$ and $R^3$ may be the same or different and are individually hydrogen atom, a halogen atom, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of Rs is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms, and that $R^1$ and $R^2$ may include nitro group; n is an integer of 1 to 5; m is an integer of 1 to 4. The atom S in the thiazolium ring may be substituted by an oxygen atom.

X is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, R—COO and R—$SO_3$ (wherein R is an alkyl group or a phenyl group, which may be substituted by an alkyl group, a halogen atom, a cyano group or an alkoxy group).

Specific examples of benzothiazolium salt represented by the above general formula are 3-(p-octadecyloxybenzyl) benzothiazolium hexafluoroantimonate, 3-(p-octadecyloxybenzyl)-2-methylthiobenzothiazolium hexafluoroantimonate, 3-(p-octadecyloxybenzyl) benzothiazolium hexafluorophosphate, 3-(p-octadecyloxybenzyl) benzothiazolium tetrafluoroborate, etc.

The mixing ratio of these benzothiazolium salts is generally in the range of 0.01 to 20% by weight, preferably 0.1 to 5% by weight based on the epoxy resin in the composition. If this mixing ratio is less than 0.01% by weight, it may become difficult to allow the curing of the composition to sufficiently proceed.

On the other hand, when the content of the these benzothiazolium salts exceeds over 20% by weight, it may lead to an increase in cost and to a problem of decomposed products of the catalytic component.

As for the quinolinium salt, the compounds represented by the following general formula can be employed.

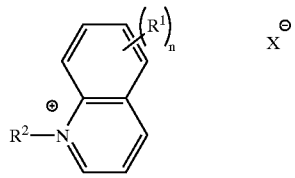

wherein $R^1$s may be the same or different and are individually hydrogen atom, a halogen atom, nitro group, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of Rs is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms; $R^2$ is a group selected from the group consisting of an aromatic or heteroaromatic group-substituted alkyl and an unsaturated linkage (ethylene, acetylene, etc.)-substituted alkyl; and n is an integer of 1 to 7.

X is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, R—COO and R—$SO_3$ (wherein R is an alkyl group or a phenyl group, which may be substituted by an alkyl group, a halogen atom, a cyano group or an alkoxy group).

Specific examples of quinolinium salt represented by the above general formula are N-benzyl-(5-octadecyloxy) quinolinium hexafluoroantimonate, N-(1-naphthylmethyl)-5-octadecyloxyquinolinium hexafluoroantimonate, N-cinnamyl-5-octadecyloxy quinolinium hexafluoroantimonate, etc.

The mixing ratio of these quinolinium salts is generally in the range of 0.01 to 20% by weight, preferably 0.1 to 5% by weight based on the epoxy resin in the composition. If this mixing ratio is less than 0.01% by weight, it may become difficult to allow the curing of the composition to sufficiently proceed. On the other hand, when the content of the these quinolinium salts exceeds over 20% by weight, it may lead to an increase in cost and to a problem of decomposed products of the catalytic component.

As for the pyrrolinium salt, the compounds represented by the following general formula can be employed.

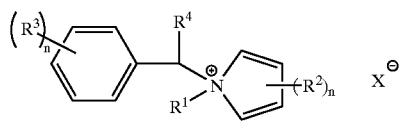

wherein $R^1$, $R^2$ and $R^3$ may be the same or different and are individually hydrogen atom, a halogen atom, nitro group, a substituted or unsubstituted hydrocarbon group having 1 to 30 carbon atoms, an aromatic group having a substituted or unsubstituted hydrocarbon group, or a heteroaromatic group having a substituted or unsubstituted hydrocarbon group, with a proviso that at least one of Rs is a substituted or unsubstituted hydrocarbon group having 10 or more carbon atoms, an aromatic group having a substituted or unsubstituted hydrocarbon group having 10 or more carbon atoms, or a heteroaromatic group having a substituted or unsubstituted hydrocarbon group having 10 or more carbon atoms; $R^4$ is hydrogen atom or an alkyl group; n is an integer of 1 to 7.

X is an anion selected from the group consisting of $SbF_6$, $AsF_6$, $PF_6$, $BF_4$, anion derivatives of these fluorides wherein at least one fluorine atom is substituted by hydroxyl group, $CF_3SO_3$, $ClO_4$, a halogen atom, R—COO and R—$SO_3$ (wherein R is an alkyl group or a phenyl group, which may be substituted by an alkyl group, a halogen atom, a cyano group or an alkoxy group).

Specific examples of pyrrolinium salt represented by the above general formula are N-(4-octadecyloxybenzyl)-N-methylpyrrolinium hexafluoroantimonate, N-benzyl-N-4-octadecyloxyphenylpyrrolinium hexafluoroantimonate, N-(4-octadecyloxybenzyl)-N-methylpyrrolinium hexafluorophosphate, etc.

The mixing ratio of these pyrrolinium salts is generally in the range of 0.01 to 20% by weight, preferably 0.1 to 5% by weight based on the epoxy resin in the composition. If this mixing ratio is less than 0.01% by weight, it may become difficult to allow the curing of the composition to sufficiently proceed. On the other hand, when the content of the these pyrrolinium salts exceeds over 20% by weight, it may lead to an increase in cost and to a problem of decomposed products of the catalytic component.

Examples of organosilicon compounds represented by the aforementioned general group (I-4) are tris(p-hexadecyloxyphenyl) silanol, tris(p-octadecyloxyphenyl) silanol, tris(p-dococyloxyphenyl) silanol, tris(m-hexadecyloxyphenyl) silanol, tris(m-octadecyloxyphenyl) silanol, tris(m-dococyloxyphenyl) silanol, bis(p-hexadecyloxyphenyl) silanediol, bis(p-octadecyloxyphenyl) silanediol, bis(p-dococyloxyphenyl) silanediol, bis(m-hexadecyloxyphenyl) silanediol, bis(m-octadecyloxyphenyl) silanediol, bis(m-dococyloxyphenyl)

silanediol, bigs(p-hexadecyloxyphenyl) methylsilanol, bigs(p-hexadecyloxyphenyl) ethylsilanol, bigs(p-hexadecyloxyphenyl) propylsilanol, bis(m-hexadecyloxyphenyl) methylsilanol, big(m-hexadecyloxyphenyl) ethylsilanol, bis(m-hexadecyloxyphenyl) propylsilanol, tris(6-hexadecyloxynaphthyl) silanol, tris(6-octadecyloxynaphthyl) silanol, tris(6-dococyloxynaphthyl) silanol, bis(6-hexadecyloxynaphthyl) silanediol, bis(6-octadecyloxynaphthyl) silanediol, and bis(6-dococyloxynaphthyl) silanediol.

The organosilicon compounds represented by the aforementioned general group (I-4) may be substituted by a hydrolyzable group in place of hydroxyl group. Alternatively, the organosilicon compounds represented by the aforementioned general group (I-4) may include a substituent group which is capable of generating silanol as it is irradiated with light. Any of these organosilicon compounds can be employed as a component of the first curing catalyst of this invention.

The "hydrolyzable group" to be employed in this case is a residual group which can be directly bonded to silicon atom and can be hydrolyzed at a predetermined temperature or more in the presence of water thereby producing a silanolic hydroxyl group represented by the following chemical formula.

$\equiv$Si—OH

Examples of hydrolyzable group are alkoxyl group having 1 to 5 carbon atoms; aryloxy group such as phenoxy group, tolyloxy group, paramethoxyphenoxy group, paranitrophenoxy group, benzyloxy group and parachlorophenoxy group; acyloxy group such as acetoxy group, propionyloxy group, butanoyloxy group, benzoyloxy group, phenylacetoxy group and formyloxy group; alkenyloxy group having 2 to 12 carbon atoms such as vinyloxy group and allyloxy group; aralkyloxy group such as benzyloxy group and phenethyloxy group; and a group represented by the following general formula:

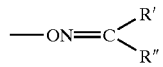

—ON=C$<^{R'}_{R''}$ wherein R' and R'' may be the same or different and are alkyl groups having 1 to 5 carbon atoms.

On the other hand, as for the silicon compounds having a substituent group which is capable of generating silanol as it is irradiated with light, silicon compounds having peroxysilano group, o-nitrobenzyloxy group or α-ketosilyl group can be preferably employed.

The silicon compounds having the aforementioned peroxysilano group can be represented by the following general formula (SI-PO):

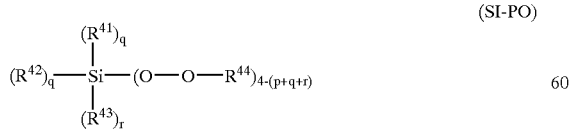

$$(R^{42})_q-\underset{\underset{(R^{43})_r}{|}}{\overset{\overset{(R^{41})_q}{|}}{Si}}-(O-O-R^{44})_{4-(p+q+r)} \quad \text{(SI-PO)}$$

wherein $R^{41}$, $R^{42}$ and $R^{43}$ may be the same or different and are individually hydrogen atom, substituted or unsubstituted hydrocarbon groups having 1 to 30 carbon atoms, or substituted or unsubstituted aromatic or heteroaromatic groups with a proviso that these Rs include at least one substituted or unsubstituted hydrocarbon group having 10 or more carbon atoms or include at least one substituted or unsubstituted aromatic or heteroaromatic group having a substituted or unsubstituted hydrocarbon group having 10 or more carbon atoms; $R^{44}$ is hydrogen atom, a halogen atom, alkyl group having 1 to 5 carbon atoms, alkoxy group having 1 to 5 carbon atoms, aryl group or aralkyl group; and p, q and r are integers of 0 to 3 with a proviso that p+q+r is in the range of 1 to 3.

As for the substituted or unsubstituted hydrocarbon group and the substituted or unsubstituted aromatic or heteroaromatic group that are to be introduced into $R^{41}$, $R^{42}$ and $R^{43}$, these groups may be the same as those to be introduced into $R^{11}$ to $R^{18}$ of the aforementioned general formulas (I-1) to (I-5).

As for the halogen atoms to be introduced into $R^{44}$ in the aforementioned general formula, chlorine atom or bromine atom can be employed. Likewise, the alkyl group having 1 to 5 carbon atoms that is to be introduced into $R^{44}$ may be methyl, ethyl, n-propyl, isopropyl, n-butyl, isobutyl, sec-butyl, tert-butyl, n-pentyl, isopentyl or neopentyl group. Further, the alkoxy group having 1 to 5 carbon atoms that is to be introduced into $R^{44}$ may be methoxy, ethoxy, n-propoxy, n-butoxy, sec-butoxy, tert-butoxy or n-pentyloxy group. The aryl group to be introduced into $R^{44}$ may be phenyl, naphthyl or anthranyl group, and aralkyl group to be introduced into $R^{44}$ may be benzyl or phenethyl. By the way, these groups may contain a substituent group such as halogen atom, nitro group, cyano group, methoxy group, etc.

Specific examples of the silicon compounds having a peroxysilano group are the following compounds.

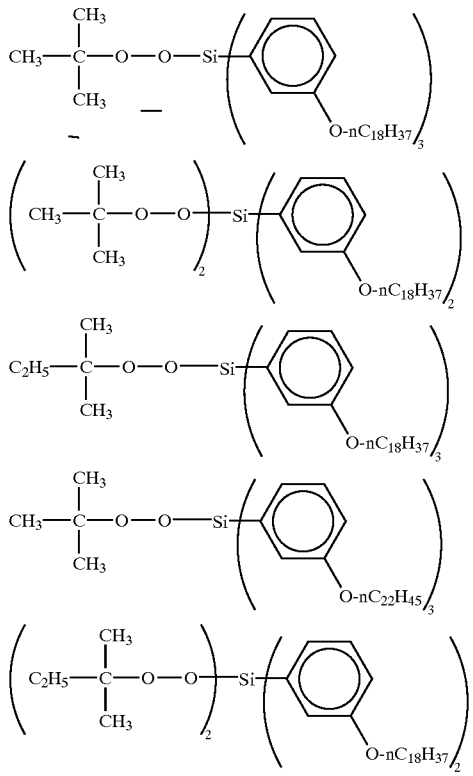

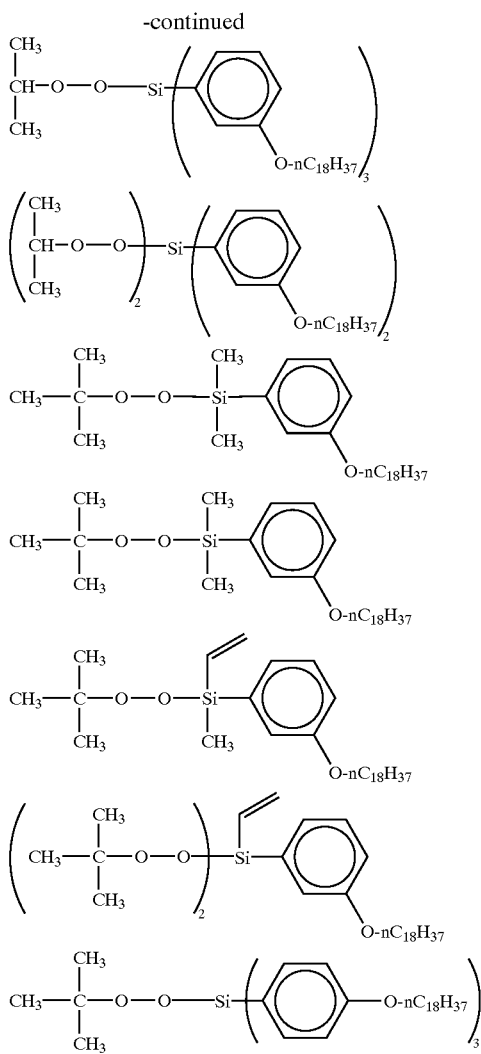

The silicon compounds having the aforementioned o-nitrobenzyloxy group can be represented by the following general formula (SI-NB):

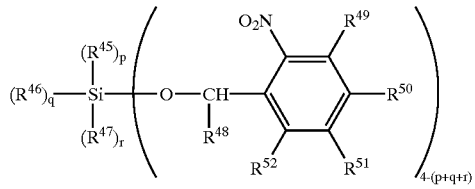

(SI-NB)

wherein $R^{45}$, $R^{46}$ and $R^{47}$ may be the same or different and are individually hydrogen atom, substituted or unsubstituted hydrocarbon groups having 1 to 30 carbon atoms, or substituted or unsubstituted aromatic or heteroaromatic groups with a proviso that these Rs include at least one substituted or unsubstituted hydrocarbon group having 10 or more carbon atoms or include at least one substituted or unsubstituted aromatic or heteroaromatic group having a substituted or unsubstituted hydrocarbon group having 10 or more carbon atoms; $R^{48}$ is hydrogen atom, substituted or unsubstituted alkyl group having 1 to 10 carbon atoms, phenyl group or substituted phenyl group; $R^{49}$, $R^{50}$, $R^{51}$ and $R^{52}$ may be the same or different and are individually hydrogen atom, nitro group, cyano group, hydroxyl group, mercapto group, halogen atoms, acetyl group, allyl group, alkyl group having 1 to 5 carbon atoms, alkoxy group having 1 to 5 carbon atoms, substituted or unsubstituted aryl group or aryloxy group; and p, q and r are integers of 0 to 3 with a proviso that p+q+r is in the range of 1 to 3.

As for the substituted or unsubstituted hydrocarbon group and the substituted or unsubstituted aromatic or heteroaromatic group that are to be introduced into $R^{45}$, $R^{46}$ and $R^{47}$, these groups may be the same as those to be introduced into $R^{11}$ to $R^{18}$ of the aforementioned general formulas (I-1) to (I-5).

As for the substituted or unsubstituted alkyl group having 1 to 10 carbon atoms (or 1 to 5 carbon atoms) that is to be introduced into the aforementioned general formula, it may be methyl, ethyl, n-propyl, n-butyl, tert-butyl, n-pentyl, chloromethyl, chloroethyl, fluoromethyl or cyanomethyl group. Further, the alkoxy group having 1 to 10 carbon atoms (or 1 to 5 carbon atoms) that is to be introduced into the aforementioned general formula may be methoxy, ethoxy, n-propoxy or n-butoxy group. The substituted or unsubstituted aryl group to be introduced into the aforementioned general formula may be phenyl, p-methoxyphenyl, p-chlorophenyl or p-trifluoromethylphenyl group. The aryloxy group to be introduced into the aforementioned general formula may be phenoxy group.

Specific examples of the silicon compounds having o-nitrobenzyloxy group include tris(p-hexadecyloxyphenyl) (o-nitrobenzyloxy) silane, bis(p-hexadecyloxyphenyl)(o-nitrobenzyloxy) methylsilane, vinylmethyl (p-hexadecyloxyphenyl)(o-nitrobenzyloxy) silane, t-butylmethyl (p-hexadecyloxyphenyl)(o-nitrobenzyloxy) silane, bis(p-hexadecyloxyphenyl) bis(o-nitrobenzyloxy) silane, methyl (p-hexadecyloxyphenyl) bis(o-nitrobenzyloxy) silane, t-butyl (p-hexadecyloxyphenyl) bis (o-nitrobenzyloxy) silane, tris(p-hexadecyloxyphenyl) (3,4, 5-trimethoxy-2-nitrobenzyloxy) silane, tris(p-hexadecyloxyphenyl) (4,5,6-trimethoxy-2-nitrobenzyloxy) silane, tris(p-hexadecyloxyphenyl) (5-methyl-4-methoxy-2-nitrobenzyloxy) silane, tris(p-hexadecyloxyphenyl) (4,5-dimethyl-2-nitrobenzyloxy) silane, and tris(p-hexadecyloxyphenyl)(2,6-dinitrobenzyloxy) silane.

The silicon compounds having the aforementioned α-ketosilyl group can be represented by the following general formula (SI-KS):

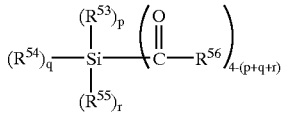

(SI-KS)

wherein $R^{53}$, $R^{54}$ and $R^{55}$ may be the same or different and are individually hydrogen atom, substituted or unsubstituted hydrocarbon groups having 1 to 30 carbon atoms, or substituted or unsubstituted aromatic or heteroaromatic groups with a proviso that these Rs include at least one substituted or unsubstituted hydrocarbon group having 10 or more carbon atoms or include at least one substituted or unsubstituted aromatic or heteroaromatic group having a substituted or unsubstituted hydrocarbon group having 10 or more carbon atoms; $R^{56}$ is hydrogen atom, vinyl group, allyl group, alkyl group having 1 to 10 carbon atoms, alkoxy group having 1 to 10 carbon atoms, aryl group or aryloxy group; and p, q and r are integers of 0 to 3 with a proviso that p+q+r is in the range of 1 to 3.

As for the substituted or unsubstituted hydrocarbon group and the substituted or unsubstituted aromatic or heteroaromatic group that are to be introduced into $R^{53}$, $R^{54}$ and $R^{55}$, these groups may be the same as those to be introduced into $R^{11}$ to $R^{18}$ of the aforementioned general formulas (I-1) to (I-5).

As for the alkyl group having 1 to 10 carbon atoms that is to be introduced into $R^{56}$, it may be methyl, ethyl, n-propyl, n-butyl, tert-butyl, n-pentyl, neopentyl, n-hexyl, n-heptyl or n-octyl group. Further, the alkoxy group having 1 to 10 carbon atoms that is to be introduced into $R^{56}$ may be methoxy, ethoxy, n-propoxy, n-butoxy group, tert-butoxy, n-pentyloxy, neopentyloxy, n-hexyloxy, n-heptyloxy or n-octyloxy. The aryl group to be introduced into $R^{56}$ may be phenyl or naphthyl group. The aryloxy group to be introduced into $R^{56}$ may be phenoxy or naphthyloxy group.

By the way, these groups may contain a substituent group such as halogen atom, nitro group, cyano group, methoxy group, etc.

Specific examples of the silicon compounds having α-Ketosilyl group are the following compounds.

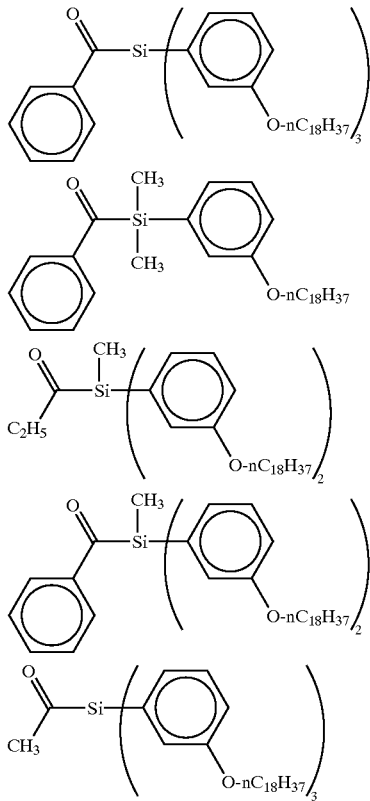

The silicon compounds which are capable of generating silanol as it is irradiated with light can be employed singly or in combination of two or more kinds in the composition. The content of the silicon compounds in the composition may be generally in the range of 0.001 to 20% by weight, more preferably in the range of 0.1 to 10% by weight. If the content of the silicon compounds is less than 0.001% by weight, it may become insufficient to cure the composition. On the other hand, although it is possible to employ the silicon compounds in excess of 20% by weight, it may lead to an increase in cost or the generation of decomposed materials of the catalyst, thus raising undesirable problems.

Specific examples of the compounds represented by the aforementioned general formula (I-5) include bis(4-hydroxyphenyl) sulfone monooctadecylether, bis(4-hydroxy-3-octadecyloxyphenyl) sulfone, bis(4-hydroxyphenyl) sulfide monooctadecylether, (4-hydroxyphenyl) octadecylsulfone, 4,4'-dihydroxydiphenylether monooctadecylether, and bis(2-(6-hydroxyphenyl)) sulfone monooctadecylether.

These compounds can be employed singly or in combination of two or more kinds in the composition. The content of the compounds in the composition may be generally in the range of 0.01 to 20% by weight, more preferably in the range of 0.5 to 10% by weight. If the content of the compounds is less than 0.01% by weight, it may become insufficient to cure the composition. On the other hand, although it is possible to employ the compounds in excess of 20% by weight, it may lead to an increase in cost or to a deterioration in physical property of the resultant product.

Among the aforementioned cationic curing catalyst components, the organosilicon compounds represented by the general formula (I-4) and the compounds represented by the general formula (I-5) are employed in combination with organometal compounds represented by the general formula (II-1), (II-2) or (II-3). In this case, it is required that only at least one component out of these catalyst components is capable of reversibly repeating the dissolution and precipitation in the process of heating and cooling, so that the other components may not be capable of reversibly repeating the dissolution and precipitation. Therefore in this case, the compounds represented by the general formulas (I-4) and (I-5) and the organometal compounds represented by the general formulas (II-1), (II-2) and (II-3) may not be required to include at least one substituted or unsubstituted hydrocarbon group having 10 or more carbon atoms nor to include at least one substituted or unsubstituted aromatic or heteroaromatic group having a substituted or unsubstituted hydrocarbon group having 10 or more carbon atoms.

Specifically, compounds such as diphenylsilane diol, triphenyl silanol, etc. can be employed as a organosilicon compound represented by the aforementioned general group (I-4); and compounds such as bis(4-hydroxyphenyl) sulfone, cyanophenol, nitrophenol, 2,2-dihydroxyphenyl propane, catechol, P,P'-biphenol, resorcinol, etc. can be employed as a compound represented by the aforementioned general group (I-5). Further, as an iron aromatic compound represented by the aforementioned general group (I-3), a structurally simple compound such as tris(ethylacetoacetate) aluminum, tris(ethylacetonate) aluminum, tris(salicylaldehydate) aluminum, etc. can be employed.

Further, a sulfonium salt represented by the aforementioned general group (I-1) and an iodonium salt represented by the aforementioned general group (I-2) may be employed in combination with organometal compounds represented by the general formula (II-1), (II-2) or (II-3). In this case, as mentioned above, these metallic compounds are not be required to include at least one substituted or unsubstituted hydrocarbon group having 10 or more carbon atoms nor to include at least one substituted or unsubstituted aromatic or heteroaromatic group having a substituted or unsubstituted hydrocarbon group having 10 or more carbon atoms.

The sulfonium salts represented by the general group (I-1), the iodonium salts represented by the general group (I-2) and the iron aromatic compounds represented by the general formula (I-3) are capable of being activated not only by heat but also by an irradiation such as light and electron beam. Namely, when these sulfonium salts, iodonium salts and iron aromatic compounds are excited by heat or electron beam, they act as a curing catalyst to promote the polymerization of a cationic polymerizable substance. The resin composition of this invention is formulated by suitably mixing these catalysts with a cationic polymerizable substance.

In the case where this cationic polymerizable substance is a vinyl compound, a solution polymerization method employing a solvent which is inert to the catalyst or monomer is generally employed as a polymerization method according to this invention. However, it is also possible, if desirable, to employ a bulk polymerization method.

The solvents to be employed in this case may be aromatic hydrocarbons such as toluene, benzene and xylene; aliphatic hydrocarbons such as n-hexane, n-heptane, etc.; alicyclic hydrocarbons such as cyclohexane; a hydrocarbon mixture such as petroleum ether and ligroin; and halogenated hydrocarbons such as chlorobenzene and dichloroethane. The polymerization reaction of these vinyl compounds can be performed under atmospheric pressure or pressurized conditions at a reaction temperature of 20° C. or more, more preferably at a temperature of 60 to 150° C. which can be easily realized in industrial viewpoints.

Further, since these sulfonium salts, the iodonium salts and the iron aromatic compounds which are to be employed as a polymerization catalyst in this invention are incapable of initiating a cationic polymerization reaction under room temperature, it is possible, if desired, to store these catalysts together with a monomer in the form of one-pack in advance.

The content of these sulfonium salts, the iodonium salts and the iron aromatic compounds which are to be employed in this invention may be in the range of 0.01 to 20 parts by weight, more preferably in the range of 0.1 to 5 parts by weight per 100 parts by weight of the resin. If the content of these compounds is less than 0.01 part by weight, it may be impossible to obtain a sufficiently polymerized product. On the other hand, if the content of these compounds is in excess of 20 parts by weight, it may lead to an increase in cost or a deterioration in physical property of the polymerized product.

Next, the details on the organometal compounds constituting the other component of the first curing catalyst of this invention will be explained. As representative organometal compounds to be employed in this invention, the following compounds represented by the following general formulas (II-1), (II-2) and (II-3) can be exemplified.

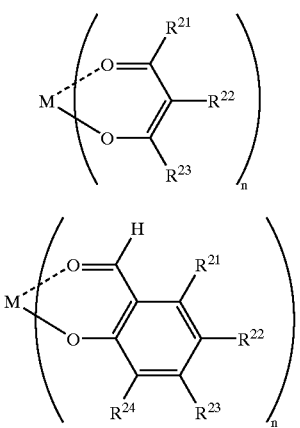

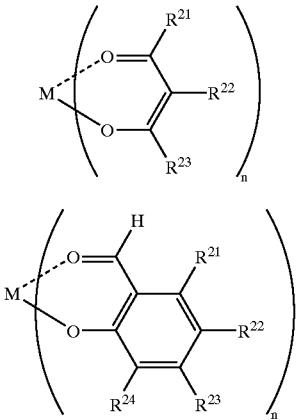

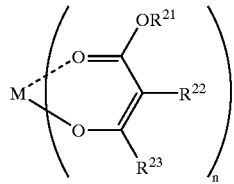

wherein $R^{21}$, $R^{22}$, $R^{23}$ and $R^{24}$ may be the same or different and are individually hydrogen atom, substituted or unsubstituted hydrocarbon groups having 1 to 30 carbon atoms with a proviso that one ligand thereof contains at least one substituted or unsubstituted hydrocarbon group having 10 or more carbon atoms, which is represented by $R^{21}$, $R^{22}$, $R^{23}$ and $R^{24}$; M is an element selected from the group consisting of Al, Ti, Cr, Mn, Fe, Co, Ni, Cu, Zr, Zn, Ba, Ca, Ce, Pb, Mg, Sn and v; and n is an integer of 2 to 4.

Specific examples of the compounds represented by the aforementioned general formulas (II-1), (II-2) and (II-3) include tris(octadecylacetoacetate) aluminum, tris(hexadecylacetoacetate) aluminum, tris(tetradecylacetoacetate) aluminum, tris(dodecylacetoacetate) aluminum, tris(octylsalicylaldehyde) aluminum, tris(3-octadecylacetylacetate) aluminum, and the compounds represented by the following chemical formulas.

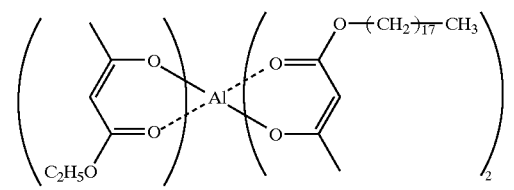

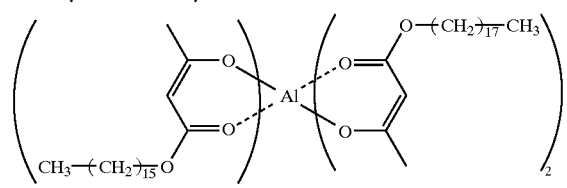

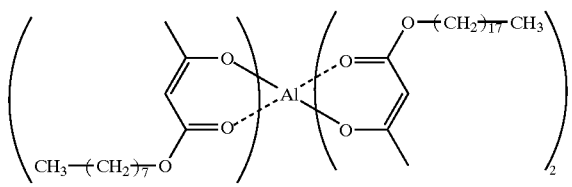

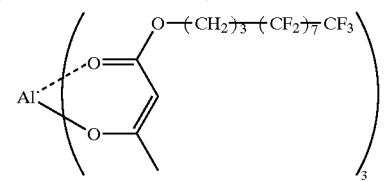

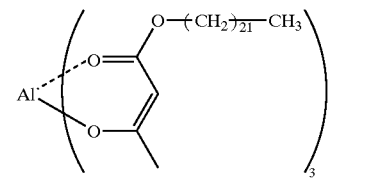

-continued

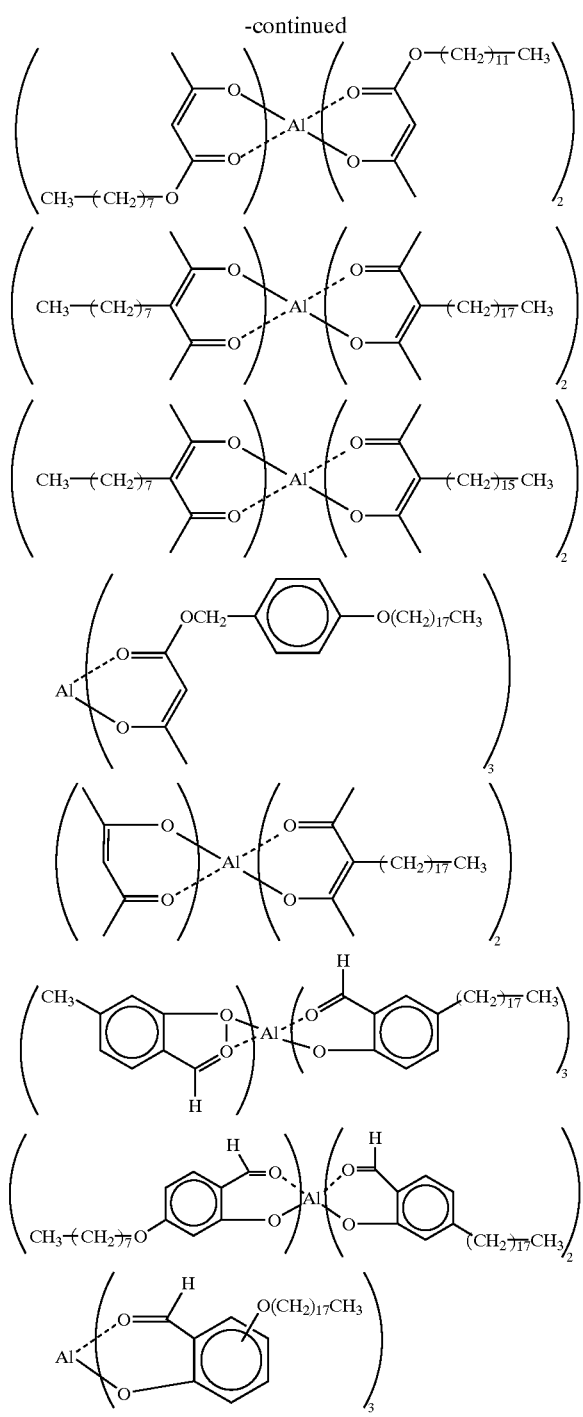

Additionally, chelate compounds where the aluminum in the aforementioned chemical formulas is replaced by Ti, Cr, Mn, Fe, Co, Ni, Cu, Zr or Zn may be also employed as a component of the first curing catalyst of this invention.

It is not required, in the compounds represented by the aforementioned general formulas (II-1), (II-2) and (II-3), that the bonding hand of metal atom (M) is coupled with all of the ligands, so that the bonding hand of metal atom (M) may be coupled, instead of the ligands, with only one alkoxy group, phenoxy group or acyloxy group. Alternatively, all of the bonding hands of metal atom may be coupled with these groups.

These organometal compounds can be employed singly or in combination of two or more kinds in the composition. The content of the organometal compounds in the composition may be generally in the range of 0.01 to 20% by weight, more preferably in the range of 0.5 to 10% by weight. If the content of the organometal compounds is less than 0.01% by weight, it may become insufficient to cure the composition. On the other hand, although it is possible to employ the organometal compounds in excess of 20% by weight, it may lead to an increase in cost or to a deterioration in physical property of the resultant product. If these organometal compounds are employed, ionic substances would be scarcely left remained in the resin after the curing thereof.

Since the first curing catalyst according to this invention comprises at least one of the aforementioned cationic curing catalyst component and an organometal compound, the first curing catalyst may contain only either one of these components, i.e. the other component being omitted. For example, the organometal compound may be combined with the following other components thereby to constitute the first curing catalyst of this invention. Such other components to be employed together with the organometal compound may be at least one kind of compound selected from the group consisting of organosilane having a hydroxyl group bonded directly to a silicon atom, organosiloxane having a hydroxyl group bonded directly to a silicon atom, and a phenol compound.

Details on the organosilane having a hydroxyl group bonded directly to a silicon atom, the organosiloxane having a hydroxyl group bonded directly to a silicon atom, and the phenol compound will be explained as follows.

Either the organosilicon compounds having a hydrolyzable group bonded directly to a silicon atom or the silicon compounds which is capable of generating silanol as they are irradiated with light can be also employed in combination with the aforementioned organometal compounds thereby to obtain the first curing catalyst.

The "hydrolyzable group" in this case is a residual group which can be directly bonded to silicon atom as explained with reference to the group that can be introduced into the aforementioned general formula (I-4). Therefore, the same groups as mentioned above can be employed.

The organosilane to be employed in this case can be represented by the following general formula (S-1).

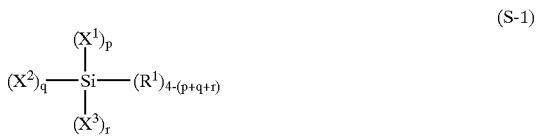

(S-1)

wherein $R^1$ is hydroxyl or hydrolyzable group; $X^1$, $X^2$ and $X^3$ may be the same or different and are individually alkyl group having 1 to 12 carbon atoms; aryl group such as phenyl group, tolyl group, paramethoxyphenyl group, parachlorophenyl group and paranitrophenyl group; aralkyl group such as benzyl group, phenethyl group, paramethoxybenzyl group and paramethylbenzyl group; alkenyl group such as vinyl group, allyl group, propenyl group and butenyl group; and acyl group such as acetyl group, benzoyl group and trifluoroacetyl group; and p, q and r are integers of 0 to 3 with a proviso that p+q+r is not more than 3.

More preferable examples of the organosilane in the first curing catalyst are silanols such as diphenyl silanediol, triphenyl silanol, diphenyl(methyl) silanol, phenyl(vinyl) silanediol, tri(paramethoxyphenyl) silanol, triacetyl silanol, diphenyl(ethyl) silanol, diphenyl(propyl) silanol, tri (paranitrophenyl) silanol, phenyldivinyl silanol, 2-butenyldiphenyl silanol, di(2-pentenyl)phenyl silanol, phenyldipropyl silanol, paramethylbenzyldimethyl silanol, triethyl silanol, trimethyl silanol, tripropyl silanol, tributyl silanol and triisobutyl silanol. Examples of the organosilane having a hydrolyzable group are triphenyl(methoxy) silane, diphenyldimethoxy silane, triphenyl(ethoxy) silane, diphenyl(methyl)methoxy silane, phenyl(vinyl)(methyl) (methoxy) silane, diphenyldiethoxy silane, tri (paramethoxyphenyl)methoxy silane, triacetyl(methoxy) silane, diphenyl(ethyl)(ethoxy) silane, diphenyl(propyl) (ethoxy) silane, diphenyl(ethyl)(acetoxy) silane, diphenyl-dipropionyloxy silane, diphenyl(methyl)(triphenylacetoxy) silane, tri(paranitrophenyl)(methoxy) silane, triacetyl (methoxy) silane, phenyldivinyl(propoxy) silane, 2-butenyldiphenyl(methoxy) silane, di(2-pentenyl)(phenyl) (ethoxy) silane, phenyldipropyl(methoxy) silane, tri (paramethoxyphenyl)(ethoxy) silane, paramethylbenzyltri-methoxy silane, trifluoroacetyltrimethoxy silane, di(parachlorophenyl)diethoxy silane, triethyl(methoxy) silane, trimethyl(methoxy) silane, tripropyl(methoxy) silane, tributyl(ethoxy) silane, triisobutyl(acetoxy) silane, and the compounds represented by the following chemical formulas:

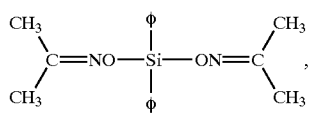

(φ = phenyl)

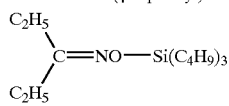

In addition to the above examples, organosilane having both hydroxyl group and hydrolyzable group can be of course employed.

This organosilane having a hydroxyl group or hydrolyzable group which is directly bonded to silicon atom can be employed singly or in combination of two or more kinds in the composition. The content of the organosilane in the composition may be generally in the range of 0.001 to 20% by weight, more preferably in the range of 0.01 to 10% by weight based on the quantity of epoxy resin. If the content of the organosilane is less than 0.001% by weight, it may become insufficient to cure the composition. On the other hand, although it is possible to employ the organosilane in excess of 20% by weight, it may lead to an increase in cost or to the generation of undesirable decomposition products of the catalyst component.

The organosiloxanes to be preferably employed for the first curable catalyst of this invention are formed of straight-chain (which may contain branched chains) or cyclic siloxane, which is constituted by a bifunctional unit represented by the following formula (S-2) and/or a trifunctional unit represented by the following formula (S-3). Depending on some circumstances, the organosiloxanes may contain a tetrafunctional unit represented by the following formula (S-4). When this organosiloxane is terminated by a siloxane chain, this terminal portion is sealed with a monofunctional unit represented by the following formula (S-5), and particularly, at least one of the constituent units contains at least one hydroxyl group or at least one hydrolyzable group.

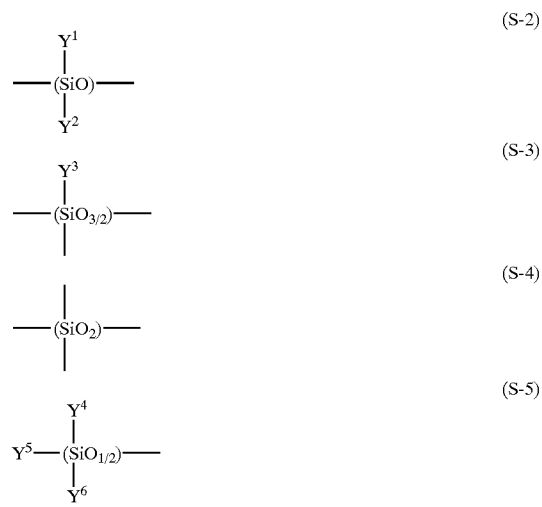

wherein $y^1$, $y^2$, $y^3$, $y^4$, $y^5$ and $y^6$ may be the same or different and are individually hydroxyl group or hydrolyzable group; alkyl group having 1 to 12 carbon atoms; aryl group such as phenyl group, tolyl group, paramethoxyphenyl group, parachlorophenyl group and paracyanophenyl group; aralkyl group such as benzyl group, phenethyl group, paramethoxybenzyl group and paramethylbenzyl group; alkenyl group such as vinyl group, allyl group, propenyl group and butenyl group; and acyl group such as acetyl group, benzoyl group and trifluoroacetyl group.

Among these organosiloxanes, those having a polymerization degree of 50 or less and having an equivalent weight, with respect to hydroxyl group or hydrolyzable group, of 1000 or less, more preferably in the range of 50 to 500 are more preferable.

Preferable examples of this organosiloxane (having hydroxyl group) are 1,3-dihydroxy-1,3-dimethyl-1,3-diphenyl disiloxane, 1,5-dihydroxy-1,3,5-trimethyl-1,3,5-triphenyl trisiloxane, 1,7-dihydroxy-1,3,5,7-tetramethyl-1,3,5,7-tetraphenyl tetrasiloxane, 1,3-dihydroxytetraphenyl disiloxane, 1,5-dihydroxyhexaphenyl trisiloxane, 1,7-dihydroxyoctaphenyl tetrasiloxane, 1,5-dihydroxy-3,3-dimethyl-1,1,5,5-tetraphenyl trisiloxane, 1,3-dihydroxytetra (dimethylphenyl) disiloxane, 1,5-dihydroxyhexaethyl trisiloxane, 1,7-dihydroxyoctapropyl tetrasiloxane, 1,3,5-trihydroxy-3-ethyl-1,1,5,5-tetramethyl trisiloxane, 1,5-dihydroxy-1,1,5,5-tetraphenyl-3,3-di-p-tolyl trisiloxane, and the compounds represented by the following chemical formulas.

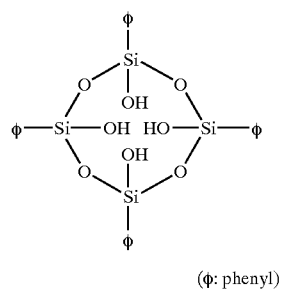

(φ: phenyl)

-continued

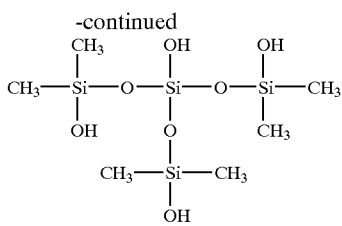

Additionally, it is also possible to employ some of silicone resins which are commercially available such as SH6018 (Tohre Silicone Co., Ltd.; methylphenyl polysiloxane: hydroxyl equivalent: 400, molecular weight: 1600).

It is also possible to use polysiloxane represented by the following general formula.

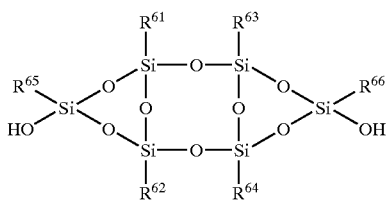

wherein $R^{61}$, $R^{62}$, $R^{63}$, $R^{64}$, $R^{65}$ and $R^{66}$ may be the same or different and are individually hydroxyl group or hydrolyzable group; alkyl group having 1 to 12 carbon atoms; aryl group such as phenyl group, tolyl group, paramethoxyphenyl group, parachlorophenyl group and paracyanophenyl group; aralkyl group such as benzyl group, phenethyl group, paramethoxybenzyl group and paramethylbenzyl group; alkenyl group such as vinyl group, allyl group, propenyl group and butenyl group; and acyl group such as acetyl group, benzoyl group and trifluoroacetyl group.

This organosiloxane having a hydroxyl group which is directly bonded to silicon atom can be employed singly or in combination of two or more kinds in the composition. The content of the organosiloxane in the composition may be generally in the range of 0.001 to 20% by weight, more preferably in the range of 0.01 to 10% by weight based on the quantity of epoxy resin. If the content of the organosiloxane is less than 0.001% by weight, it may become insufficient to cure the composition. On the other hand, although it is possible to employ the organosilane in excess of 20% by weight, it may lead to an increase in cost or to the generation of undesirable decomposition products of the catalyst component.

Preferable examples of silicon compounds which are capable of generating silanol as they are irradiated with light are those having any one of groups selected from peroxysilano group, o-nitrobenzyloxy group and α-ketosilyl group.

The silicon compounds having peroxysilano group are the compounds represented by the aforementioned general formula (SI-PO) which has been explained with reference to the general formula (I-4). In this case, however, $R^{41}$, $R^{42}$ and $R^{43}$ in this general formula are selected from hydrogen atom, halogen atom, alkyl group having 1 to 5 carbon atoms, alkoxy group having 1 to 5 carbon atoms, aryl group and aralkyl group. These $R^{41}$, $R^{42}$ and $R^{43}$ may be the same with or different from each other.

As for these halogen atom and alkyl group having 1 to 5 carbon atoms, those groups that are exemplified hereinabove as being introduced into $R^{44}$ may be employed.

Specific examples of the silicon compounds having peroxysilano group are the compounds represented by the following chemical formulas.

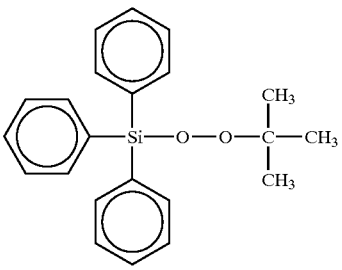

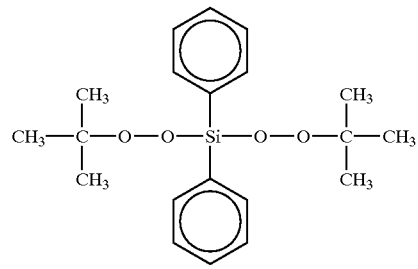

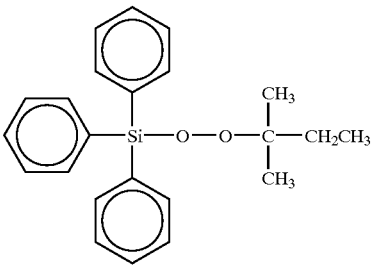

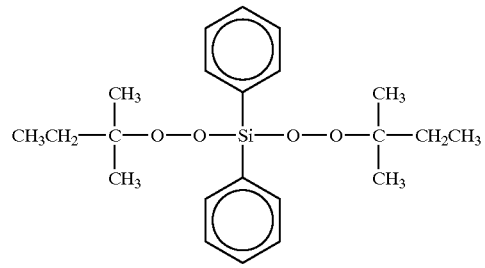

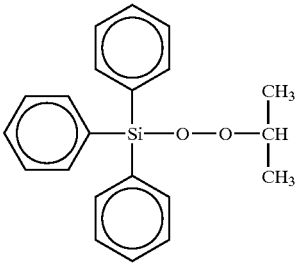

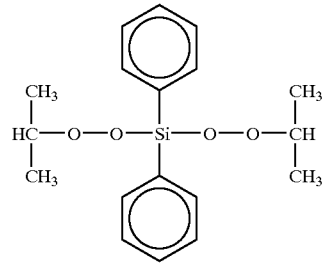

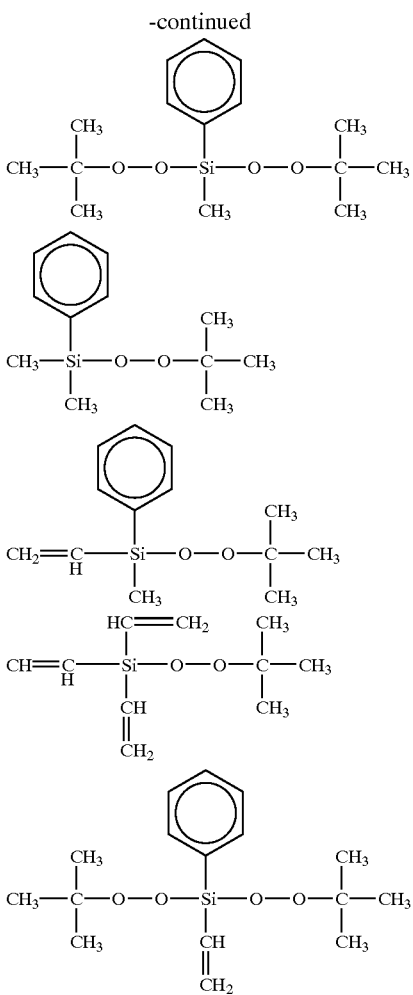

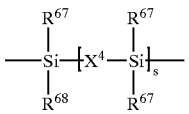

wherein s is an integer of 1 or more; $R^{67}$ and $R^{68}$ may be the same or different and are individually hydrogen atom, halogen atom, vinyl group, allyl group, substituted or unsubstituted alkyl group having 1 to 10 carbon atoms, alkoxy group having 1 to 10 carbon atoms, substituted or unsubstituted aryl group, aryloxy group and siloxy group; and $X^4$ is oxygen atom, alkylene group or aryldiyl group.

Specific examples of the silicon compounds having o-nitrobenzyloxy group are trimethyl(o-nitrobenzyloxy) silane, dimethylphenyl(o-nitrobenzyloxy) silane, diphenylmethyl(o-nitrobenzyloxy) silane, triphenyl(o-nitrobenzyloxy) silane, vinylmethylphenyl(o-nitrobenzyloxy) silane, t-butylmethylphenyl(o-nitrobenzyloxy) silane, triethyl(o-nitrobenzyloxy) silane, tri(2-chloroethyl)-o-nitrobenzyloxy silane, tri(p-trifluoromethylphenyl-o-nitrobenzyloxy) silane, trimethyl [α-(o-nitrophenyl)-o-nitrobenzyloxy]silane, dimethylphenyl[α-(o-nitrophenyl)-o-nitrobenzyloxy]silane, methylphenyldi[α-(o-nitrophenyl) -o-nitrobenzyloxy] silane, triphenyl(α-ethyl-o-nitrobenzyloxy) silane, trimethyl (3-methyl-2-nitrobenzyloxy) silane, dimethylphenyl(3,4,5-trimethoxy-2-nitrobenzyloxy) silane, triphenyl(4,5,6-trimethoxy-2-nitrobenzyloxy) silane, diphenylmethyl(5-methyl-4-methoxy-2-nitrobenzyloxy) silane, triphenyl(4,5-dimethyl-2-nitrobenzyloxy) silane, vinylmethylphenyl(4,5-dichloro-2-nitrobenzyloxy) silane, triphenyl(2,6-dinitrobenzyloxy) silane, diphenylmethyl(2,4-dinitrobenzyloxy) silane, triphenyl(3-methoxy-2-nitrobenzyloxy) silane, vinylmethylphenyl(3,4-dimethoxy-2-nitrobenzyloxy) silane, dimethyldi(o-nitrobenzyloxy) silane, methylphenyldi(o-nitrobenzyloxy) silane, vinylphenyldi(o-nitrobenzyloxy) silane, t-butylphenyldi(o-nitrobenzyloxy) silane, diethyldi(o-nitrobenzyloxy) silane, 2-chloroethylphenyldi(o-nitrobenzyloxy) silane, diphenyldi (o-nitrobenzyloxy) silane, diphenyldi(3-methoxy-2-nitrobenzyloxy) silane, diphenyldi(3,4-dimethoxy-2-nitrobenzyloxy) silane, diphenyldi(2,6-dinitrobenzyloxy) silane, diphenyldi(2,4-dinitrobenzyloxy) silane, methyltri(o-nitrobenzyloxy) silane, phenyltri(o-nitrobenzyloxy) silane, p-bis(o-nitrobenzyloxydimethylsilyl) benzen, 1,1,3,3-tetraphenyl-1,3-di(o-nitrobenzyloxy) disiloxane, 1,1,3,3,5, 5-hexaphenyl-1,5-di(o-nitrobenzyloxy) trisiloxane, and silicon compounds that can be produced through a reaction between SiCl-containing silicone resin and o-nitrobenzyl alcohol.

The silicon compounds having o-nitrobenzyloxy group are the compounds represented by the aforementioned general formula (SI-NB) which has been explained with reference to the general formula (I-4). In this case, however, $R^{45}$, $R^{46}$ and $R^{47}$ in this general formula are selected from hydrogen atom, halogen atom, vinyl group, allyl group, substituted or unsubstituted alkyl group having 1 to 10 carbon atoms, alkoxy group having 1 to 10 carbon atoms, substituted or unsubstituted aryl group, aryloxy group and siloxy group. These $R^{45}$, $R^{46}$ and $R^{47}$ may be the same with or different from each other.

As for the halogen atoms useful in this case, chlorine atom or bromine atom can be employed. Likewise, the substituted or unsubstituted alkyl group having 1 to 10 carbon atoms may be methyl, ethyl, n-propyl, n-butyl, tert-butyl, n-pentyl, chloromethyl, chloroethyl, fluoromethyl or cyanomethyl group. Further, the alkoxy group having 1 to 10 carbon atoms may be methoxy, ethoxy, n-propoxy and n-butoxy group. The substituted or unsubstituted aryl group may be selected from phenyl, p-methoxyphenyl, p-chlorophenyl and p-trifluoromethylphenyl groups. The aryloxy group may be phenoxy group.

Alternatively, the silicon compounds having o-nitrobenzyloxy group may be selected from compounds which contain o-nitrobenzyloxy group as a terminal group and have a main chain which is represented by the following group.

The silicon compounds having α-ketosilyl group are the compounds represented by the aforementioned general formula (SI-KS) which has been explained with reference to the general formula (I-4). In this case, however, $R^{53}$, $R^{54}$ and $R^{55}$ in this general formula are selected from hydrogen atom, vinyl group, allyl group, alkyl group having 1 to 10 carbon atoms, alkoxy group having 1 to 10 carbon atoms, aryl group and allyloxy group. These $R^{53}$, $R^{54}$ and $R^{55}$ may be the same with or different from each other.

As for these alkyl group having 1 to 10 carbon atoms and alkoxy group having 1 to 10 carbon atoms that will be introduced into $R^{53}$, $R^{54}$ and $R^{55}$, those groups that are exemplified hereinabove as being introduced into $R^{56}$ may be employed.

Specific examples of the silicon compounds having α-ketosilyl group are the compounds represented by the following chemical formulas.

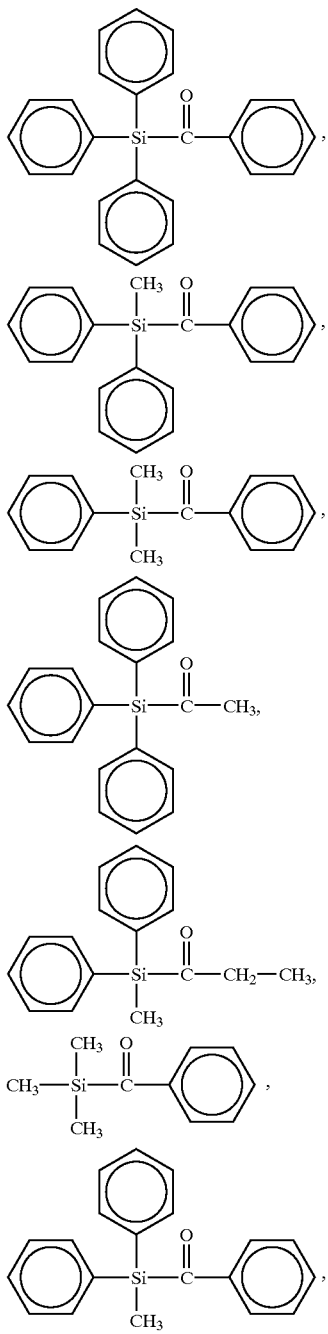

These silicon compounds which are capable of generating silanol as they are irradiated with light can be employed singly or in combination of two or more kinds in the composition. The content of the silicon compounds in the composition may be generally in the range of 0.001 to 20% by weight, more preferably in the range of 0.01 to 10% by weight based on the quantity of epoxy resin. If the content of the silicon compounds is less than 0.001% by weight, it may become insufficient to cure the composition. On the other hand, although it is possible to employ the silicon compounds in excess of 20% by weight, it may lead to an increase in cost or to the generation of undesirable decomposition products of the catalyst component.

Examples of phenol compounds useful in this case are those represented by the following general formulas (Ph-1).

$$Ar^2-(OH)_n \qquad (Ph\text{-}1)$$

wherein $Ar^2$ is substituted or unsubstituted aromatic or heteroaromatic group; and n is an integer of 1 to 10.

As for the substituted or unsubstituted aromatic or heteroaromatic group represented by $Ar^2$ in the aforementioned general formula (Ph-1), those to be introduced into $R^{11}$ to $R^{18}$ of the aforementioned general formulas (I-1) to (I-5) can be employed. As for the substituent groups in these substituted aromatic or heteroaromatic group, they may be an organic group having one or more carbon atoms. When a plurality of substituent groups are existed in these substituted aromatic or heteroaromatic group, they may be the same with or different from each other. Following organic groups are specific examples of such substituent groups.

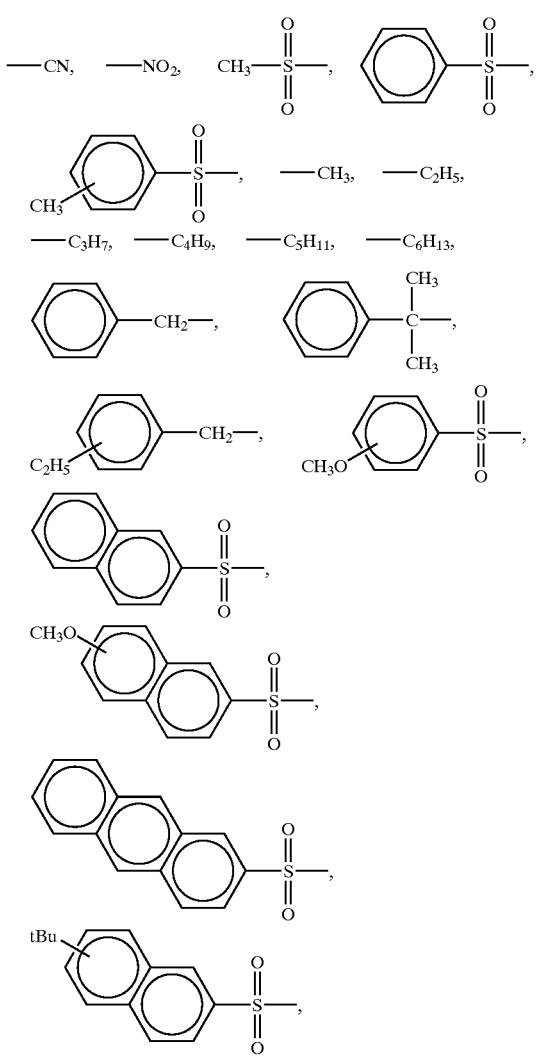

(Bu is butyl group)

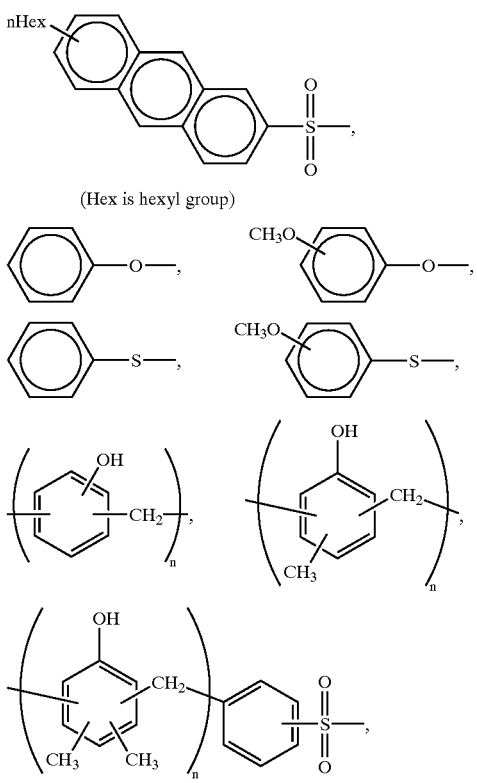

Specific examples of the compounds represented by the aforementioned general formula (Ph-1) include compounds represented by the following chemical formulas.

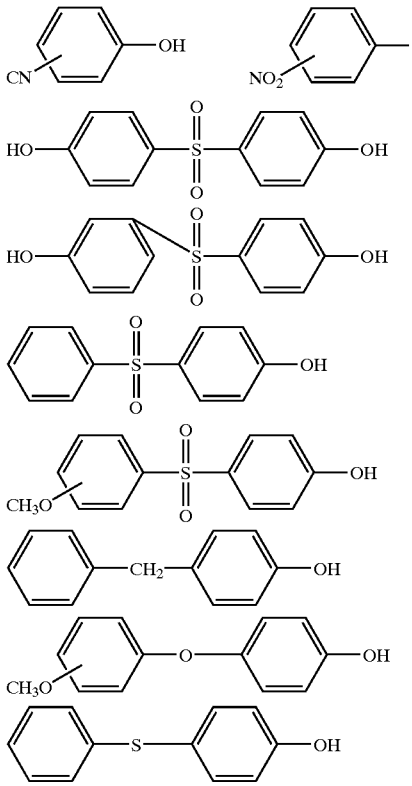

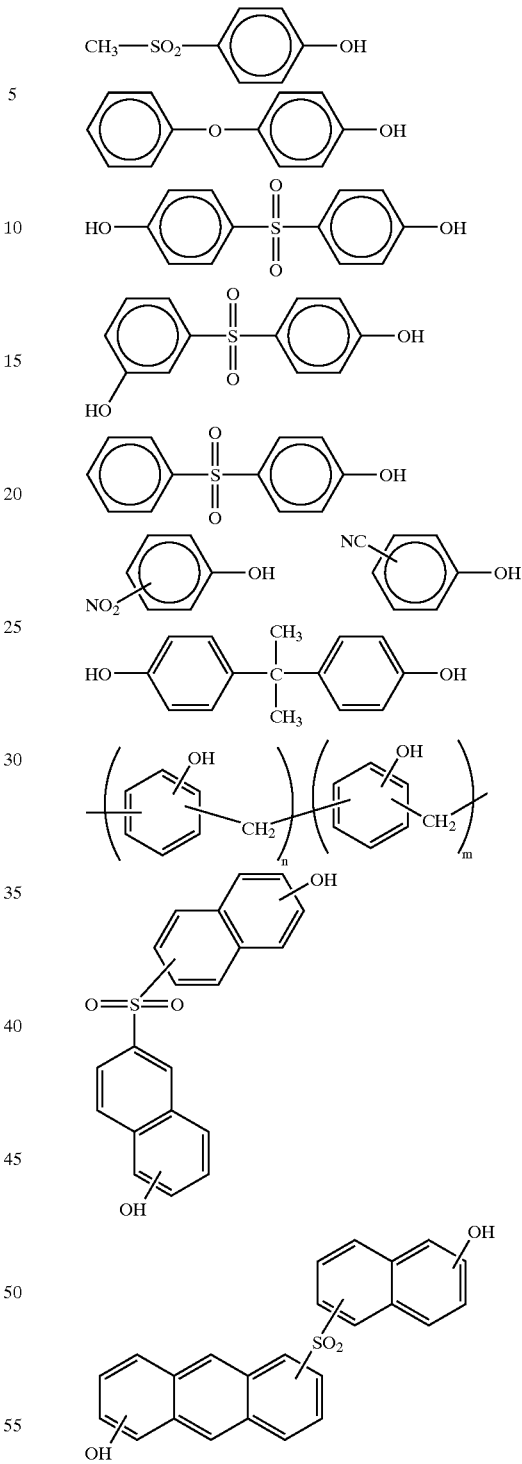

These phenol compounds can be employed singly or in combination of two or more kinds.

If these phenol compounds are to be incorporated in the first curing catalyst of this invention, the mixing ratio thereof should preferably be in the range of 0.1 to 50% by weight based on the resin. If the content of the phenol compounds is less than 0.1% by weight, it may become difficult to allow the curing reaction to sufficiently proceed. On the other hand, when the content of the phenol compounds exceeds over 50% by weight, it may lead to an increase in cost and to a deterioration in mechanical strength of the cured product.

Examples of organosilicon compounds having a hydrolyzable group which is directly bonded to the silicon atom are those having alkoxyl group having 1 to 5 carbon atoms; aryloxy group such as phenoxy group, tolyloxy group, paramethoxyphenoxy group, paranitrophenoxy group, benzyloxy group and parachlorophenoxy group; acyloxy group such as acetoxy group, propionyloxy group, butanoyloxy group, benzoyloxy group, phenylacetoxy group and formyloxy group; alkenyloxy group having 2 to 12 carbon atoms such as vinyloxy group and allyloxy group; aralkyloxy group such as benzyloxy group and phenethyloxy group; or a group represented by the following general formula:

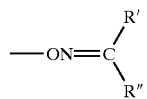

wherein R' and R" may be the same or different and are individually alkyl groups having 1 to 5 carbon atoms.

These organosilicon compounds having a hydrolyzable group which is directly bonded to silicon atom can be employed singly or in combination of two or more kinds in the composition. The content of the organosilane in the composition may be generally in the range of 0.001 to 20% by weight, more preferably in the range of 0.01 to 10% by weight based on the quantity of epoxy resin. If the content of the organosilane is less than 0.001% by weight, it may become insufficient to cure the composition. On the other hand, although it is possible to employ the organosilane in excess of 20% by weight, it may lead to an increase in cost or to the generation of undesirable decomposition products of the catalyst component.

Next, a second curing catalyst according to this invention will be explained.

This second curing catalyst of this invention comprises at least one kind of compound selected from the group consisting of the compounds represented by the aforementioned general formulas (III-1') and (III-2).

As for the hydrocarbon group to be introduced into $R^1$, $R^2$ and $R^3$ in the aforementioned general formula (III-1'), the groups that have been exemplified above as capable being introduced into the $R^{11}$ to $R^{18}$ of the aforementioned general formulas (I-1) to (I-5) can be employed. More preferable examples of $R^1$, $R^2$ and $R^3$ are aromatic groups having a substituted or unsubstituted hydrocarbon group having 10 or more La carbon atoms, or heteroaromatic groups having a substituted or unsubstituted hydrocarbon group having 10 or more carbon atoms.

Specific examples of compound represented by the aforementioned general formula (III-1') are bis(p-octadecyloxyphenyl) butylphosphine, bis(m-octadecyloxyphenyl) butylphosphine, bis(p-octadecyloxyphenyl) decylphosphine, p-octadecyloxyphenyl dibutylphosphine, p-octadecyloxyphenyl octadecylphosphine, etc.

Alternatively, it is also possible, as the compounds of the aforementioned general formula (III-1'), to employ the compounds represented by the aforementioned general formula (III-1).

As for the hydrocarbon group to be introduced into $R^{31}$ in the aforementioned general formula (III-1) as well as the hydrocarbon group to be introduced into $R^{32}$, $R^{33}$, $R^{34}$ and $R^{35}$ in the aforementioned general formula (III-2), those to be introduced into $R^{11}$ to $R^{18}$ of the aforementioned general formulas (I-1) to (I-5) can be employed. These aforementioned hydrocarbon groups may contain a heteroatom such as F, Si, O, N and S.

Specific examples of the compounds represented by the general formula (III-1) are as follows.

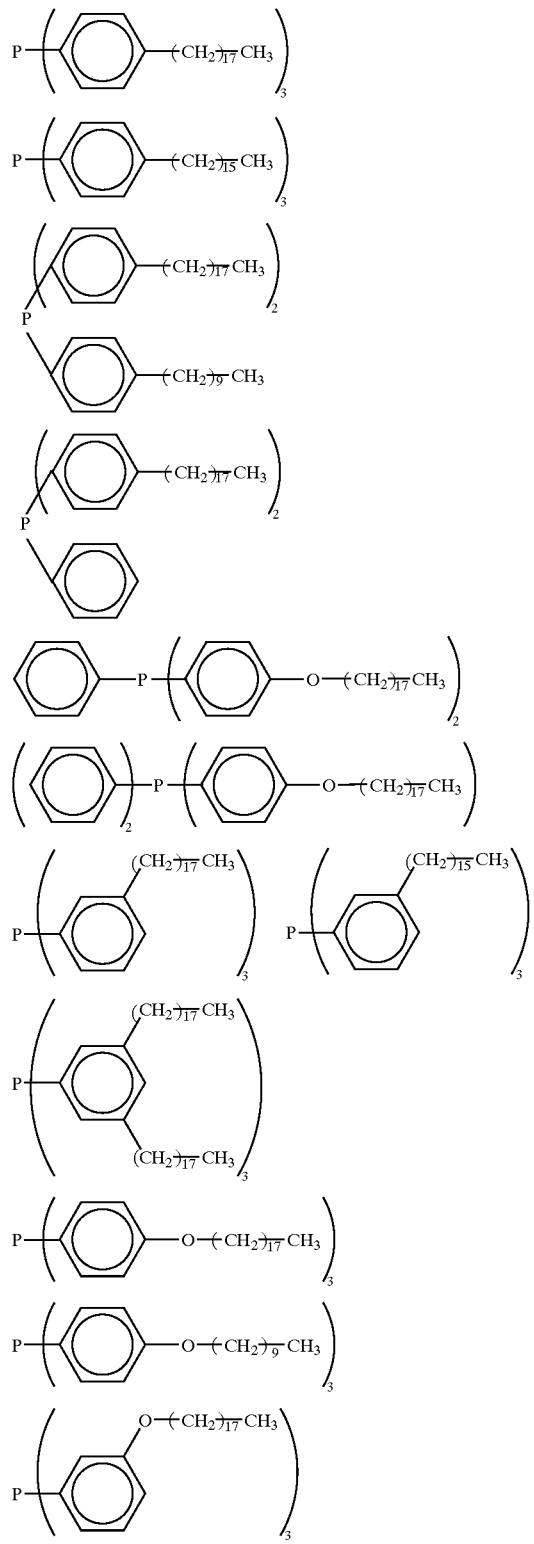

-continued

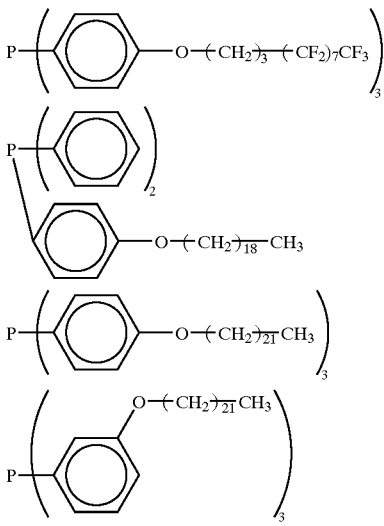

Specific examples of the compounds represented by the general formula (III-2) as follows.

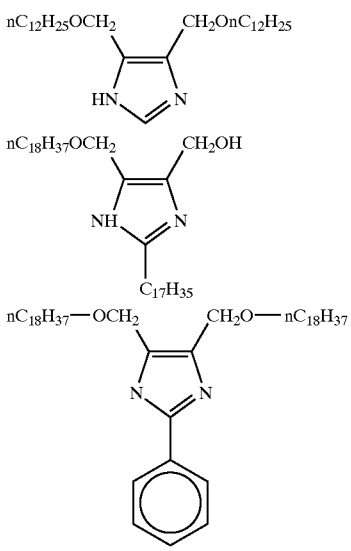

As an anionic catalyst to be employed in the same manner as the compounds of the general formula (III-1) or (III-2), the following compounds can be employed.

Namely, as specific anionic compounds, derivatives of straight-chain tertiary amine, piperazine, pyridine, picoline, 1,8-diazabicyclo[5.4.0]undecene-1, benzyl amine, 2-(aminomethyl) phenol, 2,4,6-tris(aminomethyl) phenol, etc. can be employed. These derivatives may include a halogen atom, nitro group or cyano group, hydrogen atom, a substituted or unsubstituted hydrocarbon group having 1 to 30 carbon atoms, an aromatic group having a substituted or unsubstituted hydrocarbon group, and a heteroaromatic group having a substituted or unsubstituted hydrocarbon group. Further, these derivatives may include at least one group selected from the group consisting of a substituted or unsubstituted hydrocarbon group having 10 or more carbon atoms, an aromatic group having a substituted or unsubstituted hydrocarbon group having 10 or more carbon atoms, and a heteroaromatic group having a substituted or unsubstituted hydrocarbon group having 10 or more carbon atoms.

The aforementioned second curing catalyst according to this invention should preferably be incorporated in the resin composition at a mixing ratio ranging from 0.01 to 20% by weight based on the resin component. If the content of the second curing catalyst is less than 0.01% by weight, it may become difficult to allow the curing reaction to sufficiently proceed. On the other hand, when the content of the second curing catalyst exceeds over 20% by weight, it may lead to an increase in cost and to a deterioration in mechanical strength of the cured product.

The first curing catalyst according to this invention is featured in that it comprises at least one of a cationic curing catalyst component and an organometallic compound component, and that at least one of these components is capable of reversibly the dissolving and precipitating through heating and cooling. On the other hand, the second curing catalyst according to this invention is featured in that it contains at least one kind of atom selected from the group consisting of P and N, and that it can be uniformly dissolved in an epoxy resin upon heating and can be precipitated in a cooling process. The precipitation in this case means that the curing catalyst takes a state of colloid, micell, crystal in an epoxy resin, while N atom or P atom constituting an active moiety in the catalyst takes, under the condition of aforementioned precipitation, a state where N atom or P atom is blocked out of a labile moiety such as epoxy group, ester group, phenolic hydroxyl group, etc. To produce such a condition, the employment of a compound having substituted or unsubstituted hydrocarbon group having a large number of carbon atoms is more effective.

The hydrocarbon group having a large number of carbon atoms in this case means groups such as hexadecyl group, octadecyl group, dococyl group, etc.

Next, details on the resin composition of this invention will be explained.

The resin composition according to this invention comprises the aforementioned first or second curing catalyst, and a curable resin component. As for this curable resin component, a cationic polymerizable resin component can be employed. Specific examples of such a curable resin component are epoxy resin, a resin having vinylether group, lactone, styrene, a resin containing vinylthioether, etc.

Next, this invention will be further explained taking epoxy resin as an example.

There is not any specific limitation with respect to the kinds of epoxy resin. For example, a glycidylether type epoxy resin which is a reaction product between a novolak compound and epichlorohydrin, another glycidylether type epoxy resin which is a reaction product between diallyl bisphenol (which has allyl group at the ortho position of hydroxyl group of bisphenol A) and epichlorohydrin, etc. can be employed. Among these epoxy resins, an epoxy resin that can be derived using bisphenol A for the purpose of securing a pliability of cured product is preferable. Furthermore, an epoxy resin having a molecular weight of 300 to 5,000 and an epoxy equivalent of 150 to 2,500 is more preferable.

It is also possible, as an epoxy resin to be employed in the resin composition of this invention, to employ an alicyclic epoxy compound where the ring is directly epoxidized. This alicyclic epoxy compound can be represented by the following structural formulas.

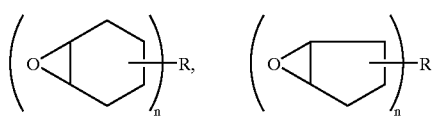

wherein R is an organic group containing alkyl group, ether linkage, ester linkage, thioether linkage or spiro ring, thereby linking two or more epoxidized rings; and n is an integer of 1 or more.

Specific examples of the alicyclic epoxy compound are as follows.

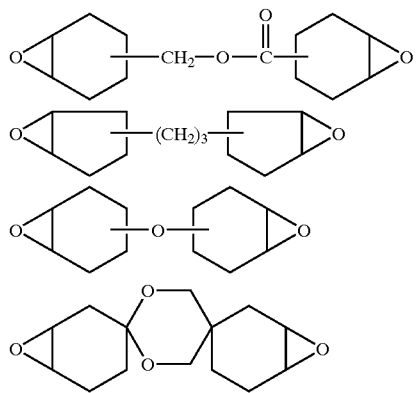

The product of the alicyclic epoxy compound is commercially available as a tradename of Chissonox 221 (Chisso Co., Ltd.). Although there is not any particular limitation as to the epoxy equivalent of the alicyclic epoxy compound, the epoxy equivalent should preferably be 200 or less in view of promoting the curing speed of the epoxy compound.

As an epoxy resin to be employed in the resin composition of this invention, an epoxy compound containing in its molecule an epoxy group and an unsaturated double bond may be also employed. Followings are specific examples of epoxy group to be included in this epoxy compound.

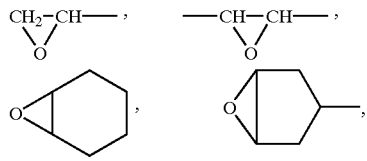

Further, followings are specific examples of the group having an unsaturated double bond in this epoxy compound.

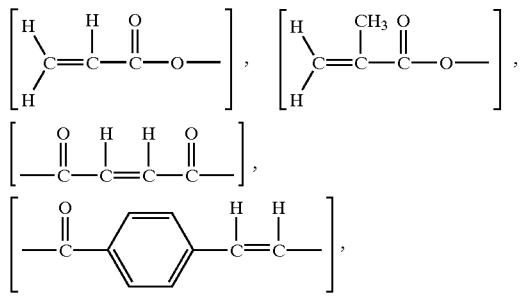

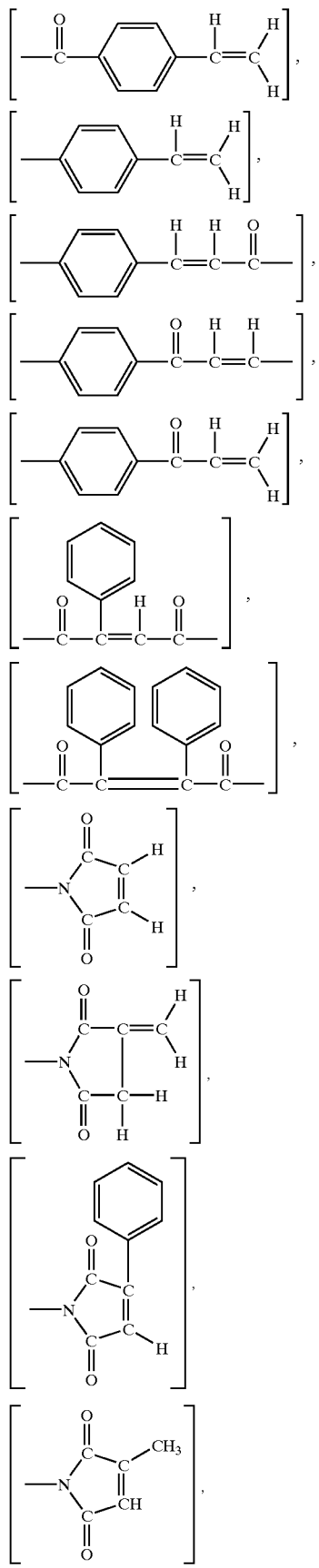

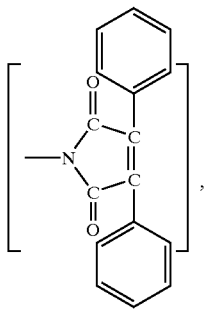

There is not any particular limitation regarding the number of the epoxy group and unsaturated double bond in one molecule of the epoxy compound as long as the molecule contains them at least one respectively. However, it is more preferable that the number of these epoxy group and unsaturated double bond in one molecule of the epoxy compound is in the range of 2 to 5, respectively. When a plurality of epoxy groups and a plurality of groups having a double bond are existed in one molecule of the epoxy compound, these groups are not necessarily required to be identical with each other, but may be different from each other, i.e. two or more kinds of these groups may be co-existed in one molecule.

The epoxy group and the group having a double bond may be constructed, depending on some circumstances, such that the hydrogen atom bonded to the carbon atom is substituted by halogen atoms such as chlorine atom, bromine atom, fluorine atom or alkyl group having 1 to 12 carbon atoms. Examples of such an alkyl group are methyl, ethyl, n-propyl, isopropyl, n-butyl, isobutyl, sec-butyl, tert-butyl, n-pentyl, isopentyl, neopentyl, hexyl, heptyl, octyl, nonyl and dodecyl group.

The epoxy compound having the aforementioned epoxy group and unsaturated double bond may be formed of any desired structure depending on the end-use thereof. One example of such epoxy compound having a desired structure may be derived from a reaction between an unsaturated carboxylic acid and an ordinary epoxy compound in an organic solvent and in the presence of a catalyst such as cholin chloride.

Examples of the unsaturated carboxylic acid useful in this case are acrylic acid, methacrylic acid, cinnamic acid, maleic acid, and derivatives thereof. Examples of the epoxy compound useful in this case are any kinds of epoxy compound as long as at least one epoxy group is contained in the molecule thereof, and hence, it may be either a mono-functional epoxy compound or a poly-functional epoxy compound.

Examples of the mono-functional epoxy compound are ethylene oxide, propylene oxide, butylene oxide, styrene oxide, phenylglycidyl ether and butylglycidyl ether.

With respect to the poly-functional epoxy compound, there is not any limitation as long as it is ordinary known as an epoxy resin. Examples of such a poly-functional epoxy resin are bisphenol A type epoxy resin; bisphenol F type epoxy resin; phenol novolak type epoxy resin; alicyclic epoxy resin; heterocyclic epoxy resin such as triglycidyl isocyanurate and hydantoic epoxy resin; hydrogenated bisphenol A type epoxy resin; aliphatic epoxy resin such as propyleneglycol diglycidyl ether and pentaerythritol polyglycidyl ether, glycidyl ester type epoxy resin to be derived from a reaction between an aromatic, aliphatic or alicyclic carboxylic acid and epichlorohydrin; spiro ring-containing epoxy resin; glycidyl ether type epoxy resin to be derived from a reaction between an o-allyl-phenol novolak compound and epichlorohydrin; and glycidyl ether type epoxy resin to be derived from a reaction between a diallyl bisphenol compound (which has allyl group at the ortho position of hydroxyl group of bisphenol A) and epichlorohydrin.

Specific examples of epoxy compound having the aforementioned epoxy group and unsaturated double bond are as follows.

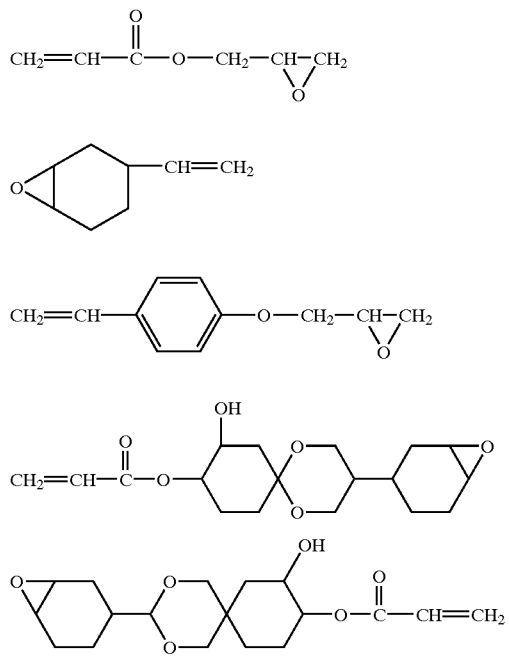

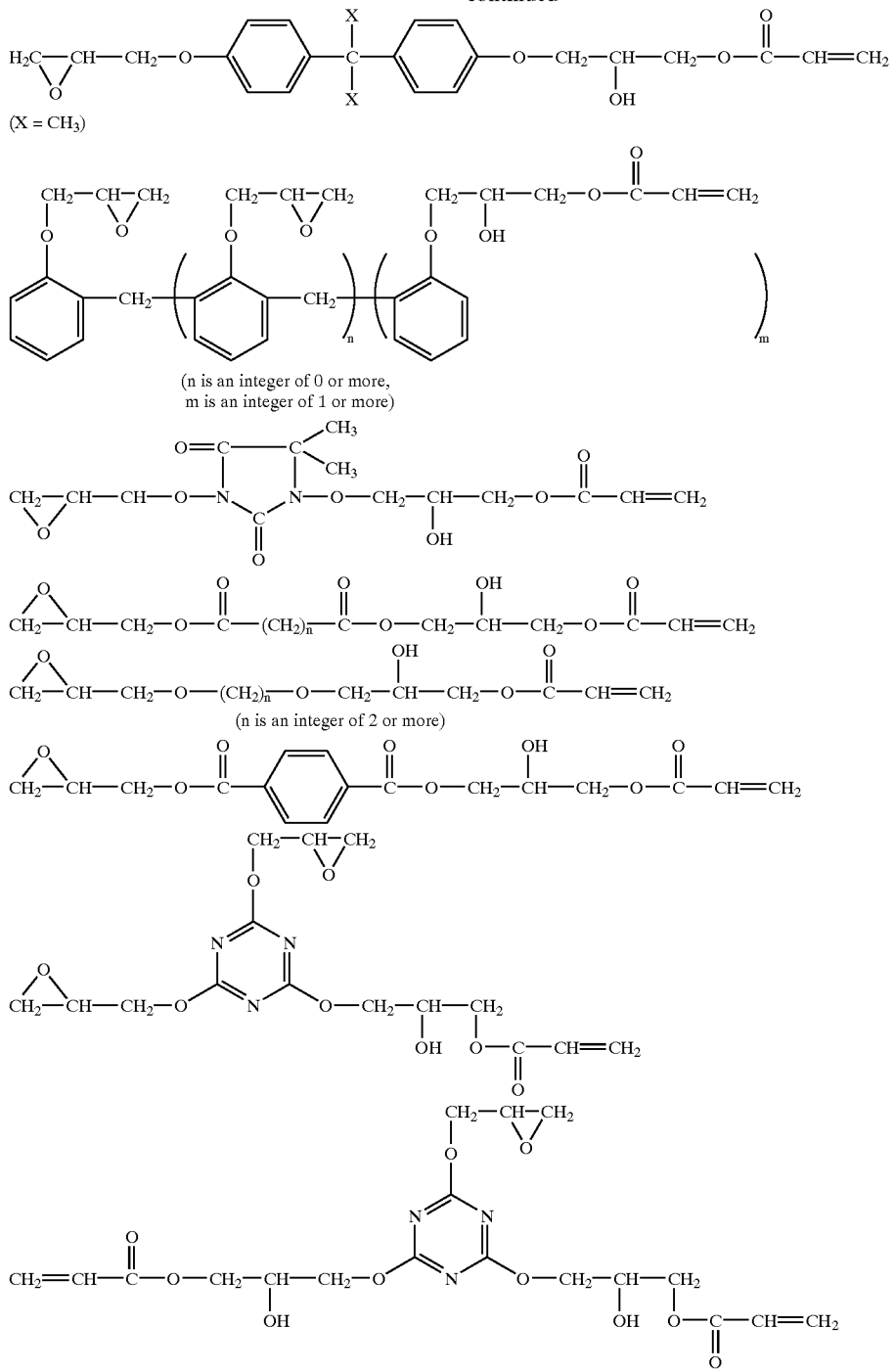

(n is an integer of 2 or more)

It is also possible to employ compounds where the acrylic group (—COOCH=CH$_2$) in the aforementioned is replaced by methacrylic group (—COOC(CH$_3$)=CH$_2$).

The resin composition of this invention may additionally contain a compound having an unsaturated double bond such as methacrylic resin and acrylic resin depending on the end-use of the resin composition. It is also possible to incorporate maleimides in the resin composition of this invention for the purpose of improving the mechanical strength at high temperatures. The maleimides useful in this case include N,N'-substituted bismaleimide represented by the following general formula:

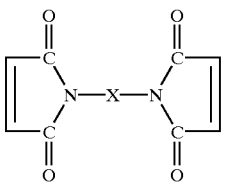

wherein X is a bivalent hydrocarbon group such as alkylene group, cycloalkylene group and monocyclic or polycyclic allylene group; or a bivalent hydrocarbon group which is linked via a bivalent atomic group such as —CH$_2$—, —CO—, —SO$_2$— or —CONH—.

Additionally, the maleimides useful in this case also include poly(phenylmethylene) polymaleimide represented by the following general formula:

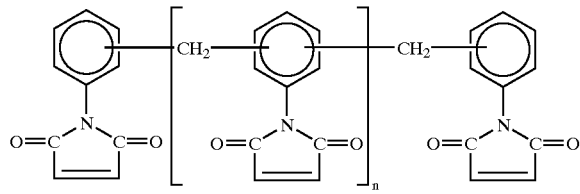

wherein n is an integer of 1 to 5.

Specific examples of these maleimides are N,N'-phenylene bismaleimide; N,N'-hexamethylene bismaleimide; N,N'-diphenylmethane bismaleimide; N,N'-oxy-di-p-phenylene bismaleimide; N,N'-4,4'-benzophenone bismaleimide; N,N'-p-diphenylsulfone bismaleimide; N,N'-(3,3'-dimethyl)methylene-di-p-phenylene bismaleimide; poly(phenylmethylene) polymaleimide, 2,2-bis(4-phenoxyphenyl)propane-N,N'-bismaleimide; bis(4-phenoxyphenyl)sulfone-N,N'-bismaleimide; 1,4-bis(4-phenoxy)benzene-N,N'-bismaleimide; 1,3-bis(4-phenoxy)benzene-N,N'-bismaleimide; and 1,3-bis(3-phenoxy)benzene-N,N'-bismaleimide.

These maleimides should preferably be added to a resin such as epoxy resin at a ratio of 1 to 70% by weight. If the content of the maleimides exceeds over 70% by weight, the resultant cured product may become fragile, thereby deteriorating the physical properties thereof. On the other hand, if the content of the maleimides is less than 1% by weight, it would be impossible to expect a sufficient effect of adding the maleimides.

The resin composition of this invention may also contain an inorganic filler depending on the end-use of the resin composition. The inorganic filler useful in this case may be of any kinds as long as it is capable of generally forming a composite together with the resin. For example, fused silica, crystalline silica, alumina, silicon nitride, aluminum nitride, etc. can be employed.

The mixing ratio of the inorganic filler should preferably be in the range of 40 to 90% by volume based on the entire resin composition. If this mixing ratio is less than 40% by volume, the thermal expansion coefficient becomes too large, thus causing the thermal stress to increase. On the other hand, if this mixing ratio exceeds over 90% by volume, the fluidity of the resin composition would possibly be deteriorated.

It is also possible to incorporate a photosensitizer in the resin composition of this invention so as to further promote the curing the resin composition. There is not any particular limitation regarding this photosensitizer as long as it is capable of enhancing the photosensitivity of the aforementioned compounds, so that this photosensitizer can be suitably selected depending on the kinds of the compound and light source. Specific examples of this photosensitizer are aromatic hydrocarbons and the derivatives thereof; benzophenones and the derivatives thereof; o-benzoyl benzoate and the derivatives thereof; acetophenone and the derivatives thereof; benzoin and benzoin ether and the derivatives thereof; xanthoin and the derivatives thereof; thioxanthoin and the derivatives thereof; disulfide compounds; quinone-based compounds; hydrocarbon halogenide-containing compounds, and amines.

Specific examples of aromatic hydrocarbons and the derivatives thereof are benzene, benzene-d6, toluene, p-xylene, fluorobenzene, chlorobenzene, bromobenzene, iodobenzene, naphthalene, 1-methylnaphthalene, 2-methylnaphthalene, 1-fluoronaphthalene, 1-chloronaphthalene, 2-chloronaphthalene, 1-bromonaphthalene, 2-bromonaphthalene, 1-iodonaphthalene, 2-iodonaphthalene, 1-naphthol, 2-naphthol, biphenyl, fluorene, p-terphenyl, acenaphthene, p-quaterphenyl, triphenylene, phenanthrene, azulene, fluoranthene, chrysene, pyrene, 1,2-benzpyrene, anthracene, 1,2-benzanthracene, 9,10-dichloroanthracene, 9,10-dibromoanthracene, 9,10-diphenylanthracene, perylene, tetracene and pentacene.

Specific examples of benzophenones and the derivatives thereof are benzophenone, 2,4-dimethylbenzophenone, 2,4-dichlorobenzophenone and 4,4'-bis(dimethylamino) benzophenone.

Specific examples of o-benzoyl benzoate and the derivatives thereof are o-benzoyl benzoic methylester, o-benzoyl benzoic ethylester, o-benzoyl benzoic phenylester and the compounds represented by the following chemical formulas.

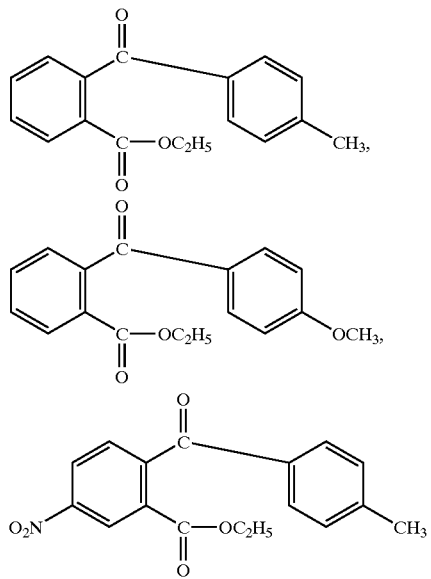

Specific examples of acetophenone and the derivatives thereof are acetophenone, 4-methylacetophenone, 3-methylacetophenone and 3-methoxyacetophenone.

Specific examples of benzoin and benzoin ether and the derivatives thereof are benzoin, benzoin methylether, benzoin ethylether, benzoin isopropyl ether, benzoin n-butyl ether, benozoin triphenyl silylether and the compounds represented by the following chemical formulas.

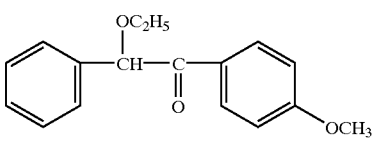

Specific examples of xanthoin and the derivatives thereof are xanthoin, 2,4-dimethylxanthoin and 2,4-dichloroxanthoin.

Specific examples of thioxanthoin and the derivatives thereof are thioxanthoin, 2,4-dimethylthioxanthoin and 2,4-dichlorothioxanthoin.

Specific examples of disulfide compounds are the compounds represented by the following chemical formulas.

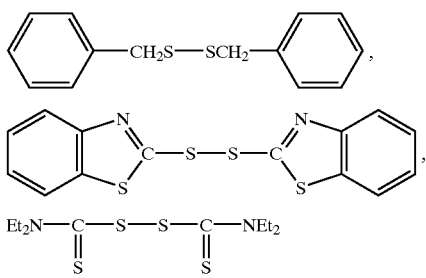

wherein Et is ethyl group (hereinafter, the same).

Specific examples of quinone-based compounds are benzoquinone, naphthquinone, anthraquinone, 5,12-naphthacenedione and 2,7-pyrenedione.

Specific examples of hydrocarbon halogenide-containing compounds are carbon tetrachloride, hexachloroethane, carbon tetrabromide and the compounds represented by the following chemical formulas.

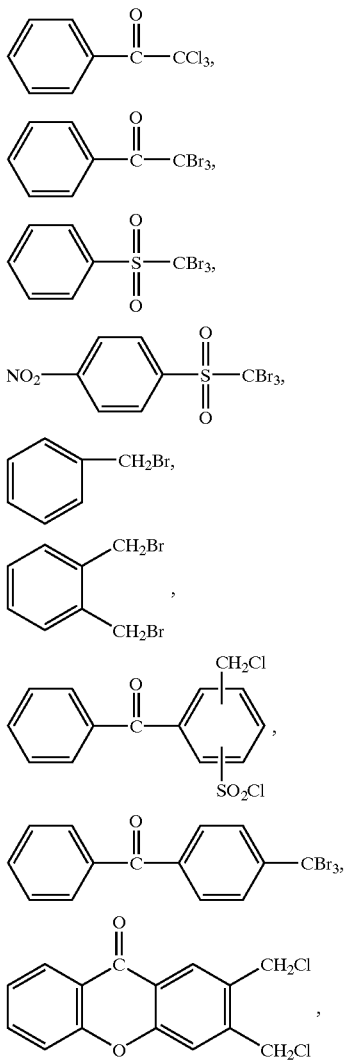

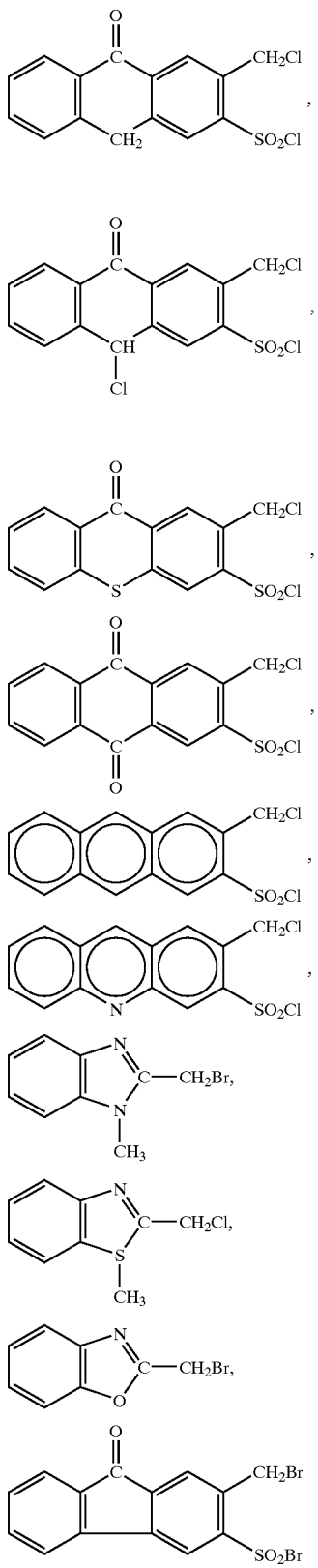

Specific examples of amines are diphenyl amine, carbazole, triphenyl amine and the compounds represented by the following chemical formulas.

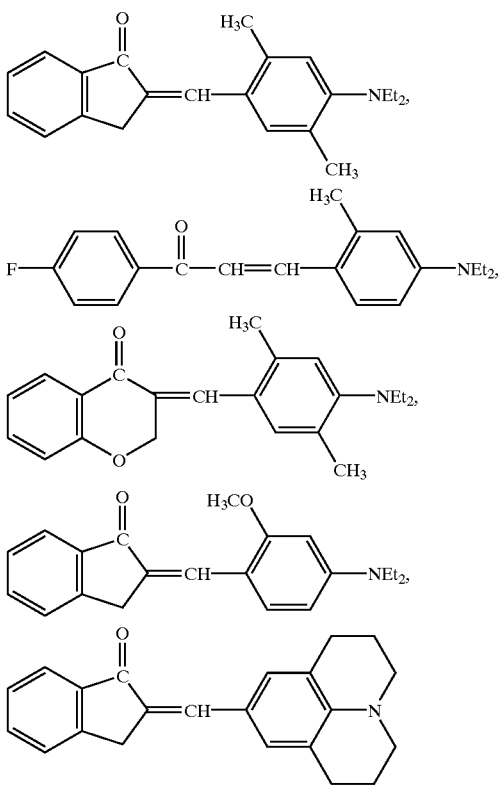

Specific examples of other kinds of this photosensitizer are propiophenone, anthrone, benzaldehyde, butyrophenone, 2-naphthylphenyl ketone, 2-naphthaldehyde, 2-acetonaphthone, 1-naphthylphenyl ketone, 1-acetonaphthone, 1-naphthaldehyde, fluorenone, 1-phenyl-1,2-propanedione, benznitrile, acetone, biacetyl, acridine orange, acridine, Rhodamine B, eosin, fluorescein and the compounds represented by the following chemical formulas.

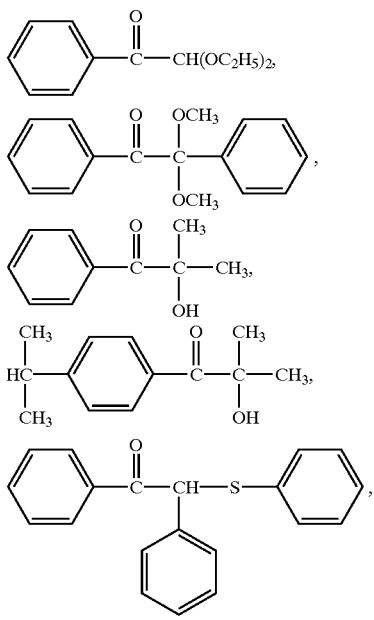

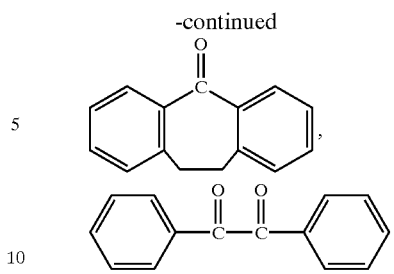

These aforementioned photosensitizers can be employed singly or in combination of two or more kinds in the composition. The content of the photosensitizers in the composition may be generally in the range of 0.001 to 10% by weight, more preferably in the range of from 0.01 to 5% by weight based on the resin component. If the content of the photosensitizers is less than 0.001% by weight, it may become difficult to obtain a sufficient effect of adding the photosensitizers. On the other hand, when the content of the photosensitizer exceeds over 10% by weight, it may lead to a deterioration in mechanical strength of the cured product.

The resin composition of this invention may further contain a curing agent such as acid anhydrides, phenols, aromatic amine compounds, and cyanate ester compounds.

Specific examples of acid anhydrides to be employed as a curing agent are phthalic anhydride, hexahydrophthalic anhydride, tetrahydrophthalic anhydride, methyl-tetrahydrophthalic anhydride, methyl-hexahydrophthalic anhydride, nadic anhydride, methylnadic anhydride, chlorendic anhydride, dodecylsuccinic anhydride, methylsuccinic anhydride, benzophenone tetracarboxylic anhydride, pyromellitic anhydride and maleic anhydride.

The mixing ratio of these acid anhydrides should preferably be such that the equivalent weight thereof is 0.1 to 1.1 times as much as that of the epoxy resin. If the equivalent weight of these acid anhydrides is larger than 1.1 times, an unreacted portion of the acid anhydrides may be left remained in the product thereby deteriorating the physical properties of the cured product. On the other hand, if the equivalent weight of these acid anhydrides is less than 0.1 time, it would be impossible to expect a sufficient effect of adding the acid anhydride.

Specific examples of phenols to be employed as a curing agent are phenol resin, phenol novolak resin, cresol novolak resin and polyvinylphenol.

The content of these phenols should preferably be such that the equivalent weight thereof is 0.1 to 1.1 times as much as that of the epoxy resin. If the equivalent weight of these phenols is larger than 1.1 times, an unreacted portion of the phenols may be left remained in the product thereby deteriorating the physical properties of the cured product. On the other hand, if the equivalent weight of these phenols is less than 0.1 time, it would be impossible to expect a sufficient effect of adding these phenols. Specific examples of aromatic amine compounds to be employed as a curing agent are 4,4'-diaminodicyclohexyl methane, 1,4-diaminodicyclohexane, 2,6-diaminopyridine, m-phenylene diamine, p-phenylene diamine, 4,4'-diaminophenyl methane, 2,2'-bis(4-aminophenyl) propane, 4,4'-diaminodiphenyl oxide, 4,4'-diaminodiphenyl sulfone, bis(4-aminophenyl) methylphosphine oxide, bis(4-aminophenyl) methylamine, 1,5-diaminonaphthalene, m-xylylene diamine, 1,1-bis(p-aminophenyl) furazane, p-xylylene diamine, hexamethylene diamine, 6,6'-diamino-2,2'-dipyridyl, 4,4'-diaminobenzophenone, 4,4'-diaminoazobenzene, bis(4-aminophenyl) phenylmethane, 1,1-bis(4-aminophenyl) cyclohexane, 1,1-bis(4-aminophenyl-3-methylphenyl) cyclohexane, 2,5-bis(m-aminophenyl)-1,3,4-oxadiazole, 2,5-bis(p-aminophenyl)-1,3,4-oxadiazole, 2,5-bis(m-aminophenyl)thiazolo(4,5-d) thiazole, 5,5'-di(m-aminophenyl)-2,2'-bis(1,3,4-oxadiazolyl), 4,4'-diaminodiphenyl ether, 4,4'-bis(p-aminophenyl)-2,2'-dithiazole, m-bis(4-p-aminophenyl-2-thiazolyl) benzene, 4,4'-diaminobenzanilide, 4,4'-diaminophenyl benzoate, N,N'-bis(4-aminobenzyl)-p-phenylene diamine, 4,4'-methylene bis(2-chloroaniline), 2,2-bis[4-(4-aminophenoxy)phenyl]propane, bis[4-(4-aminophenoxy)phenyl]sulfone, 1,4-bis(4-aminophenoxy) benzene, 1,3-bis(4-aminophenoxy) benzene, and 1,3-bis(3-aminophenoxy) benzene.

The content of these aromatic amine compounds should preferably be such that the equivalent weight thereof is 0.1 to 1.1 times as much as the epoxy equivalent. If the equivalent weight of these aromatic amine compounds is larger than 1.1 times, an unreacted portion of the aromatic amine compounds may be left it remained in the product thereby deteriorating the physical properties of the cured product. On the other hand, if the equivalent weight of these aromatic amine compounds is less than 0.1 time, it would be impossible to expect a sufficient effect of adding these aromatic amine compounds.

Specific examples of cyanate ester compounds to be employed as a curing agent are phenol novolak cyanate, hexafluorobisphenol A dicyanate, ethylidenebis-4,4-phenylene dicyanate, 4,4'-(1,3-phenylene diisopropylidene) diphenylcyanate, tetrafluoromethyl bisphenol F dicyanate, and tetraorthomethyl bisphenol A dicyanate. It is also possible to employ at least one kind of cyanate ester compounds selected from the group consisting of cyanate esters wherein not more than 50% of cyanate group to be derived from these cyanate ester compounds is polymerized.

Since ethylidene-4,4-phenylene dicyanate as well as the cyanate esters which are to be derived from this cyanate ester and wherein not more than 50% of the cyanate group is polymerized are liquid at normal temperatures, they can be suitably employed as a curing agent of low viscosity. Therefore, these cyanate esters can be preferably employed in combination with a liquid epoxy resin.

The content of this cyanate ester compound should preferably be in the range of 0.30 to 0.70 based on the total quantity of a liquid epoxy resin and the cyanate ester compound. When cyanate ester group is heated singly, it is trimerized to form a triazine ring, thus giving a cured product which is excellent in heat resistance. However, the cured product is unsatisfactory in adhesivity to metals and print wiring board, and also in moisture resistance due to a high water absorption thereof under high temperatures and high humidity. These drawbacks can be overcome however by allowing the cyanate ester compound to be cured in combination with the epoxy resin. If the content of the cyanate ester compound is more than 0.70, the heat resistance (which may be represented by glass transition temperature) of the product would be deteriorated, thus lowering the reliability in the heating/cooling cycle test. On the other hand, if the content of the cyanate ester compound is less than 0.30, not only the adhesivity to metals or organic substrates of the product would be deteriorated, but also the moisture resistance reliability of the product in the PCT test would be badly deteriorated.

The resin composition of this invention can be cured by means of heat treatment or by the application of radiation. It is also possible, under some circumstances, to co-use the heating and irradiation. Further, a solvent may be employed as required at the occasion of the polymerization.

When the resin composition of this invention includes a compound which is capable of generating an acid or acidic substance as it is irradiated with light, or a compound which promotes the curing as it is irradiated with light such as a photosensitizer, a radiation is applied to the resin composition at the occasion of curing it. Though it may differ depending on the kinds of compound to be included in the resin composition and the components of the resin composition, the wavelength of the radiation to be applied may be usually in the range of 180 to 700 nm. Among them, ultraviolet rays having a wavelength of 250 to 400 nm are most preferable in view of efficiency.

With respect to the light source, there is not any limitation as long as it can be employed for the ordinary photopolymerization. For example, a low-pressure mercury lamp, a medium-pressure mercury lamp, a high-pressure mercury lamp, a xenon lamp, a carbon arc lamp, a metal halogen lamp, a xenon-mercury lamp, a hydrogen-discharge lamp, a tungsten lamp, a halogen lamp, a sodium-discharge lamp, a neon-discharge lamp, an argon-discharge lamp, a He—Ne laser, an Ar ion laser, a $N_2$ laser, a Cd ion laser, a He—Cd laser or a dye laser can be employed. It is also possible to employ an electron beam for the polymerization-or curing of the resin composition of this invention. In the curing of the resin composition, one or more kinds selected from these light sources can be suitably employed.

The curing catalysts according to this invention can be generally activated at a temperature ranging from 60 to 250° C. Thus, the curing of the resin composition containing the aforementioned curing catalysts can be performed taking several minutes to several hours at the aforementioned temperature range.

The resin composition of this invention contains a curing catalyst which can be uniformly dissolved in an epoxy resin upon heating and can be precipitated in a cooling process. Further, since the curing catalyst according to this invention can be kept in a state where the active moiety thereof is blocked at room temperature, the catalytic activity of the curing catalyst is inhibited from being manifested at room temperature.

For example, in the case of an epoxy resin composition containing the aforementioned first curing catalyst comprising an organometal compound and a specific kind of organosilane, the curing of the resin composition is effected in such a manner that the organometal compound is released at first from the aforementioned state upon heating and hence completely dissolved into the epoxy resin. As a result, the active portion of the organometal compound is developed and then, interacted with a compound such as a specific organosilane or with a phenol compound, thereby causing the epoxy group to take place the polymerization thereof.

On the other hand, in the case of an epoxy resin composition containing the aforementioned first cationic curing (polymerization) catalyst, the curing of the resin composition is effected in such a manner that the aforementioned state is collapsed upon heating and hence the catalyst is completely dissolved into the epoxy resin. Then, the cationic seed such as proton is generated from the cationic curing catalyst, thereby causing the epoxy group to take place the polymerization thereof.

Further, in the case of an epoxy resin composition containing the aforementioned second curing catalyst, the curing of the resin composition is effected as follows. Namely, the aforementioned state is collapsed at first upon heating and hence the catalyst is completely dissolved into the epoxy resin. Then, the second curing catalyst acts on the epoxy group or on the carbonyl group or phenolic hydroxyl group of the curing agent, thereby causing the polymerization reaction to take place.

As mentioned above, since the curing catalyst according to this invention can be kept in a state where the active moiety thereof is blocked at room temperature, the catalytic activity of the curing catalyst is inhibited from being manifested at room temperature. However, once the curing catalyst is dissolved by heating, the polymerization reaction takes place very quickly. In this manner, these curing catalysts are provided with a latency. Thus, the curing catalysts according to this invention is provided with not only high storage stability but also excellent curing property. Therefore, it is possible, according to the curing catalyst of this invention, to enhance the storage stability of the resin composition at room temperature thereby realizing a long-term storage and at the same time, to prevent the electric insulation property of the resin from being deteriorated.

In addition to high storage stability and excellent curing property, the resin composition of this invention comprising the aforementioned curing catalysts is also characterized by its excellent electric insulating property after curing and its excellent mechanical strength.

According to the resin composition containing a cationic polymerizable vinyl compound, it has become possible to realize the one-pack storage of a monomer together with a catalyst, which has been considered as being difficult, and also to realize a cationic polymerization reaction at a temperature of higher than room temperature. Additionally, according to the resin composition containing a cationic polymerizable vinyl compound, it has become possible through a simple heating process to obtain a polymer having a sufficient polymerization degree for practical use.

It is possible to obtain a liquid epoxy resin composition which is suited for use in the manufacture of a resin-sealed semiconductor device by making use of a liquid epoxy resin in the resin composition of this invention in combination with the aforementioned first curing catalyst comprising the organometal compounds represented by the aforementioned general formulas (II-1), (II-2) and (II-3), and a specific kind of organosilane or phenol compound; in combination with the aforementioned second curing catalyst represented by the aforementioned general formulas (III-1) and (III-2); or in combination with the curing catalysts represented by the aforementioned general formulas (I-1), (I-2) and (I-3).

Namely, the liquid epoxy resin composition useful in this case contains the aforementioned first curing catalyst comprising the organometal compounds represented by the aforementioned general formulas (II-1), (II-2) and (II-3), and at least one kind of compound selected from the group consisting of organosilane having hydroxyl group directly bonded to a silicon atom, organosiloxane having hydroxyl group directly bonded to a silicon atom, and a phenol compound. The mixing ratio of each component may be the same as explained hereinabove.

An inorganic filler may be incorporated as an essential component into this liquid epoxy resin composition. Although it is possible to prepare this liquid epoxy resin composition by simply incorporating the aforementioned curing agent, it is most preferable to employ an acid anhydride.

There is not any particular limitation regarding this inorganic filler as long as it is capable of providing a liquid epoxy resin composition with suitable viscosity, fluidity and filling property.

Specific examples of the inorganic filler useful in this case are fused silica powder, crystalline silica powder, glass, talc, alumina, calcium silicate, calcium carbonate, barium sulfate, magnesia, silicon nitride, boron nitride, aluminum nitride, magnesium oxide, beryllium oxide, mica, magnesium titanate, barium titanate, etc. These inorganic fillers may be used singly or in combination of two or more kinds (irrespective of the same or different kinds). Among these inorganic fillers, fused silica and crystalline silica are more preferable.

With respect to the shape of the inorganic filler, it may be of crushed shape, spherical shape, semi-spherical shape, fibrous shape, scaly shape, etc. These inorganic fillers differing in shape may be employed singly or in combination of two or more kinds.

Among these inorganic fillers, spherical or semi-spherical inorganic filler having an average particle diameter of 10 $\mu$m or less is most preferable for the purpose of enabling the liquid epoxy resin composition to be filled into a fine space.

It is also possible to employ a fibrous filler for the purpose of improving the crack resistance of a cured product.

This fibrous inorganic filler can be obtained from titania, aluminum borate, silicon carbide, silicon nitride, potassium titanate, basic magnesium, zinc oxide, graphite, magnesia, calcium sulfate, magnesium borate, titanium diborate, $\alpha$-alumina, chrysotile, warastnite, other kinds of whisker, E-glass fiber, silica-alumina fiber, silica-glass fiber, other kinds of amorphous fiber, silicon carbide fiber, zirconia fiber, $\gamma$-alumina fiber, $\alpha$-alumina fiber, PAN type carbon fiber, pitch type carbon fiber, other kinds of crystalline fiber, etc. These fibers may be employed singly or in combination of two or more kinds (irrespective of the same or different kinds). Among these inorganic fillers, acidic or neutral inorganic fillers are more preferable.

These fibrous inorganic fillers should preferably be formed to have an average length of 5 $\mu$m or less and a maximum length of 10 $\mu$m or less in view of enabling these fibrous inorganic fillers to be filled into a fine space.

The mixing ratio of the inorganic filler should preferably be in the range of 30 to 80% by weight based on the total weight of the liquid epoxy resin composition. If the mixing ratio is less than 30% by weight, it would be impossible to ensure a sufficient thermal shock resistance of the cured product due to an excessive increase in thermal expansion coefficient. On the other hand, if the mixing ratio exceeds over 80% by weight, the fluidity of the epoxy resin composition for resin-encapsulation would become insufficient, thereby deteriorating the filling property of the epoxy resin composition, thus giving rise to the generation of voids.

The inorganic fillers to be employed in this invention may be mixed with other kinds of inorganic filler as mentioned above. However, the mixing ratio, etc. of the inorganic fillers should be determined taking into consideration the fluidity and storage stability of the liquid epoxy resin composition as well as the filling property of the liquid epoxy resin composition into a space between a semiconductor element and a substrate.

The liquid epoxy resin composition of this invention may include the following optional components in addition to the aforementioned components.

(1) Thermoplastic Resin, Rubber, Various Oligomer, etc.

These materials are added for the purpose of improving the crack resistance of the liquid epoxy resin composition of this invention as well as for the purpose of lowering the elastic modulus of the liquid epoxy resin composition. Specific examples of them are polyamide resin, aromatic polyester resin, phenoxy resin, butyral resin, MBS resin, ABS resin, silicone resin, silicone rubber, fluorine-containing rubber, etc.

(2) Plastic Powder of Various Kinds Such as Various Engineering Plastic Powders, etc.

These materials are added for the purpose of providing the liquid epoxy resin composition with stress relaxation property. In order to provide the liquid epoxy resin composition with stress relaxation property, the maximum particle diameter of these plastic powders should preferably be 10 μm or less, more preferably 5 μm or less. When the particle diameter of these plastic powders is larger than that of other components of the liquid epoxy resin composition, voids may be generated at the occasion of filling the resin composition.

(3) It is also possible to employ a surface-treating agent of fillers such as silane coupling agent; an adhesivity-providing agent; a releasing agent such as a natural wax, a synthetic wax, a linear fatty acid or metal salts thereof, acid amides and paraffins; a pigment such as carbon black and titanium dioxide; a flame retardant such as a halogen compound, a phosphorus compound and antimony trioxide; a low stress-providing agent such as a silicone compound and an organic rubber; an ion scavenger such as hydrotalcite; a tackiness-providing agent such as petroleum resin, rosin, terpene and indene resin; and other kinds of additives.

The liquid epoxy resin composition of this invention can be manufactured using predetermined raw materials and by means of known ordinary methods.

More specifically, predetermined quantities of raw materials for each component are prepared at first. Then, the raw materials are fed to a mixer such as a universal mixer or a concentric biaxial mixer to mix them together thereby to prepare the liquid epoxy resin composition. Alternatively, after these raw materials are preliminarily mixed together, the filler components and the resin component are further homogenously mixed together by making use of a three-roll mill, a ball mill, an atomizer or a homogenizer thereby to prepare the liquid epoxy resin composition. These mixing processes can be suitably combined thereby to prepare the liquid epoxy resin composition.

The liquid epoxy resin composition of this invention prepared in this manner should preferably be not more than 200 poises, more preferably not more than 100 poises in viscosity at 60° C.

If the viscosity of the epoxy resin composition is higher than 200 poises, the filling performance of the epoxy resin composition into a space between the chips and the substrate constituting a flip chip bonding would be deteriorated, thus lowering the moldability of a semiconductor device.

The liquid epoxy resin composition of this invention prepared in this manner can be used not only for resin-sealing a semiconductor element but also for other purposes.

Typically, the liquid epoxy resin composition of this invention can be employed for the manufacture of precision electronic parts, precision electric parts, motor car parts, aerospace materials, slidable members, heat resistance laminate boards, a mounting agent, a casting material, a heat resistance adhesive, a heat resistance paint, etc.

The liquid epoxy resin composition of this invention prepared in this manner is charged at first into a dispenser constituting a portion of a resin-sealing machine for semiconductor device, and then, can be effectively used for sealing BGA, CSP, COG, COR, multi-chip module, or a semiconductor chip which has been bonded through flip chip bonding onto the substrate.

The resin-sealed semiconductor device according to this invention can be easily manufactured by making use of an ordinary resin-sealing method, wherein the space between a semiconductor chip and a substrate, the chip being bonded to the substrate through flip chip bonding, is filled with a predetermined quantity of the liquid epoxy resin composition ejected from a dispenser, and then the liquid epoxy resin composition charged into the space is heated at a temperature of about 120 to 180° C. for about 0.5 to 10 hours thereby to cure the epoxy resin composition.

As for the semiconductor element (chip) to be resin-sealed by making use of the liquid epoxy resin composition of this invention, there is not any particular limitation, so that diode, transistor, thyristor, IC, LSI, super LSI, CCD, RAM, DRAM, ROM and other kinds of element can be dealt with.

The resin-sealed semiconductor device according to this invention can be utilized for the manufacture of, for example, a personal computer, an electronic processor, a control machine, a liquid display, a card, an electronic calculator, a clock, an electronic thermometer, a tape recorder, a VTR, various small machines, an electronic machine, electric household appliances, etc. When the liquid epoxy resin composition of this invention is light-transmissive, it can be used for the manufacture of an optical semiconductor device such as an LED device.

The liquid epoxy resin composition according to this invention can be utilized for various end-use other than the sealing of a semiconductor device. For example, the liquid epoxy resin composition of this invention can be utilized as an electric insulation material, an adhesive, a print board, a laminate board, and a coating material for coating the surfaces of metal, wood product, rubber and plastics.

This invention will be further explained in detail with reference to the following examples, which are not intended to restrict the scope of this invention.

EXAMPLE I

Examples (I-1 to I-30)

First of all, epoxy resin compositions having the compositions illustrated in the following Tables 1 to 3 were prepared by mixing the components at the mixing ratios shown in Tables 1 to 3. The mixing quantities shown in these Tables are based on weight parts, which are the same in all of the following Tables.

Each composition thus obtained was subjected to measurements with respect to the gelation time (150° C. in all of Examples I-1 to I-30), to the storage stability at room temperature and to the mechanical strength after the curing. In this case, the storage stability at room temperature was determined by measuring the time when the viscosity of the resin composition became twice as much as the initial viscosity. While, the mechanical strength after the curing was determined by measuring the bending strength at room temperature of the cured product. The measurement of bending strength was performed on the products which were obtained from the heating process of one hour at 120° C. and one hour at 150° C. in the cases of Examples I-1 to I-6; one hour at 80° C. and one hour at 150° C. in the cases of Examples I-7 to I-12 and I-30; two hours at 200° C. in the cases of Examples I-13 to I-16 and I-21 to I-24; 20 minutes at 200° C. in the cases of Examples I-17 to I-20 and I-25 to I-28; and one hour at 120° C. and one hour at 150° C. in the cases of Example I-29. The results are summarized in the following Table 4.

The details of components each indicated by an abbreviation are as follows.

EP1: Epi-bis type epoxy resin (EPICOAT 828; Yuka Shell Epoxy Kabushikikaisha, epoxy equivalent: 190–210)

EP2: Alicyclic epoxy resin (EPICOAT 2021; Daiseru Chemicals Industries Co., Ltd., epoxy equivalent: 145)

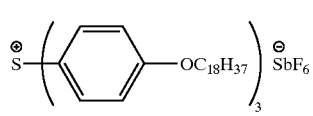 A1
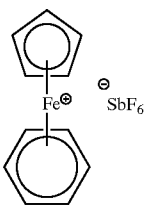 A9
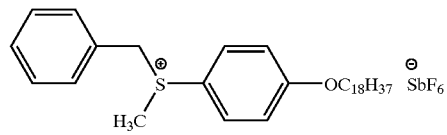 A2
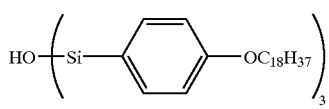 B1
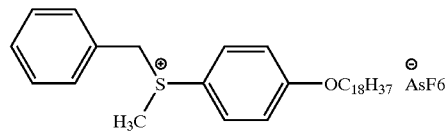 A3
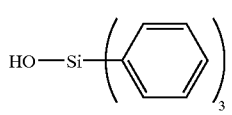 B2
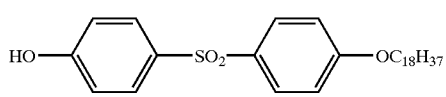 B3
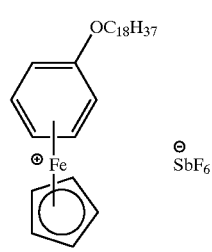 A4
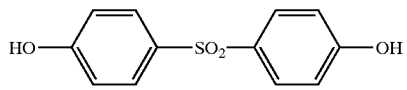 B4
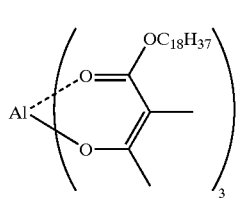 C1
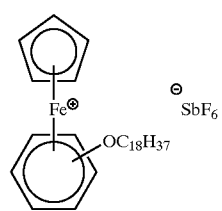 A5
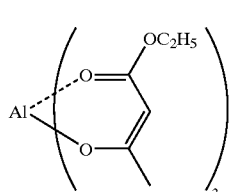 C2
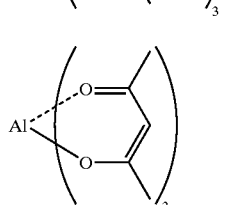 C3

TABLE 1

| Example | Epoxy resin | | Compound | | | | | | | | | | Metal compound | | | 180° C. Volume resistivity |
|---|---|---|---|---|---|---|---|---|---|---|---|---|---|---|---|---|
| | EP1 | EP2 | A1 | A2 | A3 | A4 | A5 | B1 | B2 | B3 | B4 | A8 | C1 | C2 | C3 | [Ω · cm] |
| I-1 | 100 | | 3 | | | | | | | | | | | | | $7 \times 10^9$ |
| I-2 | 100 | | | 3 | | | | | | | | | | | | $7 \times 10^9$ |
| I-3 | 100 | | | | 3 | | | | | | | | | | | $6 \times 10^9$ |
| I-4 | 100 | | | | | 3 | | | | | | | | | | $6 \times 10^9$ |
| I-5 | 100 | | | | | | 3 | | | | | | | | | $7 \times 10^9$ |
| I-6 | 100 | | 3 | | | | | | | | | | 0.1 | | | $1 \times 10^{11}$ |
| I-7 | | 100 | 1 | | | | | | | | | | | | | $5 \times 10^{10}$ |
| I-8 | | 100 | | 1 | | | | | | | | | | | | $6 \times 10^{10}$ |
| I-9 | | 100 | | | 1 | | | | | | | | | | | $5 \times 10^{10}$ |
| I-10 | | 100 | | | | 1 | | | | | | | | | | $5 \times 10^{10}$ |

TABLE 2

| Example | Epoxy resin | | Compound | | | | | | | | | | Metal compound | | | 180° C. volume resistivity |
|---|---|---|---|---|---|---|---|---|---|---|---|---|---|---|---|---|
| | EP1 | EP2 | A1 | A2 | A3 | A4 | A5 | B1 | B2 | B3 | B4 | A8 | C1 | C2 | C3 | [Ω · cm] |
| I-11 | | 100 | 1 | | | | 1 | | | | | | | | | $5 \times 10^{10}$ |
| I-12 | | 100 | 1 | | | | | | | | | | 0.1 | | | $1 \times 10^{12}$ |
| I-13 | 100 | | | | | | 5 | | | | | | 2 | | | $9 \times 10^{13}$ |
| I-14 | 100 | | | | | | 5 | | | | | | | 2 | | $8 \times 10^{13}$ |
| I-15 | 100 | | | | | | 5 | | | | | | | | 2 | $9 \times 10^{13}$ |
| I-16 | 100 | | | | | | | 5 | | | | | 2 | | | $8 \times 10^{13}$ |
| I-17 | | 100 | | | | | 0.1 | | | | | | 0.05 | | | $9 \times 10^{13}$ |
| I-18 | | 100 | | | | | 0.1 | | | | | | | 0.05 | | $9 \times 10^{13}$ |
| I-19 | | 100 | | | | | 0.1 | | | | | | | | 0.05 | $9 \times 10^{13}$ |
| I-20 | | 100 | | | | | | 0.1 | | | | | 0.05 | | | $9 \times 10^{13}$ |

TABLE 3

| Example | Epoxy resin | | Compound | | | | | | | | | | Metal compound | | |
|---|---|---|---|---|---|---|---|---|---|---|---|---|---|---|---|
| | EP1 | EP2 | A1 | A2 | A3 | A4 | A5 | B1 | B2 | B3 | B4 | A8 | C1 | C2 | C3 |
| I-21 | 100 | | | | | | | | | 10 | | | 4 | | |
| I-22 | 100 | | | | | | | | | 10 | | | | 4 | |
| I-23 | 100 | | | | | | | | | 10 | | | | | 4 |
| I-24 | 100 | | | | | | | | | | 10 | | 4 | | |
| I-25 | | 100 | | | | | | | | 5 | | | 1 | | |
| I-26 | | 100 | | | | | | | | 5 | | | | 1 | |
| I-27 | | 100 | | | | | | | | 5 | | | | | 1 |
| I-28 | | 100 | | | | | | | | | 5 | | 1 | | |
| I-29 | 100 | | | | | | | | | | | 3 | | | |
| I-30 | | 100 | | | | | | | | | | 1 | | | |

TABLE 4

| Example | Gelation time (sec.) | Storage stability (month) | Bending strength (kg/mm²) |
|---|---|---|---|
| I-1 | 20 | 12 or more | 12 |
| I-2 | 20 | 12 or more | 12 |
| I-3 | 20 | 12 or more | 12 |
| I-4 | 20 | 12 or more | 12 |
| I-5 | 20 | 12 or more | 12 |
| I-6 | 20 | 12 or more | 12 |
| I-7 | 1 | 3 or more | 14 |
| I-8 | 1 | 3 or more | 14 |
| I-9 | 1 | 3 or more | 13 |
| I-10 | 1 | 3 or more | 13 |
| I-11 | 1 | 3 or more | 13 |
| I-12 | 1 | 3 or more | 13 |
| I-13 | 25 | 2 or more | 12 |
| I-14 | 26 | 2 or more | 13 |
| I-15 | 27 | 2 or more | 12 |
| I-16 | 25 | 2 or more | 14 |
| I-17 | 10 | 1 or more | 15 |
| I-18 | 11 | 1 or more | 16 |
| I-19 | 12 | 1 or more | 16 |
| I-20 | 11 | 1 or more | 15 |
| I-21 | 60 | 3 or more | 12 |
| I-22 | 58 | 3 or more | 12 |
| I-23 | 56 | 3 or more | 12 |
| I-24 | 55 | 3 or more | 12 |
| I-25 | 12 | 1.5 or more | 14 |
| I-26 | 13 | 1.5 or more | 13 |

TABLE 4-continued

| Example | Gelation time (sec.) | Storage stability (month) | Bending strength (kg/mm$^2$) |
|---|---|---|---|
| I-27 | 12 | 1.5 or more | 13 |
| I-28 | 12 | 1.5 or more | 14 |
| I-29 | 20 | 12 or more | 12 |
| I-30 | 1 | 3 or more | 13 |

Comparative Examples (I-1 to I-8)

The epoxy resin compositions having the compositions illustrated in the following Table 5 were prepared by mixing the components at the mixing ratios shown in Table 5. In this case, the compositions A6, A7, B2, B4, C2 and C3 are compounds which are not provided with any long substituent group, so that they are incapable of reversibly repeating the dissolution and precipitation of the compounds through heating and cooling.

TABLE 5

| Comparative Example | Epoxy resin | | Compound | | | | Metal compound | |
|---|---|---|---|---|---|---|---|---|
| | EP1 | EP2 | A6 | A7 | B2 | B4 | C2 | C3 |
| I-1 | 100 | | 3 | | | | | |
| I-2 | 100 | | | 3 | | | | |
| I-3 | | 100 | 1 | | | | | |
| I-4 | | 100 | | 1 | | | | |
| I-5 | 100 | | | | 5 | | 2 | |
| I-6 | | 100 | | | 0.1 | | 0.05 | |
| I-7 | 100 | | | | | 10 | 4 | |
| I-8 | | 100 | | | | 5 | 1 | |

Each composition thus obtained was subjected to measurements with respect to the gelation time (150° C. in Comparative Examples I-1 to I-4, and 150° C. in Comparative Examples I-5 to I-8,), to the storage stability at room temperature and to the mechanical strength after the curing. In this case, the storage stability at room temperature was determined by measuring the time when the viscosity of the resin composition became twice as much as the initial viscosity. While, the mechanical strength after the curing was determined by measuring the bending strength at room temperature of the cured product. The measurement of bending strength was performed on the products which were obtained from the heating process of one hour at 120° C. and one hour at 150° C. in the cases of Comparative Examples I-1 and I-2; one hour at 80° C. and one hour at 150° C. in the cases of Comparative Examples I-3 and I-4; two hours at 200° C. in the cases of Comparative Examples I-5 and I-7; and 20 minutes at 200° C. in the cases of Comparative Examples I-6 and I-8. The results are summarized in the following Table 6.

TABLE 6

| Comparative Example | Gelation time (sec.) | Storage stability | Bending strength (kg/mm$^2$) |
|---|---|---|---|
| I-1 | 20 | 6 months | 12 |
| I-2 | 20 | 6 months | 12 |
| I-3 | 1 | 9 days | 13 |
| I-4 | 1 | 9 days | 13 |
| I-5 | 25 | 15 days | 12 |
| I-6 | 10 | 3 days | 13 |
| I-7 | 50 | 25 days | 12 |
| I-8 | 12 | 10 days | 13 |

As apparent from the results shown in Tables 4 and 6, the epoxy resin compositions of this invention (Examples I-1 to I-30) were found capable of being stored for 12 months or more at room temperature while retaining the curing property that can be effected quickly at high temperatures, thus indicating a high storage stability far exceeding over that of the conventional epoxy resin compositions (Comparative Examples I-1 to I-8).

The epoxy resin compositions of this invention also indicated an excellent mechanical strength after curing.

Example I-31

100 g of EP1, 80g of the compound (AA1) represented by the following chemical formula as an acid anhydride curing agent, 5 g of B1 and 2 g of C1 were mixed together to prepare a composition, which was then heated for two hours at a temperature of 200° C. to obtain a cured product. The bending strength of cured product thus obtained was then measured. Additionally, the storage stability of the composition was also measured.

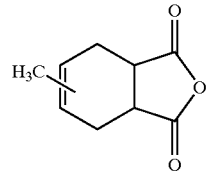

AA1

As a result, the bending strength thereof at room temperature was found 14 kg/mm$^2$. Further, even when this resin composition was left to stand for one month at room temperature, the increase in viscosity thereof was only twice as high as the initial value.

Comparative Example I-9

A resin composition was prepared in the same manner as illustrated in the above Example I-31 except that the curing catalyst B2 was substituted for the curing catalyst B1. Then, the bending strength of this cured product and the storage stability of the composition were measured.

As a result, the bending strength thereof at room temperature was found 14 kg/mm$^2$. Further, when this resin composition was left to stand for one month at room temperature, the viscosity thereof was increased to ten times or more of the initial value.

Example I-32

100 g of EP1, 80 g of the compound (AA1) represented by the aforementioned chemical formula as an acid anhydride curing agent, and 2 g of C1 were mixed together to prepare a composition, which was then heated for two hours at a temperature of 200° C. to obtain a cured product. The bending strength of the cured product thus obtained and the storage stability of the composition were measured.

As a result, the bending strength thereof at room temperature was found 14 kg/mm². Further, even when this resin composition was left to stand for one week at room temperature, the increase in viscosity thereof was only twice as high as the initial value.

Comparative Example I-10

A resin composition was prepared in the same manner as illustrated in the above Example I-32 except that the curing catalyst C2 was substituted for the curing catalyst C1. Then, the bending strength of this cured product and the storage stability of the composition were measured.

As a result, the bending strength thereof at room temperature was found 14 kg/mm². Further, when this resin composition was left to stand for one month at room temperature, the viscosity thereof was increased to ten times or more of the initial value.

Example I-33

φg of EP1, 20 g of the compound (DAM) represented by the following chemical formula as an aromatic amine curing agent, and 2 g of C1 were mixed together to prepare a composition, which was then heated for two hours at a temperature of 200° C. to obtain a cured product. Then, the bending strength of the cured product thus obtained and the storage stability of the composition were measured.

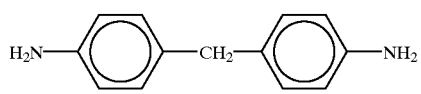

DAM

As a result, the bending strength thereof at room temperature was found 14 kg/mm². Further, even when this resin composition was left to stand for one week at room temperature, the increase in viscosity thereof was only twice as high as the initial value.

Comparative Example I-11

A resin composition was prepared in the same manner as illustrated in the above Example I-33 except that the curing catalyst C2 was substituted for the curing catalyst C1. Then, the bending strength of this cured product and the storage stability of the composition were measured.

As a result, the bending strength thereof at room temperature was found 14 kg/mm². Further, when this resin composition was left to stand at room temperature, the resin composition was gelated after one week.

Example I-34

100 g of EP1, 20 g of the compound (DAM) represented by the aforementioned chemical formula as an aromatic amine curing agent, 5 g of B1 and 2 g of C1 were mixed together to prepare a composition, which was then heated for two hours at a temperature of 200° C. to obtain a cured product. The bending strength of the cured product thus obtained and the storage stability of the composition were measured.

As a result, the bending strength thereof at room temperature was found 14 kg/mm². Further, even when this resin composition was left to stand for one week at room temperature, the increase in viscosity thereof was only twice as high as the initial value.

Comparative Example I-12

A resin composition was prepared in the same manner as illustrated in the above Example I-34 except that the curing catalyst C2 was substituted for the curing catalyst C1, and the curing catalyst B2 was substituted for the curing catalyst B1. Then, the bending strength of this cured product and the storage stability of the composition were measured.

As a result, the bending strength thereof at room temperature was found 14 kg/mm². Further, when this resin composition was left to stand at room temperature, the resin composition was gelated after one week.

As apparent from the above results, it was possible, through the employment of the curing catalysts of this invention, to greatly improve the storage stability of the epoxy resin composition without spoiling the mechanical strength of the cured product.

Example I-35

1 g of A2 as a curing catalyst was added to 100 g of EP1 to prepare a mixture, which was then coated on the surface of a board having a thickness of 0.5 mm. This coated layer was heated at a temperature of 60° C., and then, irradiated for two minutes using an ultraviolet lamp (a 80 W/cm high-pressure mercury lamp) from a distance of 10 cm. As a result, the resin was completely gelated after this irradiation.

When this mixture was left to stand for six months at room temperature, any increase in viscosity thereof was not recognized.

Comparative Example I-13

A mixture was prepared in the same manner as illustrated in the above Example I-35 except that the curing catalyst A6 was substituted for the curing catalyst. The mixture was then irradiated for two minutes using an ultraviolet lamp (a 80 W/cm high-pressure mercury lamp) from a distance of 10 cm. As a result, the resin was completely gelated after this irradiation.

When this mixture was left to stand for one month at room temperature, the viscosity thereof was increased to ten times or more of the initial value.

EXAMPLE II

Examples (II-1 to II-24)

First of all, epoxy resin compositions having the compositions illustrated in the following Tables 7 and 8 were prepared by mixing the components at the mixing ratios shown in Tables 7 and 8. The mixing quantities shown in these Tables are based on weight parts, which are the same in all of the following Tables.

Each composition thus obtained was subjected to measurements with respect to the gelation time at a temperature of 150° C., to the storage stability at room temperature, to the mechanical strength after the curing, and to the electric insulation after the curing. In this case, the storage stability at room temperature was determined by measuring the time when the viscosity of the resin composition became twice as much as the initial viscosity. While, the mechanical strength after the curing was determined by measuring the bending strength at room temperature of the cured product. The measurements of the volume resistivity and the bending strength were performed on the products which were obtained from the heating process of two hours at 200° C. in the cases of Examples II-1 to II-12; and 20 minutes at 200° C. in the cases of Examples II-13 to II-24. The results are summarized in the following Table 9.

The details of components each indicated by an abbreviation are as follows.

OH1
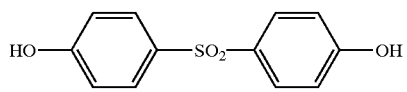
OH2
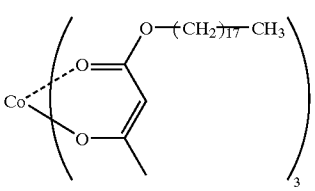
OH3
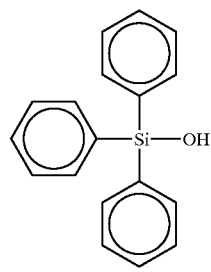
Al1
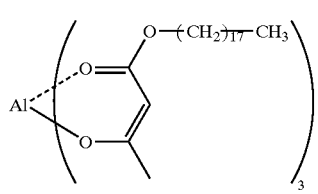
Al2
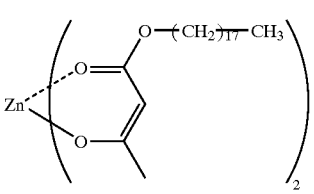
Al3
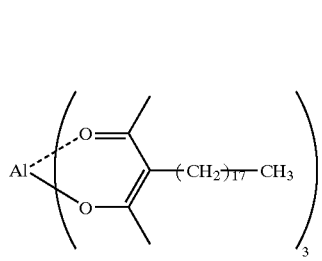
Al4
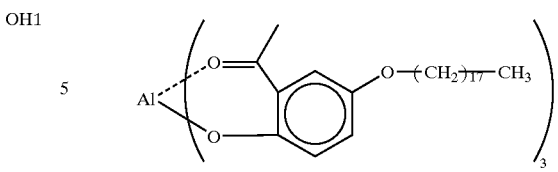
Co1
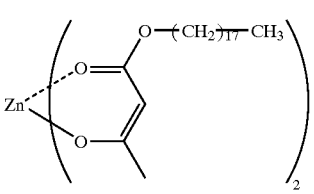
Zn1
P1
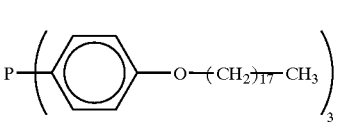
N1
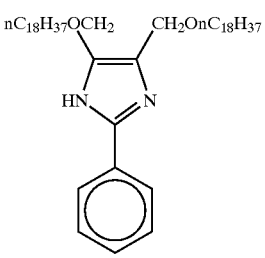
P2
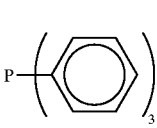
N2
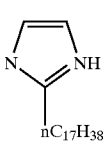

Al5 Al acetylacetone complex
Al6 Al ethylacetoacetate complex
Al7 Al salicylaldehyde complex By the way, EP1 and EP2 are the same epoxy resins as employed in the aforementioned Example I.

TABLE 7

| Example | Epoxy resin | | Compound | | | Complex | | | | | |
|---|---|---|---|---|---|---|---|---|---|---|---|
| No. | EP1 | EP2 | OH1 | OH2 | OH3 | Al1 | Al2 | Al3 | Al4 | Co1 | Zn1 |
| II-1 | 100 | | 5 | | | 2 | | | | | |
| II-2 | 100 | | 5 | | | | 2 | | | | |
| II-3 | 100 | | 5 | | | | | 2 | | | |
| II-4 | 100 | | | 9 | | 2 | | | | | |
| II-5 | 100 | | | 9 | | | 2 | | | | |
| II-6 | 100 | | | 9 | | | | 2 | | | |
| II-7 | 100 | | | | 5 | 2 | | | | | |
| II-8 | 100 | | | | 5 | | 2 | | | | |
| II-9 | 100 | | | | 5 | | | 2 | | | |
| II-10 | 100 | | 5 | | | | | | 2 | | |
| II-11 | 100 | | 5 | | | | | | | 2 | |
| II-12 | 100 | | 5 | | | | | | | | 2 |

TABLE 8

| Example | Epoxy resin | | Compound | | | Complex | | | | | |
|---|---|---|---|---|---|---|---|---|---|---|---|
| No. | EP1 | EP2 | OH1 | OH2 | OH3 | Al1 | Al2 | Al3 | Al4 | Co1 | Zn1 |
| II-13 | | 100 | 3 | | | 1 | | | | | |
| II-14 | | 100 | 3 | | | | 1 | | | | |
| II-15 | | 100 | 3 | | | | | 1 | | | |
| II-16 | | 100 | | 6 | | 1 | | | | | |
| II-17 | | 100 | | 6 | | | 1 | | | | |
| II-18 | | 100 | | 6 | | | | 1 | | | |
| II-19 | | 100 | | | 0.1 | 0.05 | | | | | |
| II-20 | | 100 | | | 0.1 | | 0.05 | | | | |
| II-21 | | 100 | | | 0.1 | | | 0.05 | | | |
| II-22 | | 100 | 3 | | | | | | 1 | | |
| II-23 | | 100 | 3 | | | | | | | 1 | |
| II-24 | | 100 | | | 0.1 | | | | | | 0.05 |

TABLE 9

| Example No. | 150° C. Gelation time (sec.) | Storage stability (month) | Volume resistance $\Omega \cdot cm$ (200° C.) | Bending strength (kg/mm$^2$) (room temp.) |
|---|---|---|---|---|
| II-1 | 60 | 3 or more | $2 \times 10^{13}$ | 13 |
| II-2 | 53 | 3 or more | $4 \times 10^{13}$ | 12 |
| II-3 | 40 | 3 or more | $6 \times 10^{13}$ | 14 |
| II-4 | 65 | 3 or more | $3 \times 10^{13}$ | 11 |
| II-5 | 60 | 3 or more | $2 \times 10^{12}$ | 13 |
| II-6 | 45 | 3 or more | $4 \times 10^{12}$ | 12 |
| II-7 | 20 | 2 or more | $2 \times 10^{13}$ | 14 |
| II-8 | 22 | 2 or more | $2 \times 10^{13}$ | 13 |
| II-9 | 25 | 2 or more | $4 \times 10^{13}$ | 12 |
| II-10 | 40 | 3 or more | $2 \times 10^{13}$ | 13 |
| II-11 | 50 | 2 or more | $4 \times 10^{13}$ | 12 |
| II-12 | 30 | 3 or more | $3 \times 10^{13}$ | 13 |
| II-13 | 14 | 2 or more | $5 \times 10^{13}$ | 11 |
| II-14 | 18 | 2 or more | $5 \times 10^{13}$ | 13 |
| II-15 | 12 | 3 or more | $4 \times 10^{13}$ | 14 |
| II-16 | 32 | 3 or more | $4 \times 10^{13}$ | 14 |
| II-17 | 23 | 3 or more | $6 \times 10^{13}$ | 15 |
| II-18 | 20 | 3 or more | $6 \times 10^{13}$ | 15 |
| II-19 | 10 | 1 or more | $5 \times 10^{13}$ | 15 |
| II-20 | 11 | 1 or more | $7 \times 10^{13}$ | 13 |
| II-21 | 10 | 1 or more | $6 \times 10^{13}$ | 14 |
| II-22 | 10 | 3 or more | $7 \times 10^{13}$ | 13 |
| II-23 | 11 | 2 or more | $4 \times 10^{13}$ | 14 |
| II-24 | 6 | 2 or more | $4 \times 10^{13}$ | 15 |

Comparative Examples (II-1 to II-3)

First of all, epoxy resin compositions having the compositions illustrated in the following Table 10 were prepared by mixing the components at the mixing ratios shown in Table 10. In this case, the compounds Al5, Al6 and Al7 contained respectively a ligand having a short side chain.

TABLE 10

| Comparative Example No. | Epoxy resin EP1 | Compound | | | Al complex | | |
|---|---|---|---|---|---|---|---|
| | | OH1 | OH2 | OH3 | A15 | A16 | A17 |
| II-1 | 100 | 4 | | | 2 | | |
| II-2 | 100 | | 7 | | | 2 | |
| II-3 | 100 | | | 1.5 | | | 2 |

Each composition thus obtained was subjected to measurements with respect to the gelation time at a temperature of 200° C., and to the storage stability at room temperature by the same manner as in the case of Examples II-1 to II-24. The results are shown in the following Table 11.

TABLE 11

| Comparative Example No. | 150° C. Gelation time (sec.) | Storage stability |
|---|---|---|
| II-1 | 59 | 25 days |
| II-2 | 65 | 35 days |
| II-3 | 20 | 15 days |

As apparent from the results shown in Tables 9 and 11, the epoxy resin compositions of this invention (Examples II-1 to II-24) were found to have an excellent storage stability at room temperature, far exceeding over that of the conventional epoxy resin compositions (Comparative Examples II-1 to II-3), while retaining the curing property that can be effected quickly at high temperatures. When the complexes Al1 to Al4 where the central metal was aluminum was employed, and further, when phenol compounds were employed as a compound having hydroxyl group, it was possible to realize an especially higher storage stability.

The epoxy resin compositions of this invention also indicated an excellent mechanical strength and an electric insulation property after curing.

Example II-25

100 g of EP1, 80 g of the compound (AA1) represented by the aforementioned chemical formula as an acid anhydride curing agent, 5 g of OH1 and 2 g of Al1 were mixed together to prepare a composition, which was then heated for two hours at a temperature of 200° C. to obtain a cured product. Then, the electric insulation and bending strength of the cured product thus obtained, and the storage stability of the composition were measured.

As a result, the volume resistance thereof at a temperature of 200° C. was $8 \times 10^{11}$ Ω·cm, and the bending strength thereof at room temperature was found 14 kg/mm$^2$. Further, even when this resin composition was left to stand for one month at room temperature, the increase in viscosity thereof was only twice as high as the initial value.

Comparative Example II-4

A resin composition was prepared in the same manner as illustrated in the above Example II-25 except that the curing catalyst Al5 was substituted for the curing catalyst. Then, the electric insulation and bending strength of this cured product and the storage stability of the composition were measured.

As a result, the volume resistance thereof at a temperature of 200° C. was $8 \times 10^{11}$ Ω·cm, and the bending strength thereof at room temperature was found 14 kg/mm$^2$. Further, when this resin composition was left to stand for one month at room temperature, the viscosity thereof was increased to ten times or more of the initial value.

Example II-26

100 g of EP1, 5 g of OH 1, 20 g of the compound (DAM) represented by the aforementioned chemical formula as an aromatic amine curing agent, and 2 g of Al2 were mixed together to prepare a composition, which was then heated for two hours at a temperature of 200° C. to obtain a cured product. Then, the electric insulation and bending strength of the cured product thus obtained and the storage stability of the composition were measured.

As a result, the volume resistance thereof at a temperature of 200° C. was $8 \times 10^{11}$ Ω·cm, and the bending strength thereof at room temperature was found 14 kg/mm$^2$. Further, even when this resin composition was left to stand for one week at room temperature, the increase in viscosity thereof was only twice as high as the initial value.

Comparative Example II-5

A resin composition was prepared in the same manner as illustrated in the above Example II-26 except that the curing catalyst Al5 was substituted for the curing catalyst. Then, the electric insulation and bending strength of this cured product and the storage stability of the composition were measured.

As a result, the volume resistance thereof at a temperature of 200° C. was $8 \times 10^{11}$ Ω·cm, and the bending strength thereof at room temperature was found 14 kg/mm$^2$. Further, when this resin composition was left to stand at room temperature, this resin composition was gelated after one week.

Example II-27

100 g of EP1, 51 g of phenol novolak resin (Showa Polymer Co., Ltd.; BGR556, OH equivalent weight: 103), and 1 g of P1 were mixed together to prepare a composition, which was then heated for 8 hours at a temperature of 180° C. to obtain a cured product.

Then, the electric insulation and bending strength of the cured product thus obtained and the storage stability of the composition were measured.

As a result, the volume resistance thereof at a temperature of 200° C. was $7 \times 10^{11}$ Ω·cm, and the bending strength thereof at room temperature was found 14 kg/mm$^2$. Further, even when this resin composition was left to stand for one month at room temperature, the increase in viscosity thereof was only twice as high as the initial value.

Comparative Example II-6

100 g of EP1, 51 g of phenol novolak resin (Showa Polymer Co., Ltd.; BGR556, OH equivalent weight: 103), and 1 g of P2 were mixed together to prepare a composition, which was then heated for 8 hours at a temperature of 180° C. to obtain a cured product. Then, the electric insulation and bending strength of the cured product thus obtained and the storage stability of the composition were measured.

As a result, the volume resistance thereof at a temperature of 200° C. was $7 \times 10^{11}$ Ω·cm, and the bending strength thereof at room temperature was found 14 kg/mm². However, when this resin composition was left to stand for one month at room temperature, this resin composition was gelated.

As apparent from the above results, it was possible, through the employment of the curing catalysts of this invention, to greatly improve the storage stability of the epoxy resin composition without spoiling the electric property and mechanical strength of the cured product.

Example II-28

100 g of EP1, 100 g of AA1 as an acid anhydride curing agent, and 0.3 g of N1 were mixed together to prepare a composition, which was then heated for 4 hours at a temperature of 150° C. to obtain a cured product. Then, the electric insulation and bending strength of the cured product thus obtained and the storage stability of the composition were measured.

As a result, the volume resistance thereof at a temperature of 200° C. was $7 \times 10^{11}$ Ω·cm, and the bending strength thereof at room temperature was found 14 kg/mm². Further, even when this resin composition was left to stand for one month at room temperature, the increase in viscosity thereof was only twice as high as the initial value. Additionally, when the shrinkage factor of the cured product was measured from the specific gravities of the cured product and uncured resin on the basis of JISK-6911-1970, the shrinkage factor was found as being 0.1%.

Comparative Example II-7

100 g of EP1, 100 g of AA1 as an acid anhydride curing agent, and 0.3 g of N2 were mixed together to prepare a composition, which was then heated for 4 hours at a temperature of 150° C. to obtain a cured product. Then, the electric insulation and bending strength of the cured product thus obtained and the storage stability of the composition were measured.

As a result, the volume resistance thereof at a temperature of 200° C. was $7 \times 10^{11}$ Ω·cm, and the bending strength thereof at room temperature was found 14 kg/mm². However, when this resin composition was left to stand for one month at room temperature, the increase in viscosity thereof was four times as high as the initial value. Additionally, when the shrinkage factor of the cured product was measured in the same manner as explained above, the shrinkage factor was found as being 0.25%.

As apparent from the above results, it was possible, through the employment of the curing catalysts of this invention, to greatly improve the storage stability of the epoxy resin composition without spoiling the electric property and mechanical strength of the cured product. Furthermore, since the shrinkage factor of the molded product can be reduced, it is possible to obtain a resin composition having an excellent dimension stability.

EXAMPLE III

In this example, liquid epoxy resin compositions were prepared, and then, a resin-sealed semiconductor devices were prepared by sealing a semiconductor element by making use of these liquid epoxy resin compositions. Thereafter, the properties of the resultant semiconductor devices were investigated.

Followings are the components that were employed for the preparation of these liquid epoxy resin compositions.

EP3: Epi-bis type epoxy resin (EPICOAT 806; Yuka Shell Epoxy Kabushikikaisha, epoxy equivalent: 160–170)

EP4: Alicyclic epoxy resin (CELOXIDE 2021A; Daiseru Chemicals Industries Co., Ltd., epoxy equivalent: 135)

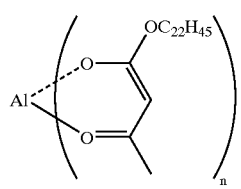

Al8

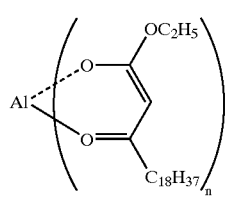

Al9

NN1: Microcapsule (imidazol type; Asahi Kasei Co., Ltd., HX-3088, reaction-initiating temperature: 87° C.)

NN2: Boron trifluoride monoethyl amine (Tokyo Kasei Industries, Ltd.).

BS: Aliphatic sulfonium salt of Brensted acid (Asahi Denka Industries, Ltd., OPTON CP-66)

PN1: MEH-8005; phenol novolak resin; hydroxyl equivalent: 135, viscosity: 47.4 poises (25° C.)

AN: MH-700; acid anhydride; acid anhydride equivalent: 166, viscosity: 0.62 poises (25° C.)

F1: Spherical silica; average particle diameter: 3.3 μm, maximum particle diameter: 15 μm F2: Spherical silica; average particle diameter: 1.5 μm, maximum particle diameter: 5 μm By the way, OH1, OH3 and All are the same compounds as employed in the aforementioned Example II.

At first, each component were mixed together according to the compositions shown in the following Tables 12 to 15. Then, these components were sufficiently mixed for 10 minutes using a universal mixer (a rotation speed of 100 rpm, at room temperature) thereby to obtain the liquid epoxy resin compositions of Examples III-1 to III-15, and of Comparative Examples III-1 to III-10.

TABLE 12

|  |  | Example | | | | | | | |
|---|---|---|---|---|---|---|---|---|---|
|  |  | III-1 | III-2 | III-3 | III-4 | III-5 | III-6 | III-7 | III-8 |
| Epoxy resin | EP3 | 100 | 100 | 100 |  |  |  | 100 |  |
|  | EP4 |  |  |  | 100 | 100 | 100 |  | 100 |
| Curing agent | PN1 |  |  |  |  |  |  |  |  |
|  | AN1 |  |  |  |  |  |  |  |  |

TABLE 12-continued

|  |  | Example | | | | | | | |
|---|---|---|---|---|---|---|---|---|---|
|  |  | III-1 | III-2 | III-3 | III-4 | III-5 | III-6 | III-7 | III-8 |
| Catalyst A | OH1 | 10 | 10 | 10 |  |  |  | 10 |  |
|  | OH3 |  |  |  | 3 | 3 | 3 |  | 3 |
| Catalyst B | A11 | 5 |  |  | 2 |  |  | 5 |  |
|  | A18 |  | 5 |  |  | 2 |  |  | 2 |
|  | A19 |  |  | 5 |  |  | 2 |  |  |
| Catalyst C | NN1 |  |  |  |  |  |  |  |  |
|  | NN2 |  |  |  |  |  |  |  |  |
|  | BS |  |  |  |  |  |  |  |  |
| Filler | F1 | 70 | 70 | 70 | 105 | 105 | 105 | 0 | 0 |
|  | F2 | 30 | 30 | 30 | 45 | 45 | 45 | 100 | 150 |

TABLE 13

|  |  | Example | | | | | | |
|---|---|---|---|---|---|---|---|---|
|  |  | III-9 | III-10 | III-11 | III-12 | III-13 | III-14 | III-15 |
| Epoxy resin | EP3 | 56 |  | 66 |  | 100 |  | 56 |
|  | EP4 |  | 47 |  | 59 |  | 100 |  |
| Curing agent | PN1 |  |  |  |  |  |  |  |
|  | AN1 | 44 | 53 | 34 | 41 |  |  | 44 |
| Catalyst A | OH1 |  |  |  |  |  |  | 3 |
|  | OH3 |  |  |  |  |  |  |  |
| Catalyst B | A11 |  |  |  |  |  |  | 1 |
|  | A18 |  |  |  |  |  |  |  |
|  | A19 |  |  |  |  |  |  |  |
| Catalyst C | NN1 |  |  |  |  |  |  |  |
|  | NN2 |  |  |  |  |  |  |  |
|  | BS |  |  |  |  |  |  |  |
| Filler | F1 | 70 | 105 | 70 | 105 | 70 | 105 | 70 |
|  | F2 | 30 | 45 | 30 | 45 | 30 | 45 | 30 |
| catalyst | P1 | 1 | 1 |  |  |  |  |  |
|  | N1 |  |  | 1 | 1 |  |  |  |
|  | A1 |  |  |  |  | 2 | 1 |  |

TABLE 14

|  |  | Comparative Example | | | | |
|---|---|---|---|---|---|---|
|  |  | III-1 | III-2 | III-3 | III-4 | III-5 |
| Epoxy Resin | EP3 | 100 | 100 | 100 |  |  |
|  | EP4 |  |  |  | 100 | 100 |
| Curing Agent | PN1 |  |  |  |  |  |
|  | AN1 |  |  |  |  |  |
| Catalyst A | OH1 |  |  |  |  |  |
|  | OH3 |  |  |  |  |  |
| Catalyst B | A11 |  |  |  |  |  |
|  | A18 |  |  |  |  |  |
|  | A19 |  |  |  |  |  |
| Catalyst C | NN1 | 30 |  |  | 10 |  |
|  | NN2 |  | 7 |  |  | 5 |
|  | BS |  |  | 2 |  |  |
| Filler | F1 | 70 | 70 | 70 | 105 | 105 |
|  | F2 | 30 | 30 | 30 | 45 | 45 |

TABLE 15

|  |  | Comparative Example | | | | |
|---|---|---|---|---|---|---|
|  |  | III-6 | III-7 | III-8 | III-9 | III-10 |
| Epoxy Resin | EP3 |  | 56 |  | 66 |  |
|  | EP4 | 100 |  | 47 |  | 59 |
| Curing Agent | PN1 |  |  |  |  |  |
|  | AN1 |  | 44 | 53 | 34 | 41 |

TABLE 15-continued

|  |  | Comparative Example | | | | |
|---|---|---|---|---|---|---|
|  |  | III-6 | III-7 | III-8 | III-9 | III-10 |
| Catalyst A | OH1 |  |  |  |  |  |
|  | OH3 |  |  |  |  |  |
| Catalyst B | A11 |  |  |  |  |  |
|  | A18 |  |  |  |  |  |
|  | A19 |  |  |  |  |  |
| Catalyst C | NN1 |  |  |  |  |  |
|  | NN2 |  |  |  |  |  |
|  | BS | 1 |  |  |  |  |
| Filler | F1 | 105 | 70 | 105 | 70 | 105 |
|  | F2 | 45 | 30 | 45 | 30 | 45 |
| catalyst | P2 |  | 1 | 1 |  |  |
|  | N2 |  |  |  | 1 | 1 |

The epoxy resin compositions of Examples III-1 to III-15, and of Comparative Examples III-1 to III-10 were then subjected to the measurements with respect to the following properties. The results are summarized in the following Tables 16 to 23.

In the measurement of properties other than the viscosity of the resin compositions, test pieces were obtained by heat-treating the epoxy resin compositions at a temperature of 150° C. for 15 hours so as to cure the epoxy resin compositions in Examples III-1 to III-3, III-7, III-9, III-11 and III-15, and in Comparative Examples III-1 to III-3, III-7 and III-9. On the other hand, in the cases of Examples III-4 to III-6 and III-8, and Comparative Examples III-4 to III-6, test pieces were obtained by heat-treating the epoxy resin compositions at a temperature of 150° C. for 2 hours so as to cure the epoxy resin compositions. Further, in the cases of Examples III-10 and III-12, and Comparative Examples III-8 and III-10, test pieces were obtained by heat-treating the epoxy resin compositions at a temperature of 120° C. for 2 hours and 150° C. for 8 hours, while in the cases of Examples III-13 and III-14, test pieces were obtained by heat-treating the epoxy resin compositions at a temperature of 120° C. for one hour and 150° C. for two hours.

The properties of these epoxy resin compositions were measured as follows.

Viscosity:

The measurement was performed using an E-type viscometer (Thoki Sangyo, Co., Ltd.) at a temperature of 25° C.

Glass Transition Temperature and Thermal Expansion Coefficient:

The measurement of the test pieces was performed using TMA (Seiko Electron, Co., Ltd.).

Bending Strength and Elastic Modulus in Bending:

The measurement of the test pieces was performed according to the procedures of JIS K-6911.

Storage Stability:

The measurements of the viscosity immediately after the manufacture and of the viscosity one month after the manufacture were performed on the aforementioned liquid epoxy resin composition, and an increase in viscosity after one month of the liquid epoxy resin composition over the viscosity immediately after the manufacture was calculated. The storage temperature in this case was 30° C., and the measurement of viscosity was performed using an E-type viscometer (Thoki Sangyo, Co., Ltd.) under the conditions of 6 rpm in revolution speed and 25° C. in temperature.

On the other hand, test semiconductor elements (12 mm×12 mm chip) were manufactured using a plastic substrate on which a chip was bonded through bump-bonding (100 in solder bump). In these semiconductor elements, the gap between the plastic substrate and the chip was set to 50 μm. Then, each liquid epoxy resin composition of Examples III-1 to III-15 and Comparative Examples III-1 to III-10 was charged into a dispenser and a predetermined volume of the liquid epoxy resin composition was discharged into the aforementioned gap in the test semiconductor element, thereby sealing the gap. In this case, the temperature of the substrate was set to 80° C.

After the test semiconductor element was completely sealed with the resin composition, the resin composition was allowed to cure under the same heat treatment conditions as performed in the manufacture of the test pieces. After this curing treatment, the resultant resin-sealed semiconductor devices were subjected at first to an initial check for defective and then to a heating/cooling cycle test and a reliability test under the following conditions. The results are summarized in the following Tables 16 to 23.

TABLE 16

| Example | | III-1 | III-2 | III-3 | III-4 | III-5 | III-6 | III-7 | III-8 |
|---|---|---|---|---|---|---|---|---|---|
| Glass transition temp. (° C.) | | 120 | 120 | 120 | 140 | 135 | 140 | 120 | 130 |
| Thermal expansion coefficient ($\times 10^{-5}$/° C.) | | 40 | 40 | 40 | 32 | 32 | 32 | 36 | 32 |
| Bending strength (25° C.) (Kg/mm$^2$) | | 13 | 13 | 13 | 19 | 19 | 19 | 13 | 19 |
| Bending modulus (25° C.) (Kg/mm$^2$) | | 700 | 700 | 700 | 920 | 920 | 920 | 720 | 910 |
| Defective (%) in initial check | | 0 | 0 | 0 | 0 | 0 | 0 | 0 | 0 |
| Heating/cooling cycle test | 100 | 0/20 | 0/20 | 0/20 | 0/20 | 0/20 | 0/20 | 0/20 | 0/20 |
| (−60 to 150° C.) | 200 | 0/20 | 0/20 | 0/20 | 0/20 | 0/20 | 0/20 | 0/20 | 0/20 |
| Defective/total samples | 500 | 0/20 | 0/20 | 0/20 | 0/20 | 0/20 | 0/20 | 0/20 | 0/20 |
| | 1000 | 0/20 | 0/20 | 0/20 | 0/20 | 0/20 | 0/20 | 0/20 | 0/20 |
| | 1500 | 0/20 | 0/20 | 0/20 | 0/20 | 0/20 | 0/20 | 0/20 | 0/20 |
| Moisture resistance test | 100 | 0/20 | 0/20 | 0/20 | 0/20 | 0/20 | 0/20 | 0/20 | 0/20 |
| (125° C., 2.5 atm) | 200 | 0/20 | 0/20 | 0/20 | 0/20 | 0/20 | 0/20 | 0/20 | 0/20 |
| Defective/total samples | 500 | 0/20 | 0/20 | 0/20 | 0/20 | 0/20 | 0/20 | 0/20 | 0/20 |
| | 1000 | 0/20 | 0/20 | 0/20 | 0/20 | 0/20 | 0/20 | 0/20 | 0/20 |
| | 1500 | 0/20 | 0/20 | 0/20 | 0/20 | 0/20 | 0/20 | 0/20 | 0/20 |

TABLE 17

| Example | | III-9 | III-10 | III-11 | III-12 | III-13 | III-14 | III-15 |
|---|---|---|---|---|---|---|---|---|
| Glass transition temp. (° C.) | | 130 | 140 | 130 | 140 | 120 | 150 | 125 |
| Thermal expansion coefficient ($\times 10^{-5}$/° C.) | | 40 | 31 | 39 | 32 | 40 | 31 | 41 |
| Bending strength (25° C.) (Kg/mm$^2$) | | 13 | 19 | 13 | 18 | 13 | 19 | 13 |
| Bending modulus (25° C.) (Kg/mm$^2$) | | 800 | 960 | 800 | 960 | 700 | 940 | 800 |
| Defective (%) in initial check | | 0 | 0 | 0 | 0 | 0 | 0 | 0 |
| Heating/cooling cycle test | 100 | 0/20 | 0/20 | 0/20 | 0/20 | 0/20 | 0/20 | 0/20 |
| (−60 to 150° C.) | 200 | 0/20 | 0/20 | 0/20 | 0/20 | 0/20 | 0/20 | 0/20 |
| Defective/total samples | 500 | 0/20 | 0/20 | 0/20 | 0/20 | 0/20 | 0/20 | 0/20 |
| | 1000 | 0/20 | 0/20 | 0/20 | 0/20 | 0/20 | 0/20 | 0/20 |
| | 1500 | 0/20 | 0/20 | 0/20 | 0/20 | 0/20 | 0/20 | 0/20 |
| Moisture resistance test | 100 | 0/20 | 0/20 | 0/20 | 0/20 | 0/20 | 0/20 | 0/20 |
| (125° C., 2.5 atm) | 200 | 0/20 | 0/20 | 0/20 | 0/20 | 0/20 | 0/20 | 0/20 |
| Defective/total samples | 500 | 0/20 | 0/20 | 0/20 | 0/20 | 0/20 | 0/20 | 0/20 |
| | 1000 | 0/20 | 0/20 | 0/20 | 0/20 | 0/20 | 0/20 | 0/20 |
| | 1500 | 0/20 | 0/20 | 0/20 | 0/20 | 0/20 | 0/20 | 0/20 |

TABLE 18

| Example | III-1 | III-2 | III-3 | III-4 | III-5 | III-6 | III-7 | III-8 |
|---|---|---|---|---|---|---|---|---|
| External appearance of resin filled | ○ | ○ | ○ | ○ | ○ | ○ | ○ | ○ |
| Generation of voids | ○ | ○ | ○ | ○ | ○ | ○ | ○ | ○ |
| Generation of flow mark | ○ | ○ | ○ | ○ | ○ | ○ | ○ | ○ |
| Filling time (min) | 6 | 6 | 6 | 5 | 5 | 5 | 6 | 6 |
| Generation of peel-off | ○ | ○ | ○ | ○ | ○ | ○ | ○ | ○ |
| Adhesivity/penetration of ink (mm) | 0 | 0 | 0 | 0 | 0 | 0 | 0 | 0 |
| Storage stability (times) | 1.1 | 1.1 | 1.1 | 1.2 | 1.2 | 1.2 | 1.1 | 1.2 |

TABLE 19

| Example | III-9 | III-10 | III-11 | III-12 | III-13 | III-14 | III-15 |
|---|---|---|---|---|---|---|---|
| External appearance of resin filled | ○ | ○ | ○ | ○ | ○ | ○ | ○ |
| Generation of voids | ○ | ○ | ○ | ○ | ○ | ○ | ○ |
| Generation of flow mark | ○ | ○ | ○ | ○ | ○ | ○ | ○ |
| Filling time (min) | 4.5 | 4 | 4.5 | 4 | 4.5 | 4 | 4 |
| Generation of peel-off | ○ | ○ | ○ | ○ | ○ | ○ | ○ |
| Adhesivity/penetration of ink (mm) | 0 | 0 | 0 | 0 | 0 | 0 | 0 |
| Storage stability (times) | 1.3 | 1.3 | 1.3 | 1.3 | 1.1 | 1.1 | 1.3 |

TABLE 20

| Comparative Example | | III-1 | III-2 | III-3 | III-4 | III-5 |
|---|---|---|---|---|---|---|
| Glass transition temp. (° C.) | | 140 | 125 | 145 | not cured | 160 |
| Thermal expansion coefficient (× 10$^{-5}$/° C.) | | 40 | 40 | 40 | — | 32 |
| Bending strength (25° C.) (Kg/mm$^2$) | | 14 | 11 | 12 | — | 19 |
| Bending modulus (25° C.) (Kg/mm$^2$) | | 70 | 690 | 710 | — | 720 |
| Defective (%) in initial check | | 5 | 6 | 0 | — | 0 |
| Heating/cooling cycle test (−60 to 150° C.) Defective/total samples | 100 | 0/20 | 0/20 | 0/20 | — | 0/20 |
| | 200 | 0/20 | 0/20 | 0/20 | — | 4/20 |
| | 500 | 2/20 | 4/20 | 0/20 | — | 8/20 |
| | 1000 | 8/20 | 10/20 | 0/20 | — | 13/20 |
| | 1500 | 16/20 | 17/20 | 0/20 | — | 17/20 |
| Moisture resistance test (125° C., 2.5 atm) Defective/total samples | 100 | 0/20 | 4/20 | 0/20 | — | 6/20 |
| | 200 | 2/20 | 6/20 | 0/20 | — | 10/20 |
| | 500 | 4/20 | 9/20 | 0/20 | — | 12/20 |
| | 1000 | 6/20 | 13/20 | 0/20 | — | 16/20 |
| | 1500 | 10/20 | 18/20 | 0/20 | — | 19/20 |

TABLE 21

| Comparative Example | | III-6 | III-7 | III-8 | III-9 | III-10 |
|---|---|---|---|---|---|---|
| Glass transition temp. (° C.) | | 180 | 130 | 140 | 130 | 140 |
| Thermal expansion coefficient (× 10$^{-5}$/° C.) | | 33 | 40 | 32 | 39 | 32 |
| Bending strength (25° C.) (Kg/mm$^2$) | | 20 | 13 | 18 | 13 | 18 |
| Bending modulus (25° C.) (Kg/mm$^2$) | | 720 | 800 | 970 | 800 | 950 |
| Defective (%) in initial check | | 0 | 0 | 0 | 0 | 0 |
| Heating/cooling cycle test (−60 to 150° C.) Defective/total samples | 100 | 0/20 | 0/20 | 0/20 | 0/20 | 0/20 |
| | 200 | 0/20 | 0/20 | 0/20 | 0/20 | 0/20 |
| | 500 | 0/20 | 0/20 | 0/20 | 0/20 | 0/20 |
| | 1000 | 0/20 | 0/20 | 0/20 | 0/20 | 0/20 |
| | 1500 | 0/20 | 0/20 | 0/20 | 0/20 | 0/20 |
| Moisture resistance test (125° C., 2.5 atm) Defective/total samples | 100 | 0/20 | 0/20 | 0/20 | 0/20 | 0/20 |
| | 200 | 0/20 | 0/20 | 0/20 | 0/20 | 0/20 |
| | 500 | 0/20 | 2/20 | 1/20 | 2/20 | 1/20 |
| | 1000 | 0/20 | 4/20 | 3/20 | 4/20 | 3/20 |
| | 1500 | 2/20 | 7/20 | 5/20 | 7/20 | 6/20 |

TABLE 22

| Comparative Example | III-1 | III-2 | III-3 | III-4 | III-5 |
|---|---|---|---|---|---|
| External appearance of resin filled | x | ○ | ○ | ○ | ○ |
| Generation of voids | x | ○ | ○ | ○ | ○ |
| Generation of flow mark | x | ○ | ○ | x | ○ |
| Filling time (min) | 20 and more | 7 | 8 | 7 | 6 |
| Generation of peel-off | x | x | ○ | x | x |
| Adhesivity/penetration of ink (mm) | 4 | 2 | 2 | 3 | 2 |
| Storage stability (times) | 1.1 | 10< | 1.1 | 1.0 | 10< |

TABLE 23

| Comparative Example | III-6 | III-7 | III-8 | III-9 | III-10 |
|---|---|---|---|---|---|
| External appearance of resin filled | ○ | ○ | ○ | ○ | ○ |
| Generation of voids | x | ○ | ○ | ○ | ○ |
| Generation of flow mark | ○ | ○ | ○ | ○ | ○ |
| Filling time (min) | 7 | 5 | 5 | 5 | 5 |
| Generation of peel-off | x | ○ | ○ | ○ | ○ |
| Adhesivity/penetration of ink (mm) | 4 | 1 | 0 | 1 | 0 |
| Storage stability (times) | 10< | 10< | 10< | 10< | 10< |

By the way, the initial check for defective was performed after the mounting of a semiconductor device on the substrate and before the heating/cooling test and the moisture reliability evaluation in order to investigate any existence of open-defective in the semiconductor device, and to check the operation of the semiconductor device.

The thermal shock resistance of the resin-sealed semiconductor device was evaluated by conducting a heating/cooling cycle test (TCT test) on each resin-sealed semiconductor device. In this test, the heating/cooling cycle was repeated and then, the operation of the device was checked to investigate the percent defective, each heating/cooling cycle being consisted of −65° C. (30 minutes)/room temperature (5 minutes)/150° C. (30 minutes)/room temperature (5 minutes).

The moisture resistance reliability of the resin-sealed semiconductor device was evaluated by way of a pressure cooker test (PCT test). Specifically, the resin-sealed semiconductor device was left to stand in an atmosphere of saturated water vapor at a temperature of 121° C. under a pressure of 2.0 atm. to investigate the percent defective, thus evaluating the moisture resistance reliability.

Figure 2:
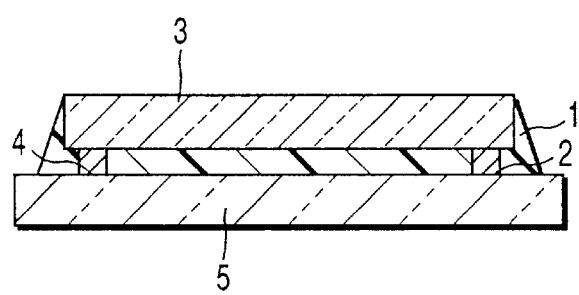
FIG. 2 is a cross-sectional view schematically illustrating a resin-sealed glass semiconductor device which is sealed using a liquid epoxy resin composition according to this invention.

Further, as shown in FIG. 1, a glass semiconductor element for test (12 mm×12 mm chip) was manufactured using a glass chip provided with glass bumps and a glass substrate on which the glass chip was press-bonded through an epoxy resin-based adhesive which was coated in advance on the tip end of each glass bump. The distance of the gap formed between the glass substrate and the glass chip in this glass semicon-ductor element for test was 30 $\mu$m. Then, each liquid epoxy resin composition of Examples III-1 to III-15 and Comparative Examples III-1 to III-10 was introduced into the gap between the glass substrate and the glass chip to prepare a resin-sealed glass semiconductor device as shown in FIG. 2.

In order to evaluate the filling performance of the resin-sealed glass semiconductor device, the following measurements and assessments were performed, the results being summarized in the aforementioned Tables 16 to 23.

External Appearance:

The uniformity of the liquid epoxy resin composition filled in the resin-sealed glass semiconductor device was observed by means of a microscope. When the liquid epoxy resin composition filled therein was uniform, it was marked by a symbol of "○".

Existence of Voids:

The generation of voids inside the liquid epoxy resin composition filled in the resin-sealed glass semiconductor device was observed by means of an ultrasonic detector. When no void was recognized therein, it was marked by a symbol of "○".

Existence of Flow Marks:

The generation of flow marks in the liquid epoxy resin composition filled in the resin-sealed glass semiconductor device was visually inspected. When no flow mark was recognized therein, it was marked by a symbol of "○".

Measurement of Filling Time:

The time (min.) required to reach a height of 15 $\mu$m in filling quantity of the liquid epoxy resin composition was measured in the operation of filling the gap (30 $\mu$m) between the glass substrate and the glass chip with the liquid epoxy resin composition.

Generation of Peeled Portions:

The generation of peeled portions in the resin-sealed glass semiconductor device was checked by means of a microscope and an ultrasonic detector. When no peeled portion was recognized therein, it was marked by a symbol of "○".

Adhesivity:

The adhesivity was assessed by measuring the distance of penetration (mm) of an ink into an interface between the glass chip and the glass substrate in the interior of the resin-sealed glass semiconductor device.

Specifically, the resin-sealed semiconductor device for test was placed in a pressure cooker filled with a red ink and allowed to stand in an atmosphere of 2.5 atm. at a temperature of 128° C. After the resin-sealed semiconductor device was washed with water and the water was wiped off, the penetration of the ink into an interface between the glass chip and the glass substrate was measured by making use of a microscope.

Since the liquid epoxy resin compositions of this invention (Examples III-1 to III-15) were incorporated with novel latent curing catalysts, the storage stability thereof was more excellent as compared with that of the conventional liquid epoxy resin compositions. When a microcapsule type catalyst (Comparative Example III-1) was employed, it was incapable of reacting with an alicyclic epoxy resin even though it had a latency with respect to an epi-bis type epoxy resin. By contrast, the latent catalysts according to this invention did not exhibited such a phenomenon, but reacted with every types of epoxy resin thereby to cure the epoxy resins.

Further, the semiconductor devices wherein a semiconductor element was sealed using the liquid epoxy resin compositions of this invention indicated 0% defective in the initial check, and no defective was recognized in the heating/cooling cycle test and also in the moisture resistance reliability test. Therefore, it can be seen that the semiconductor devices obtained according to this invention were excellent in thermal shock resistance as well as in moisture resistance reliability as compared with those of Comparative Examples.

The resin-sealed glass semiconductor devices wherein a glass chip was sealed using the liquid epoxy resin compositions of this invention indicated a more excellent external appearance as compared with those of Comparative Examples. Thus, the generation of voids, flow marks and peeled portions was not recognized. Additionally, it will be seen that it was possible according to this invention to shorten the filling time, and to improve the adhesivity, mold stability, filling performance and moisture resistance reliability.

Next, by using a cyanate ester compound as a curing agent, the liquid epoxy resin compositions of Examples III-16 to III-20, and Comparative Examples III-11 and III-12 were prepared according to the recipe shown in the following Table 24.

The components employed in this case were shown below.

CE1: Ethylidene-4,4-phenylene dicyanate

Al10: Aluminum tris(ethylacetoacetate)

The components other than these components are the same as employed in the above examples.

TABLE 24

|  |  | Example | | | | | Comparative Example | |
|---|---|---|---|---|---|---|---|---|
|  |  | III-6 | III-7 | III-8 | III-9 | III-10 | III-11 | III-12 |
| Epoxy resin | EP1 | 50 | 50 |  |  | 50 | 50 |  |
|  | EP2 |  |  | 50 | 50 |  |  | 50 |
| Curing agent | CE1 | 50 | 50 | 50 | 50 | 50 | 50 | 50 |
| Catalyst A | OH1 |  |  |  |  | 1 |  |  |
|  | OH3 |  |  |  |  |  |  |  |
| Catalyst B | A11 | 0.1 |  | 0.1 |  |  |  |  |
|  | A18 |  | 0.1 |  | 0.1 |  |  |  |
|  | A19 |  |  |  |  | 0.1 |  |  |
|  | A110 |  |  |  |  |  | 0.1 | 0.1 |
| Catalyst C | NN1 |  |  |  |  |  |  |  |
|  | NN2 |  |  |  |  |  |  |  |
|  | BS |  |  |  |  |  |  |  |
| Filler | F1 | 70 | 70 | 105 | 105 | 105 | 70 | 105 |
|  | F2 | 30 | 30 | 45 | 45 | 45 | 30 | 45 |

The general properties as explained above were measured on the liquid epoxy resin compositions of Examples III-16 to III-20, and Comparative Examples III-11 and III-12, the results thereof being summarized in the following Tables 25 to 26.

In the measurement of properties other than the viscosity of the resin compositions, test pieces were obtained by heat-treating the epoxy resin compositions at a temperature of 120° C. for one hour, and then, at a temperature of 165° C. for 2 hours so as to cure the epoxy resin compositions in Examples III-16 to III-20, and Comparative Examples III-11 and III-12.

A glass semiconductor element for test was manufactured in the same manner as explained above, and then, each liquid epoxy resin composition was introduced into the gap between the glass substrate and the glass chip to prepare a resin-sealed glass semiconductor device. Then, the measurement and assessment of the filling performance of the resin-sealed glass semiconductor device thus obtained were performed in the same manner as explained above, the results being summarized in the following Tables 25 and 26.

TABLE 25

|  | | Example | | | | | Comparative Example | |
|---|---|---|---|---|---|---|---|---|
|  | | III-16 | III-17 | III-18 | III-19 | III-20 | III-11 | III-12 |
| Glass transition temp. (° C.) | | 130 | 130 | 140 | 140 | 131 | 130 | 140 |
| Thermal expansion coefficient (× $10^{-5}$/° C.) | | 40 | 40 | 40 | 32 | 38 | 32 | 32 |
| Bending strength (25° C.) (Kg/mm²) | | 13 | 13 | 19 | 19 | 13 | 13 | 19 |
| Bending modulus (25° C.) (Kg/mm²) | | 750 | 750 | 800 | 800 | 760 | 750 | 800 |
| Defective (%) in initial check | | 0 | 0 | 0 | 0 | 0 | 0 | 0 |
| Heating/ cooling cycle test (−60 to 150° C.) | 100 | 0/20 | 0/20 | 0/20 | 0/20 | 0/20 | 0/20 | 0/20 |
|  | 200 | 0/20 | 0/20 | 0/20 | 0/20 | 0/20 | 0/20 | 0/20 |
|  | 500 | 0/20 | 0/20 | 0/20 | 0/20 | 0/20 | 0/20 | 0/20 |
|  | 1000 | 0/20 | 0/20 | 0/20 | 0/20 | 0/20 | 0/20 | 0/20 |
| Defective/ total samples | 1500 | 0/20 | 0/20 | 0/20 | 0/20 | 0/20 | 0/20 | 0/20 |
| Moisture resistance test (125° C., 2.5 atm) | 100 | 0/20 | 0/20 | 0/20 | 0/20 | 0/20 | 0/20 | 0/20 |
|  | 200 | 0/20 | 0/20 | 0/20 | 0/20 | 0/20 | 0/20 | 0/20 |
|  | 500 | 0/20 | 0/20 | 0/20 | 0/20 | 0/20 | 0/20 | 0/20 |
|  | 1000 | 0/20 | 0/20 | 0/20 | 0/20 | 0/20 | 0/20 | 0/20 |
| Defective/ total samples | 1500 | 0/20 | 0/20 | 0/20 | 0/20 | 0/20 | 0/20 | 0/20 |

TABLE 26

|  | Example | | | | | Comparative Example | |
|---|---|---|---|---|---|---|---|
|  | III-16 | III-17 | III-18 | III-19 | III-20 | III-11 | III-12 |
| External appearance of resin filled | ○ | ○ | ○ | ○ | ○ | ○ | ○ |
| Generation of voids | ○ | ○ | ○ | ○ | ○ | ○ | ○ |
| Generation of flow mark | ○ | ○ | ○ | ○ | ○ | ○ | ○ |
| Filling time (min) | 6 | 6 | 6 | 5 | 5.5 | 5 | 5 |
| Generation of peel-off | ○ | ○ | ○ | ○ | ○ | ○ | ○ |
| Adhesivity/penetration of ink (mm) | 0 | 0 | 0 | 0 | 0 | 0 | 0 |
| Storage stability (times) | 1.2 | 1.2 | 1.2 | 1.2 | 1.2 | 10 | 10 |

Since the liquid epoxy resin compositions of this invention (Examples III-16 to III-20) were incorporated with novel latent curing catalysts, the storage stability thereof was more excellent as compared with that of the conventional liquid epoxy resin compositions.

Further, the semiconductor devices wherein a semiconductor element was sealed using the liquid epoxy resin compositions of this invention indicated 0% defective in the initial check, and no defective was recognized in the heating/cooling cycle test and also in the moisture resistance reliability test. Therefore, it can be seen that the semiconductor devices obtained according to this invention were excellent in thermal shock resistance as well as in moisture resistance reliability as compared with those of Comparative Examples.

The resin-sealed glass semiconductor devices wherein a glass chip was sealed using the liquid epoxy resin compositions of this invention indicated a more excellent external appearance as compared with those of Comparative Examples. Thus, the generation of voids, flow marks and peeled portions was not recognized. Additionally, it will be seen that it was possible according to this invention to shorten the filling time, and to improve the adhesivity, mold stability, filling performance and moisture resistance reliability.

EXAMPLE IV

In this example, a coating material containing an epoxy resin composition of this invention will be explained. The components employed herein were the same as those of the aforementioned Example III.

Example IV-1

80 g of EP4, 20 g of epoxidized polybutadiene (PB3600; Daiseru Chemicals Industries Co., Ltd., epoxy equivalent: 200; oxysilane oxygen concentration: 8% by weight; a product where a liquid polybutadiene having 50% or more of 1,4-bond is epoxidized), 5 g of OH1 as a curing catalyst, and 1 g of All were mixed together to prepare a composition, which was then dissolved in a diluted solution of butylalcohol to obtain a solution of an epoxy resin composition containing 80% of resin moiety.

Then, this solution of an epoxy resin composition was coated on a substrate (galvanized sheet iron, 50×150×0.3 mm) to a thickness of 50 μm by means of a bar coater. Then, the coated layer was allowed to cure in an oven at a temperature of 120° C. for 20 minutes to obtain a coated material consisting of cured product of the epoxy resin composition.

Additionally, the storage stability of the epoxy resin composition was investigated, and the external appearance of the cured product thereof was visually inspected. Further, a rubbing test, a pencil test and a shock resistance test were performed, the results being summarized in the following Table 27.

By the way, these tests were performed as follows.
Rubbing Test:
Xylene/100 times, wherein a sample indicating no flaw was marked by "○", a sample indicating a flaw was marked by "Δ", and a sample whose rubbed portion was entirely clouded in white was marked by "×".
Pencil Test:
This test was performed according to JIS K5400.
Shock Resistance Test:
This test was performed according to JIS K5400 and using a Dupont type shock deformation tester. The unit of values shown in the Table is based on "cm".

Example IV-2

An epoxy resin composition was prepared in the same manner as explained in Example IV-1 except that an alicyclic epoxy resin (CELOXIDE 2081; Daiseru Chemicals Industries Co., Ltd., epoxy equivalent: 200) was substituted for epoxidized polybutadiene as a flexible component. Then, the coated layer was formed using this epoxy resin composition. Further, the same assessments as explained above were performed on the epoxy resin composition and on the cured product thereof. The results being summarized in the following Table 27.

Example IV-3

An epoxy resin composition was prepared in the same manner as explained in Example IV-1 except that 1 g of A9 was substituted for the curing catalyst. Then, the coated layer was formed using this epoxy resin composition. Further, the same assessments as explained above were performed on the epoxy resin composition and on the cured product thereof. The results being summarized in the following Table 27.

Comparative Example IV-1

An epoxy resin composition was prepared in the same manner as explained in Example IV-1 except that 1 g of aluminum isopropoxide was substituted for the curing catalyst. Then, the coated layer was formed using this epoxy resin composition. Further, the same assessments as explained above were performed on the epoxy resin composition and on the cured product thereof. The results being summarized in the following Table 27.

Comparative Example IV-2

An epoxy resin composition was prepared using EP3, epoxidized polybutadiene (PB4700) and a phenol resin (PS2980; Gunei Kagaku, Industries, Ltd.) as a curing agent (wherein phenolic OH equivalent/epoxy equivalent=1). This epoxy resin composition was then dissolved in a mixed solvent containing ethylene glycol, 2-ethoxyethyl acetate and butyl alcohol (weight ratio=ethylene glycol:2-ethoxyethyl acetate:butyl alcohol=3:3:4) so as to obtain a solution containing a resin moiety of 50%. Furthermore, one part by weight of 2-ethylimidazole per 100 parts by weight of the resin moiety was added to the solution. In this case, EP3PB4700 was 1/1. Then, the coated layer was formed using this epoxy resin composition. Further, the same assessments as explained above were performed on the epoxy resin composition and on the cured product thereof. The results being summarized in the following Table 27.

TABLE 27

| | Storage stability | Rubbing test | Pencil hardness | Shock test |
|---|---|---|---|---|
| Example IV-1 | 12 month or more | ○ | H | 50 |
| Example IV-2 | 12 month or more | ○ | H | 50 |
| Example IV-3 | 12 month or more | ○ | H | 50 |
| Comparative Example IV-1 | 14 days | ○ | H | 50 |
| Comparative Example IV-2 | 14 days | ○ | H | 45 |

As shown in Table 27, the epoxy resin compositions (Examples IV-1 to IV-3) containing the curing catalysts of this invention indicated an excellent storage stability, i.e. all not less than 12 months. Further, the coated product obtained from the curing of the epoxy resin compositions of this invention indicated excellent results in all of rubbing test, pencil test and shock resistance test, which were equal to or more than comparable to the resin compositions of Comparative Examples IV-1 and IV-2 using a conventional catalyst or curing agent.

EXAMPLE V

In this example, light transmissive epoxy resin compositions were prepared and used for the manufacture of an optical semiconductor device, thereby investigate the performance of these resin compositions. The abbreviations of components employed herein were the same as those of the aforementioned Example III.

Example V-1

60 g of EP3, 40 g of a solid alicyclic epoxy resin (EHPE3150; Daiseru Chemicals Industries Co., Ltd., epoxy equivalent: 185; softening point: 85° C.), 5 g of OH1 as a curing catalyst.

Example V-2

An epoxy resin composition was prepared in the same manner as explained in Example V-1 except that 1 g of A9 was substituted for the curing catalyst.

Example V-3

30 g of EP3, 25 g of a solid. alicyclic epoxy resin (EHPE3150; Daiseru Chemicals Industries Co., Ltd., epoxy equivalent: 185; softening point: 85° C.), 45 g of a curing agent (acid anhydride, methylhexahydrophthalic anhydride, tradename: LICACID MH-700, molecular weight: 168, Shin Nihon Rika Co., Ltd.), and 5 g of OH1 and 1 g of AII as a curing catalyst were mixed together to obtain an epoxy resin composition.

Example V-4

50 g of EP4, 25 g of a solid alicyclic epoxy resin (EHPE3150; Daiseru Chemicals Industries Co., Ltd.), and 5 g of OH1 and 1 g of AII as a curing catalyst were mixed together to obtain an epoxy resin composition.

Comparative Example V-1

30 g of EP3, 25 g of a solid alicyclic epoxy resin (EHPE3150; Daiseru Chemicals Industries Co., Ltd.), 45 g of a curing agent (acid anhydride, LICACID MH-700) and 1 g of 2-methyl-4-methylimidazole as a curing catalyst were mixed together to obtain an epoxy resin composition.

Comparative Example V-2

40 g of EP4, 20 g of a novolak epoxy resin (EOCN1027; Nippon Kayaku, Co., Ltd., epoxy equivalent: 200), 40 g of a curing agent (acid anhydride, LICACID MH-700) and 1 g of 2-methyl-4-methylimidazole as a curing catalyst were mixed together to obtain an epoxy resin composition.

The epoxy resin compositions of Examples V-1 to V-4 and Comparative Examples V-1 and V-2 were subjected to a transfer molding under the conditions of 150° C. in temperature, 70 kg/cm$^2$ in pressure and five minutes in molding time, thereby to obtain a cured product. The resultant molded products were post-cured for 4 hours at a temperature of 150° C. to prepare test pieces, which were subsequently subjected to the following tests. The results are summarized in the following Table 28.

Light Transmittance:

Test pieces (10×50×1 mm) were prepared, and the light transmittance thereof was measured using an absorptiometer at a wavelength of 500 nm, 589 nm or 700 nm.

Moldability:

In the preparation of test pieces (4×10×100 mm) by means of a transfer molding, the degree of the generation of cracks in the test pieces was classified into three categories. Namely, the assessment standard was made as follows.

A: No crack

B: Cracks were generated

C: The test piece was broken thereby generating a chipped-off portion in the test piece Glass Transition Temperature and Thermal Expansion Coefficient:

They were measured using TMA at a temperature increment rate of 5° C./min.

Storage Stability:

An epoxy resin composition was left to stand for a period of time at a temperature of 30° C., thereby allowing the viscosity thereof was increased up to twice as high as the initial value, thus determining the number of days.

Gelation Time:

An epoxy resin composition was placed on a hot plate heated up to a temperature of 150° C., and then measured the time required for the fused resin composition to become gelated.

TABLE 28

|  |  | Example |  |  |  | Comparative Example |  |
|---|---|---|---|---|---|---|---|
|  |  | V-1 | V-2 | V-3 | V-4 | V-1 | V-2 |
| Light transmittance | 500 nm | 94 | 94 | 94 | 95 | 93 | 38 |
| (% T) | 589 nm | 95 | 95 | 95 | 95 | 95 | 48 |
|  | 700 nm | 96 | 96 | 96 | 96 | 95 | 65 |
| Storage stability |  | 3 months | 3 months | 3 months | 3 months | 1 month | 1 month |
| Moldability |  | A | A | A | A | A | A |
| Glass transition temp. (° C.) |  | 155 | 160 | 150 | 160 | 148 | 152 |
| Coefficient of linear expansion α1 (10$^{-5}$/K.) |  | 7.0 | 7.1 | 6.9 | 7.0 | 6.6 | 6.2 |
| Gelation time (sec.) |  | 35 | 10 | 37 | 40 | 33 | 31 |

As shown in Table 28, the epoxy resin compositions (Examples V-1 to V-4) containing the curing catalysts of this invention indicated an excellent storage stability, i.e. all not less than 3 months. Additionally, all of the epoxy resin compositions of this invention indicated excellent results in moldability, curability, thermal expansion coefficient and light transmittance. By contrast, the resin compositions of Comparative Examples V-1 and V-2 were found insufficient in storage stability.

Figure 3:
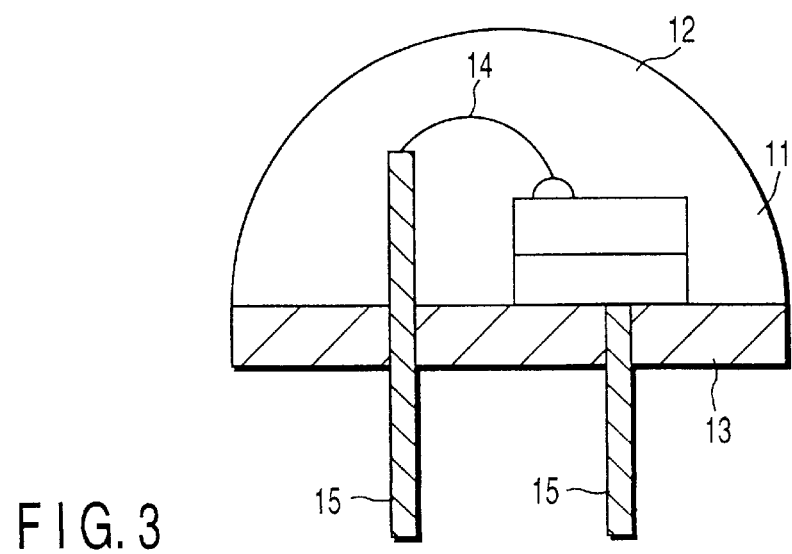
FIG. 3 is a longitudinal sectional view schematically illustrating an LED device employed in the following Examples.

Next, by making use of the light-transmitting epoxy resin composition of Example V-1, an LED device was prepared. FIG. 3 illustrates the cross-sectional view thereof. Referring to FIG. 3, the numeral 11 denotes a light-emitting element (gallium arsenide diode), 12 denotes a light transmissive resin member which was molded using the epoxy resin, 13 is a glass-epoxy base material, 14 denotes a lead wire, and 15 represents electrodes. It was found that this LED device was excellent in light transmittance and in reliability.

As mentioned above, the curing catalyst according to this invention is inhibited from developing the catalytic activity at room temperature until it is heated. Therefore, it is possible, by incorporating this curing catalyst in a resin composition, to maintain its excellent curing property at a temperature higher than a predetermined temperature which is higher than room temperature, and at the same time, to ensure a high storage stability of the resin composition at room temperature. Thus, the resin composition containing the curing catalysts according to this invention is prevented from proceeding the curing reaction at room temperature thereby assuring a high storage stability for a long period of time. However, when this resin composition is once heated, the curing reaction thereof can be quickly taken place.

Since the resin composition according to this invention contains the aforementioned curing catalyst, the reaction thereof cannot be proceeded at around room temperature, thereby ensuring a long-term storage stability. However, once the resin composition is heated at a temperature higher than room temperature, the curing reaction thereof can be quickly proceeded. Further, since it is possible to prevent any ionic substances from being left in the cured product after curing, it is possible to obtain a cured product which is excellent in electric insulation and mechanical strength.

Especially, when specific kinds of resin and catalyst are mixed together, it is possible to obtain a liquid resin composition which is excellent, in addition to the storage stability, in fluidity, filling property, thermal shock resistance and moistureproof reliability. Since this liquid resin composition is excellent in workability in filling a gap between a semiconductor device and a substrate, it is now possible, by using this resin composition for sealing a semiconductor element, to provide a resin-sealed semiconductor device which is useful in providing an increased density and degree of integrity of electronic devices, an increased density of semiconductor devices, an increased speed of operation of device, an increased number of pin-count, an increased miniaturization and thinning of package.

According to this invention, it is also possible to provide a coating material containing the aforementioned resin composition and exhibiting an excellent storage stability and a high hardness after curing.

Therefore, the resin composition of the present invention is applicable to an extensive end-use such as a sealing material for a semiconductor element, a coating material, etc., thus making it valuable in industrial viewpoints.

What is claimed is:
1. A curing catalyst comprising:

an organometallic compound component capable of reversibly dissolving and precipitating through heating and cooling, and selected from the group consisting of the following formulas (II-1), (II-2) and (II-3); and at least one compound selected from the group consisting of organosilane having an aryl group bonded directly to a silicon atom and having a hydroxyl group or a hydrolyzable group bonded directly to a silicon atom, organosiloxane having a hydroxyl group bonded directly to a silicon atom, a phenol compound, an organosilicon compound having a hydrolyzable group bonded directly to a silicon atom, and a silicon compound capable of generating silanol upon irradiation of light,

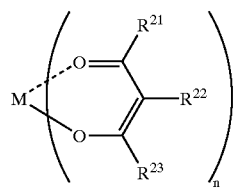
(II-1)

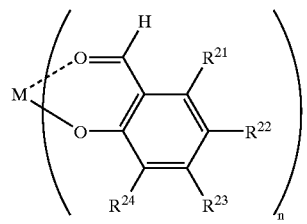
(II-2)

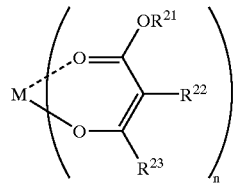
(II-3)

wherein $R^{21}$, $R^{22}$, $R^{23}$ and $R^{24}$ may be the same or different and are individually hydrogen atom, substituted or unsubstituted hydrocarbon groups having 1 to 30 carbon atoms with a proviso that one ligand thereof contains at least one substituted or unsubstituted linear or branched alkyl group having 10 or more carbon atoms, which is represented by $R^{21}$, $R^{22}$, $R^{23}$ and $R^{24}$; M is Al; and n is 3.

2. The curing catalyst according to claim 1, wherein said compound represented by the formulas (II-1), (II-2) and (II-3) is selected from the group consisting of tris (octadecylacetoacetate) aluminum, tris (hexadecylacetoacetate) aluminum, tris (tetradecylacetoacetate) aluminum, tris (dodecylacetoacetate) aluminum, tris(octylsalicylaidehyde) aluminum, tris(3-octadecylacetylacetate) aluminum, and compounds represented by the following chemical formulas:

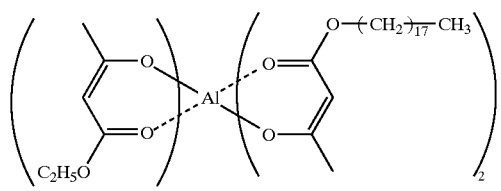

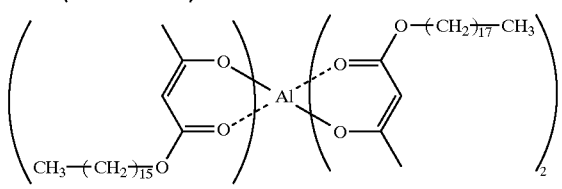

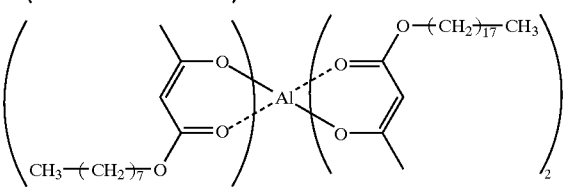

-continued

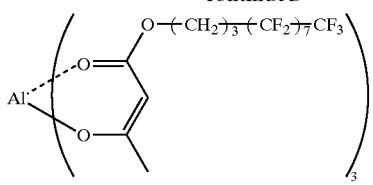

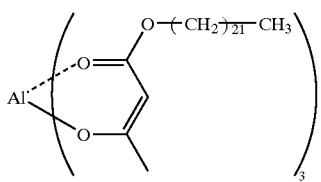

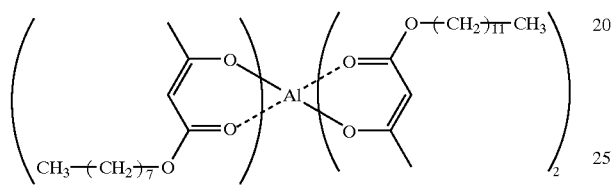

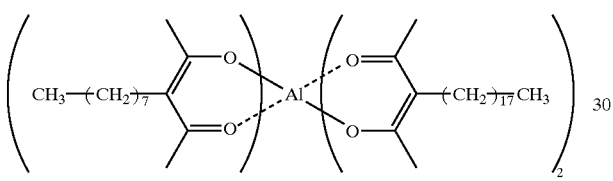

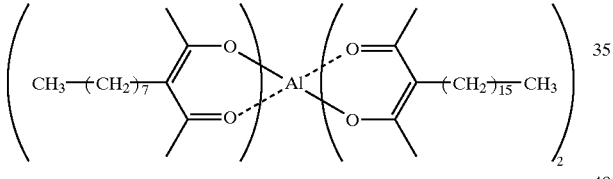

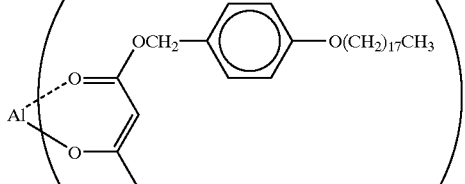

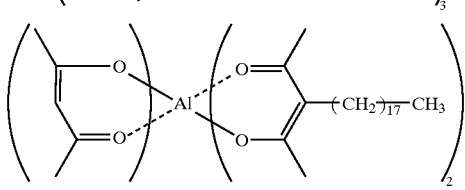

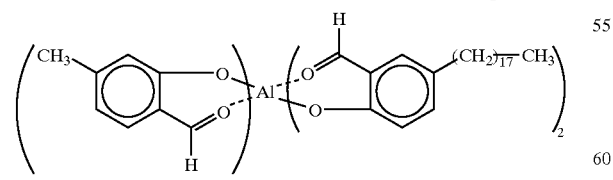

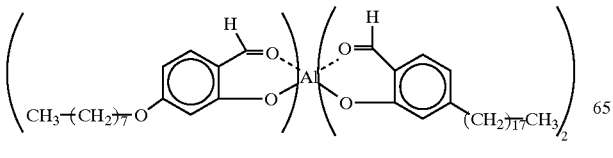

-continued

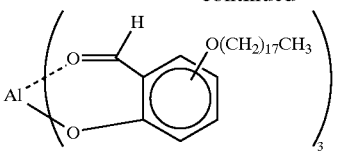

3. The curing catalyst according to claim 1, wherein said organosilane having a hydroxyl group bonded directly to a silicon atom is a compound represented by the following formula (S-1):

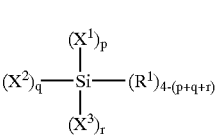

(S-1)

wherein $R^1$ is hydroxyl or hydrolyzable group; $X^1$, $X^2$ and $X^3$ may be the same or different and are individually alkyl group having 1 to 12 carbon atoms; aryl group, phenyl group, tolyl group, paramethoxyphenyl group, parachlorophenyl group and paranitrophenyl group; aralkyl group, benzyl group, phenethyl group, paramethoxybenzyl group and paramethylbenxyl group; alkenyl group, vinyl group, allyl group, propenyl group and butenyl group; and acyl group, acetyl group, benzoyl group and trifluoroacetyl group; and p, q and r are integers of 0 to 3 with a proviso that p+q+r is not more than 3.

4. The curing catalyst according to claim 1, wherein said organosiloxane having a hydroxyl group bonded directly to a silicon atom is selected from the group consisting of the following formulas (S-2), (S-3), (S-4) and (S-5);

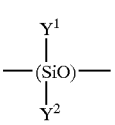

(S-2)

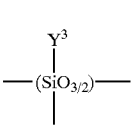

(S-3)

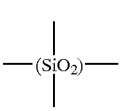

(S-4)

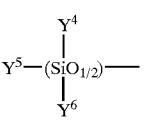

(S-5)

wherein $Y^1$, $Y^2$, $Y^3$, $Y^4$, $Y^5$ and $Y^6$ may be the same or different and are individually hydroxyl group or hydrolyzable group; alkyl group having 1 to 12 carbon atoms; aryl group, phenyl group, tolyl group, paramethoxyphenyl group, parachlorophenyl group and paracyanophenyl group; aralkyl group, benzyl group, phenethyl group, paramethoxybenzyl group and paramethylbenzyl group; alkenyl group, vinyl group, allyl group, propenyl group and butenyl group; and acyl group, acetyl group, benzoyl group and trifluoroacetyl group.

5. The curing catalyst according to claim 1, wherein said phenol compound is represented by the following general formulas (Ph-1);

$$Ar^2-(OH)_n \quad \text{(Ph-1)}$$

wherein $Ar^2$ is substituted or unsubstituted aromatic or heteroaromatic group; and n is an integer of 1 to 10.

6. The curing catalyst according to claim 1, wherein said organosilicon compound having a hydrolyzable group bonded directly to a silicon atom is a compound having alkoxyl group having 1 to 5 carbon atoms; aryloxy group; acyloxy group; alkenyloxy group having 2 to 12 carbon atoms; aralkyloxy group; or a group represented by the following formula:

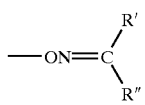

wherein R' and R" may be the same or different and are individually alkyl groups having 1 to 5 carbon atoms.

7. The curing catalyst. according to claim 1, wherein said silicon compound capable of generating silanol upon irradiation of light is a compound having any one of groups selected from the group consisting of peroxysilano group, o-nitrobenzyloxy group and α-ketosilyl group.

8. A resin composition, comprising:

a curing catalyst and an epoxy resin;

wherein said curing catalyst comprises:

an organometallic compound component capable of reversibly dissolving and precipitating through heating and cooling and selected from the group consisting of the following formulas (II-1), (II-2) and (II-3), and at least one compound selected from the group consisting of organosilane having an aryl group bonded directly to a silicon atom and having a hydroxyl group or a hydrolyzable group bonded directly to a silicon atom, organosiloxane having a hydroxyl group bonded directly to a silicon atom, a phenol compound, an organosilicon compound having a hydrolyzable group bonded directly to a silicon atom, and a silicon compound capable of generating silanol upon irradiation of light,

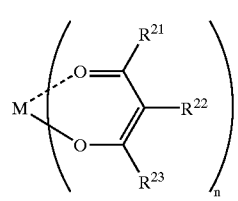 (II-1)

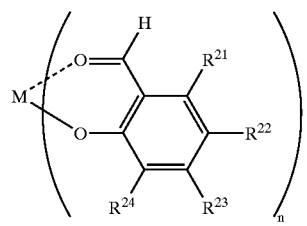 (II-2)

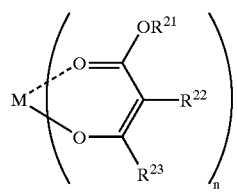 (II-3)

wherein $R^{21}$, $R^{22}$, $R^{23}$ and $R^{24}$ may be the same or different and are individually hydrogen atom, substituted or unsubstituted hydrocarbon groups having 1 to 30 carbon atoms with a proviso that one ligand thereof contains at least one substituted or unsubstituted linear or branched alkyl group having 10 or more carbon atoms, which is represented by $R^{21}$, $R^{22}$, $R^{23}$ and $R^{24}$; M is Al; and n is 3.

9. The resin composition according to claim 8, wherein said compound represented by formulas (II-1), (II-2) and (II-3) is selected from the group consisting of tris (octadecylacetoacetate) aluminum, tris (hexadecylacetoacetate) aluminum, tris (tetradecylacetoacetate) aluminum, tris (dodecylacetoacetate) aluminum, tris(octylsalicylaldehyde) aluminum, tris(3-octadecylacetylacetate) aluminum, and compounds represented by the following chemical formulas:

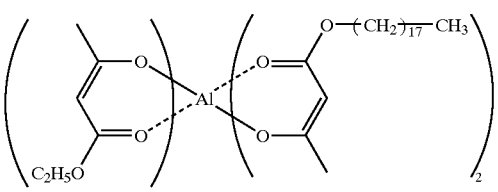

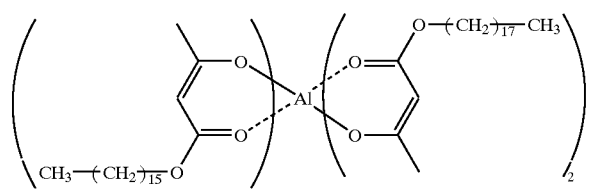

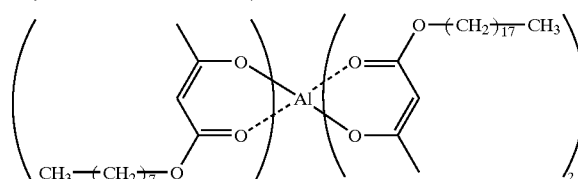

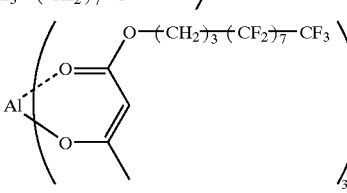

-continued

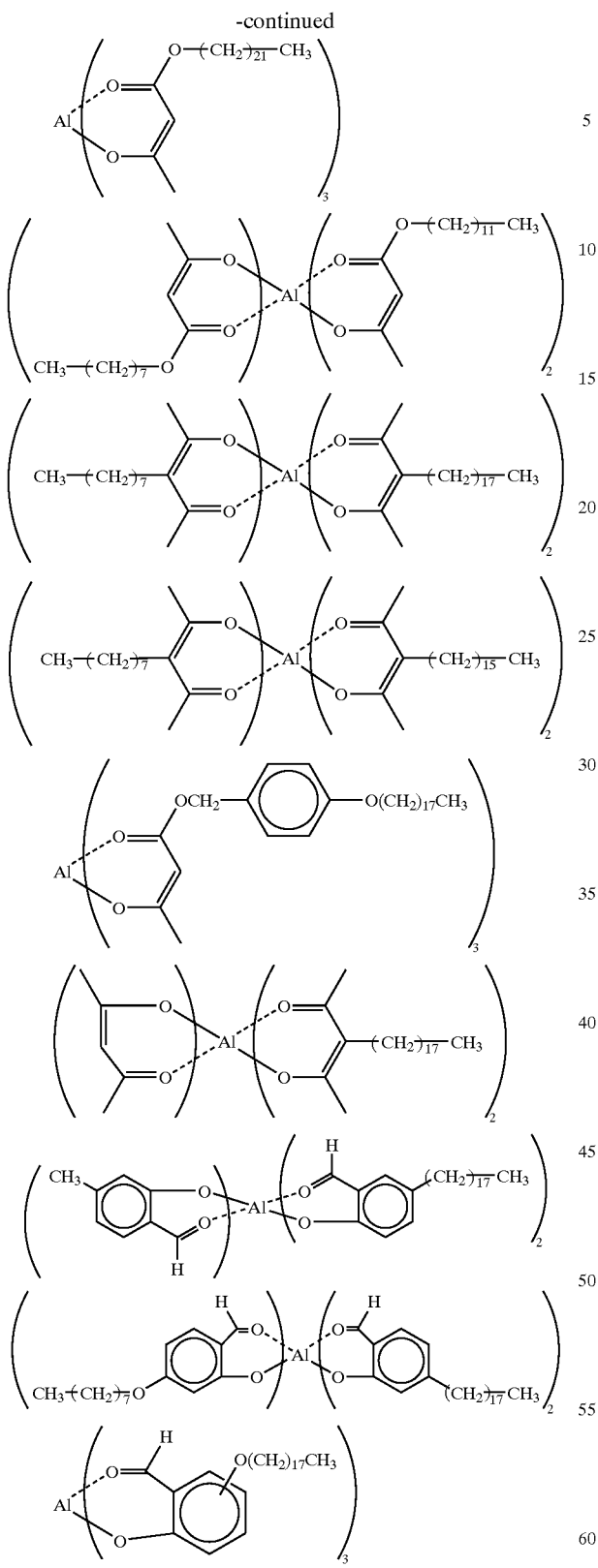

10. The resin composition according to claim 8, wherein said organosilane having a hydroxyl group bonded directly to a silicon atom is a compound represented by the following formula (S-1);

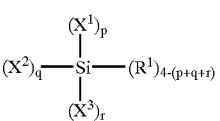
(S-1)

wherein $R^1$ is hydroxyl or hydrolyzable group; $X^1$, $X^2$ and $X^3$ may be the same or different and are individually alkyl group having 1 to 12 carbon atoms; aryl group, phenyl group, tolyl group, paramethoxyphenyl group, parachlorophenyl group and paranitrophenyl group; aralkyl group, benzyl group, phenethyl group, paramethoxybenzyl group and paramethylbenzyl group; alkenyl group, vinyl group, allyl group, propenyl group and butenyl group; and acyl group, acetyl group, benzoyl group and trifluoroacetyl group; and p, q and r are integers of 0 to 3 with a proviso that p+q+r is not more than 3.

11. The resin composition according to claim 8, wherein organosiloxane having a hydroxyl group bonded directly to a silicon atom is selected from the group consisting of the following formulas (S-2), (S-3), (S-4) and (S-5):

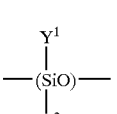
(S-2)

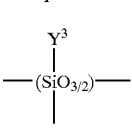
(S-3)

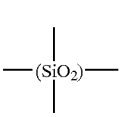
(S-4)

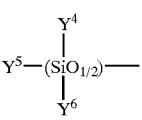
(S-5)

wherein $Y^1$, $Y^2$, $Y^3$, $Y^4$, $Y^5$ and $Y^6$ may be the same or different and are individually hydroxyl group or hydrolyzable group; alkyl group having 1 to 12 carbon atoms; aryl group, phenyl group, tolyl group, paramethoxyphenyl group, parachlorophenyl group and paracyanophenyl group; aralkyl group, benzyl group, phenethyl group, paramethoxybenzyl group and paramethylbenzyl group; alkenyl group, vinyl group, allyl group, propenyl group and butenyl group; and acyl group, acetyl group, benzoyl group and trifluoroacetyl group.

12. The resin composition according to claim 8, wherein said phenol compound is represented by the following formula (Ph-1);

$$Ar^2—OH_n \quad\quad (Ph-1)$$

wherein $Ar^2$ is substituted or unsubstituted aromatic or heteroaromatic group; and n is an integer of 1 to 10.

13. The resin composition according to claim 8, wherein said organosilicon compound having a hydrolyzable group bonded directly to a silicon atom is a compound having alkoxyl group having 1 to 5 carbon atoms; aryloxy group; acyloxy group; alkenyloxy group having 2 to 12 carbon atoms; aralkyloxy group; or a group represented by the following formula:

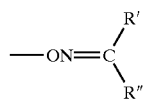

wherein R' and R" may be the same or different and are individually alkyl groups having 1 to 5 carbon atoms.

14. The resin composition according to claim 8, wherein said silicon compound capable of generating silanol upon irradiation of light is a compound having any one of groups selected from the group consisting of peroxysilano group, o-nitrobenzyloxy group and α-ketosilyl group.

15. The resin composition according to claim 8, further comprising a curing agent.

16. The resin composition according to claim 15, wherein said curing agent is selected from the group consisting of acid anhydrides, phenols, aromatic amine compounds, and cyanate ester compounds.

* * * * *